US012597030B2

(12) United States Patent (10) Patent No.: US 12,597,030 B2
Giobbi et al. (45) Date of Patent: *Apr. 7, 2026

(54) PERSONAL DIGITAL KEY INITIALIZATION AND REGISTRATION FOR SECURE TRANSACTIONS

(71) Applicant: Proxense, LLC, Bend, OR (US)

(72) Inventors: John J. Giobbi, Bend, OR (US); David L. Brown, Chattanooga, TN (US); Fred S. Hirt, Brookfield, IL (US)

(73) Assignee: Proxense, LLC, Bend, OR (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/664,076

(22) Filed: May 14, 2024

(65) Prior Publication Data

US 2024/0311832 A1 Sep. 19, 2024

Related U.S. Application Data

(63) Continuation of application No. 17/501,734, filed on Oct. 14, 2021, now Pat. No. 12,014,369, which is a
(Continued)

(51) Int. Cl.
*G06Q 20/40* (2012.01)
*G06F 21/31* (2013.01)
(Continued)

(52) U.S. Cl.
CPC ....... *G06Q 20/40145* (2013.01); *G06F 21/31* (2013.01); *G06F 21/32* (2013.01);
(Continued)

(58) Field of Classification Search
CPC ......... G06Q 20/40145; G06Q 20/4014; G06Q 20/341; G06F 21/31; G06F 21/32;
(Continued)

(56) References Cited

U.S. PATENT DOCUMENTS 3,665,313 A 5/1972 Trent
3,739,329 A 6/1973 Lester
(Continued)

FOREIGN PATENT DOCUMENTS

EP 1478152 A2 11/2004
EP 1536306 A1 6/2005
(Continued)

OTHER PUBLICATIONS

Thongthammachart et al., "Bluetooth Enables In-door Mobile Location Services," Proceedings of the 57th IEEE Semiannual Vehicular Technology Conference, Apr. 22-25, 2003, 5 pgs.
(Continued)

*Primary Examiner* — Badri Narayanan Champakesan
*Assistant Examiner* — Badri Champakesan
(74) *Attorney, Agent, or Firm* — Patent Law Works LLP

(57) ABSTRACT

A system and method provide efficient, secure, and highly reliable authentication for transaction processing and/or access control applications. A personal digital key (PDK) is programmed using a trusted programming device to initialize and/or register the PDK for use. In one embodiment, the initialization and registration processes are administered by a specialized trusted Notary to ensure the processes follow defined security procedures. In a biometric initialization, the programming device acquires a biometric input from a user and writes the biometric data to a tamperproof memory in the PDK. In registration, the Programmer communicates to one or more remote registries to create or update entries associated with the user PDK. Once initialized and registered, the PDK can be used for various levels of secure authentication processes.

20 Claims, 15 Drawing Sheets

Related U.S. Application Data continuation of application No. 16/893,155, filed on Jun. 4, 2020, now Pat. No. 11,182,792, which is a continuation of application No. 16/503,066, filed on Jul. 3, 2019, now Pat. No. 10,764,044, which is a continuation of application No. 14/986,306, filed on Dec. 31, 2015, now Pat. No. 10,374,795, which is a continuation of application No. 14/448,891, filed on Jul. 31, 2014, now Pat. No. 9,251,326, which is a continuation of application No. 13/791,553, filed on Mar. 8, 2013, now Pat. No. 8,838,993, which is a continuation of application No. 11/744,832, filed on May 5, 2007, now Pat. No. 8,412,949.

(60) Provisional application No. 60/894,608, filed on Mar. 13, 2007, provisional application No. 60/824,758, filed on Sep. 6, 2006, provisional application No. 60/838,788, filed on Aug. 17, 2006, provisional application No. 60/798,843, filed on May 8, 2006, provisional application No. 60/798,172, filed on May 5, 2006.

(51) Int. Cl.

| | |
|---|---|
| *G06F 21/32* | (2013.01) |
| *G06F 21/34* | (2013.01) |
| *G06Q 20/34* | (2012.01) |
| *G07C 9/25* | (2020.01) |
| *G07C 9/26* | (2020.01) |
| *G07F 7/10* | (2006.01) |
| *H04L 9/08* | (2006.01) |
| *H04L 9/32* | (2006.01) |
| *H04L 9/40* | (2022.01) |
| *H04L 29/06* | (2006.01) |
| *H04W 12/06* | (2021.01) |

(52) U.S. Cl.

CPC ..... *G06Q 20/4014* (2013.01); *H04L 63/0861* (2013.01); *G06F 21/34* (2013.01); *G06F 2221/2115* (2013.01); *G06Q 20/341* (2013.01); *G07C 9/257* (2020.01); *G07C 9/26* (2020.01); *G07C 2209/12* (2013.01); *G07F 7/1008* (2013.01); *H04L 9/0866* (2013.01); *H04L 9/3231* (2013.01); *H04L 2209/56* (2013.01); *H04L 2209/80* (2013.01); *H04W 12/06* (2013.01); *H04W 12/068* (2021.01)

(58) Field of Classification Search

CPC ............. G06F 21/34; G06F 2221/2115; H04L 63/0861; H04L 9/0866; H04L 9/3231; H04L 2209/56; H04L 2209/80; G07C 9/257; G07C 9/26; G07F 7/1008; H04W 12/06

USPC ........................................................ 713/186

See application file for complete search history.

(56) References Cited

U.S. PATENT DOCUMENTS

| | | | |
|---|---|---|---|
| 3,761,883 A | 9/1973 | Alvarez et al. | |
| 3,906,166 A | 9/1975 | Cooper et al. | |
| 4,101,873 A | 7/1978 | Anderson et al. | |
| 4,430,705 A | 2/1984 | Cannavino et al. | |
| 4,476,469 A | 10/1984 | Lander | |
| 4,598,272 A | 7/1986 | Cox | |
| 4,661,821 A | 4/1987 | Smith | |
| 4,736,094 A | 4/1988 | Yoshida | |
| 4,759,060 A | 7/1988 | Hayashi et al. | |
| 4,814,742 A | 3/1989 | Morita et al. | |
| 4,871,997 A | 10/1989 | Adriaenssens et al. | |
| 4,993,068 A | 2/1991 | Piosenka et al. | |
| 5,043,702 A | 8/1991 | Kuo | |
| 5,052,049 A | 9/1991 | Andros et al. | |
| 5,187,352 A | 2/1993 | Blair et al. | |
| 5,212,369 A | 5/1993 | Karlisch et al. | |
| 5,224,164 A | 6/1993 | Elsner | |
| 5,296,641 A | 3/1994 | Stelzel | |
| 5,307,349 A | 4/1994 | Shloss et al. | |
| 5,317,572 A | 5/1994 | Satoh | |
| 5,325,285 A | 6/1994 | Araki | |
| 5,392,287 A | 2/1995 | Tiedemann et al. | |
| 5,392,433 A | 2/1995 | Hammersley et al. | |
| 5,410,588 A | 4/1995 | Ito | |
| 5,416,780 A | 5/1995 | Patel | |
| 5,422,632 A | 6/1995 | Bucholtz et al. | |
| 5,428,684 A | 6/1995 | Akiyama et al. | |
| 5,450,489 A | 9/1995 | Ostrover et al. | |
| 5,473,690 A | 12/1995 | Grimonprez et al. | |
| 5,481,265 A | 1/1996 | Russell | |
| 5,506,863 A | 4/1996 | Meidan et al. | |
| 5,517,502 A | 5/1996 | Bestler et al. | |
| 5,530,232 A | 6/1996 | Taylor | |
| 5,541,583 A | 7/1996 | Mandelbaum | |
| 5,544,321 A | 8/1996 | Theimer et al. | |
| 5,552,776 A | 9/1996 | Wade et al. | |
| 5,563,947 A | 10/1996 | Kikinis | |
| 5,578,808 A | 11/1996 | Taylor | |
| 5,589,838 A | 12/1996 | McEwan | |
| 5,594,227 A | 1/1997 | Deo | |
| 5,598,474 A | 1/1997 | Johnson | |
| 5,611,050 A | 3/1997 | Theimer et al. | |
| 5,615,277 A | 3/1997 | Hoffman | |
| 5,619,251 A | 4/1997 | Kuroiwa et al. | |
| 5,623,552 A | 4/1997 | Lane | |
| 5,629,980 A | 5/1997 | Stefik et al. | |
| 5,644,354 A | 7/1997 | Thompson et al. | |
| 5,666,412 A | 9/1997 | Handelman et al. | |
| 5,689,529 A | 11/1997 | Johnson | |
| 5,692,049 A | 11/1997 | Johnson et al. | |
| 5,708,423 A | 1/1998 | Ghaffari et al. | |
| 5,719,387 A | 2/1998 | Fujioka | |
| 5,729,237 A | 3/1998 | Webb | |
| 5,760,705 A | 6/1998 | Glessner et al. | |
| 5,760,744 A | 6/1998 | Sauer | |
| 5,773,954 A | 6/1998 | Vanhorn | |
| 5,784,464 A | 7/1998 | Akiyama et al. | |
| 5,799,085 A | 8/1998 | Shona | |
| 5,821,854 A | 10/1998 | Dorinski et al. | |
| 5,825,876 A | 10/1998 | Peterson, Jr. | |
| 5,835,595 A | 11/1998 | Fraser et al. | |
| 5,838,306 A | 11/1998 | O'Connor et al. | |
| 5,854,891 A | 12/1998 | Postlewaite et al. | |
| 5,857,020 A | 1/1999 | Peterson, Jr. | |
| 5,886,634 A | 3/1999 | Muhme | |
| 5,892,825 A | 4/1999 | Mages et al. | |
| 5,892,900 A | 4/1999 | Ginter et al. | |
| 5,894,551 A | 4/1999 | Huggins et al. | |
| 5,898,880 A | 4/1999 | Ryu | |
| 5,910,776 A | 6/1999 | Black | |
| 5,917,913 A | 6/1999 | Wang | |
| 5,923,757 A | 7/1999 | Hocker et al. | |
| 5,928,327 A | 7/1999 | Wang et al. | |
| 5,942,985 A | 8/1999 | Chin | |
| 5,991,399 A | 11/1999 | Graunke et al. | |
| 5,991,749 A | 11/1999 | Morrill, Jr. | |
| 6,009,333 A | 12/1999 | Chaco | |
| 6,016,476 A * | 1/2000 | Maes ................... G06Q 20/108 705/18 |
| 6,018,739 A | 1/2000 | McCoy et al. | |
| 6,025,780 A | 2/2000 | Bowers et al. | |
| 6,035,038 A | 3/2000 | Campinos et al. | |
| 6,035,329 A | 3/2000 | Mages et al. | |
| 6,038,334 A | 3/2000 | Hamid | |
| 6,038,549 A | 3/2000 | Davis et al. | |
| 6,038,666 A | 3/2000 | Hsu et al. | |
| 6,040,786 A | 3/2000 | Fujioka | |
| 6,041,410 A | 3/2000 | Hsu et al. | |
| 6,042,006 A | 3/2000 | Van Tilburg et al. | |
| 6,044,470 A | 3/2000 | Kuriyama | |

(56)                References Cited

U.S. PATENT DOCUMENTS

| | | | |
|---|---|---|---|
| 6,045,039 A | 4/2000 | Stinson et al. |
| 6,052,468 A | 4/2000 | Hillhouse |
| 6,055,314 A | 4/2000 | Spies et al. |
| 6,068,184 A | 5/2000 | Barnett |
| 6,069,647 A | 5/2000 | Sullivan et al. |
| 6,070,796 A | 6/2000 | Sirbu |
| 6,076,164 A | 6/2000 | Tanaka et al. |
| 6,088,450 A | 7/2000 | Davis et al. |
| 6,088,730 A | 7/2000 | Kato et al. |
| 6,104,290 A | 8/2000 | Naguleswaran |
| 6,104,334 A | 8/2000 | Allport |
| 6,110,041 A | 8/2000 | Walker et al. |
| 6,121,544 A | 9/2000 | Petsinger |
| 6,134,283 A | 10/2000 | Sands et al. |
| 6,137,480 A | 10/2000 | Shintani |
| 6,138,010 A | 10/2000 | Rabe et al. |
| 6,148,142 A | 11/2000 | Anderson |
| 6,148,210 A | 11/2000 | Elwin et al. |
| 6,161,179 A | 12/2000 | Seidel |
| 6,175,921 B1 | 1/2001 | Rosen |
| 6,177,887 B1 | 1/2001 | Jerome |
| 6,185,316 B1 | 2/2001 | Buffam |
| 6,189,105 B1 | 2/2001 | Lopes |
| 6,209,089 B1 | 3/2001 | Selitrennikoff et al. |
| 6,219,109 B1 | 4/2001 | Raynesford et al. |
| 6,219,439 B1 | 4/2001 | Burger |
| 6,219,553 B1 | 4/2001 | Panasik |
| 6,237,848 B1 | 5/2001 | Everett |
| 6,240,076 B1 | 5/2001 | Kanerva et al. |
| 6,247,130 B1 | 6/2001 | Fritsch |
| 6,249,869 B1 | 6/2001 | Drupsteen et al. |
| 6,250,557 B1 | 6/2001 | Forslund et al. |
| 6,256,737 B1 | 7/2001 | Bianco et al. |
| 6,266,415 B1 | 7/2001 | Campinos et al. |
| 6,270,011 B1 | 8/2001 | Gottfried |
| 6,279,111 B1 | 8/2001 | Jensenworth et al. |
| 6,279,146 B1 | 8/2001 | Evans et al. |
| 6,295,057 B1 | 9/2001 | Rosin et al. |
| 6,307,471 B1 | 10/2001 | Xydis |
| 6,317,755 B1 | 11/2001 | Rakers et al. |
| 6,325,285 B1 | 12/2001 | Baratelli |
| 6,336,121 B1 | 1/2002 | Lyson et al. |
| 6,336,142 B1 | 1/2002 | Kato et al. |
| 6,343,280 B2 | 1/2002 | Clark |
| 6,345,347 B1 | 2/2002 | Biran |
| 6,363,485 B1 | 3/2002 | Adams et al. |
| 6,367,019 B1 | 4/2002 | Ansell et al. |
| 6,369,693 B1 | 4/2002 | Gibson |
| 6,370,376 B1 | 4/2002 | Sheath |
| 6,381,029 B1 | 4/2002 | Tipirneni |
| 6,381,747 B1 | 4/2002 | Wonfor et al. |
| 6,385,596 B1 | 5/2002 | Wiser et al. |
| 6,392,664 B1 | 5/2002 | White et al. |
| 6,397,387 B1 | 5/2002 | Rosin et al. |
| 6,401,059 B1 | 6/2002 | Shen et al. |
| 6,411,307 B1 | 6/2002 | Rosin et al. |
| 6,424,249 B1 | 7/2002 | Houvener |
| 6,424,715 B1 | 7/2002 | Saito |
| 6,425,084 B1 | 7/2002 | Rallis et al. |
| 6,434,403 B1 | 8/2002 | Ausems et al. |
| 6,434,535 B1 | 8/2002 | Kupka et al. |
| 6,446,004 B1 | 9/2002 | Cao et al. |
| 6,446,130 B1 | 9/2002 | Grapes |
| 6,456,958 B1 | 9/2002 | Xydis |
| 6,463,534 B1 | 10/2002 | Geiger et al. |
| 6,480,101 B1 | 11/2002 | Kelly et al. |
| 6,480,188 B1 | 11/2002 | Horsley |
| 6,484,182 B1 | 11/2002 | Dunphy et al. |
| 6,484,260 B1 | 11/2002 | Scott et al. |
| 6,484,946 B2 | 11/2002 | Matsumoto et al. |
| 6,487,663 B1 | 11/2002 | Jaisimha et al. |
| 6,490,443 B1 | 12/2002 | Freeny, Jr. |
| 6,510,350 B1 | 1/2003 | Steen et al. |
| 6,522,253 B1 | 2/2003 | Saltus |
| 6,523,113 B1 | 2/2003 | Wehrenberg |
| 6,529,949 B1 | 3/2003 | Getsin et al. |
| 6,546,418 B2 | 4/2003 | Schena et al. |
| 6,550,011 B1 | 4/2003 | Sims, III |
| 6,563,465 B2 | 5/2003 | Frecska |
| 6,563,805 B1 | 5/2003 | Ma et al. |
| 6,564,380 B1 | 5/2003 | Murphy |
| 6,577,238 B1 | 6/2003 | Whitesmith et al. |
| 6,593,887 B2 | 7/2003 | Luk et al. |
| 6,597,680 B1 | 7/2003 | Lindskog et al. |
| 6,607,136 B1 | 8/2003 | Atsmon et al. |
| 6,621,528 B1 | 9/2003 | Kessler et al. |
| 6,624,752 B2 | 9/2003 | Klitsgaard et al. |
| 6,628,302 B2 | 9/2003 | White et al. |
| 6,632,992 B2 | 10/2003 | Hasegawa |
| 6,633,981 B1 | 10/2003 | Davis |
| 6,645,077 B2 | 11/2003 | Rowe |
| 6,647,417 B1 | 11/2003 | Hunter et al. |
| 6,657,538 B1 | 12/2003 | Ritter |
| 6,658,566 B1 | 12/2003 | Hazard |
| 6,667,684 B1 | 12/2003 | Waggamon et al. |
| 6,669,096 B1 | 12/2003 | Saphar et al. |
| 6,671,808 B1 | 12/2003 | Abbott et al. |
| 6,683,954 B1 | 1/2004 | Searle |
| 6,695,207 B1 | 2/2004 | Norris, Jr. |
| 6,697,944 B1 | 2/2004 | Jones et al. |
| 6,709,333 B1 | 3/2004 | Bradford et al. |
| 6,711,464 B1 | 3/2004 | Yap et al. |
| 6,714,168 B2 | 3/2004 | Berenbaum |
| 6,715,246 B1 | 4/2004 | Frecska et al. |
| 6,728,397 B2 | 4/2004 | McNeal |
| 6,737,955 B2 | 5/2004 | Ghabra et al. |
| 6,738,772 B2 | 5/2004 | Regelski et al. |
| 6,758,394 B2 | 7/2004 | Maskatiya et al. |
| 6,771,969 B1 | 8/2004 | Chinoy et al. |
| 6,775,655 B1 | 8/2004 | Peinado et al. |
| 6,785,474 B2 | 8/2004 | Hirt et al. |
| 6,788,640 B2 | 9/2004 | Celeste |
| 6,788,924 B1 | 9/2004 | Knutson et al. |
| 6,795,425 B1 | 9/2004 | Raith |
| 6,804,825 B1 | 10/2004 | White et al. |
| 6,806,887 B2 | 10/2004 | Chernock et al. |
| 6,819,219 B1 | 11/2004 | Bolle et al. |
| 6,839,542 B2 | 1/2005 | Sibecas et al. |
| 6,850,147 B2 | 2/2005 | Prokoski et al. |
| 6,853,988 B1 | 2/2005 | Dickinson et al. |
| 6,859,812 B1 | 2/2005 | Poynor |
| 6,861,980 B1 | 3/2005 | Rowitch et al. |
| 6,871,063 B1 * | 3/2005 | Schiffer ............ H04M 1/72412 |
| | | 455/418 |
| 6,873,975 B1 | 3/2005 | Hatakeyama et al. |
| 6,879,567 B2 | 4/2005 | Callaway et al. |
| 6,879,966 B1 | 4/2005 | Lapsley et al. |
| 6,886,741 B1 | 5/2005 | Salveson |
| 6,889,067 B2 | 5/2005 | Willey |
| 6,891,822 B1 | 5/2005 | Gubbi et al. |
| 6,892,307 B1 | 5/2005 | Wood et al. |
| 6,930,643 B2 | 8/2005 | Byrne et al. |
| 6,934,855 B1 | 8/2005 | Kipnis et al. |
| 6,947,003 B2 | 9/2005 | Huor |
| 6,950,941 B1 | 9/2005 | Lee et al. |
| 6,957,086 B2 | 10/2005 | Bahl et al. |
| 6,961,858 B2 | 11/2005 | Fransdonk |
| 6,963,270 B1 | 11/2005 | Gallagher et al. |
| 6,963,971 B1 | 11/2005 | Bush et al. |
| 6,973,576 B2 | 12/2005 | Giobbi |
| 6,975,202 B1 | 12/2005 | Rodriguez et al. |
| 6,980,087 B2 | 12/2005 | Zukowski |
| 6,983,882 B2 | 1/2006 | Cassone |
| 6,999,032 B2 | 2/2006 | Pakray et al. |
| 7,012,503 B2 | 3/2006 | Nielsen |
| 7,020,635 B2 | 3/2006 | Hamilton et al. |
| 7,020,785 B2 | 3/2006 | Kim et al. |
| 7,031,945 B1 | 4/2006 | Donner |
| 7,049,963 B2 | 5/2006 | Waterhouse et al. |
| 7,055,171 B1 | 5/2006 | Martin et al. |
| 7,058,806 B2 | 6/2006 | Smeets et al. |
| 7,061,380 B1 | 6/2006 | Orlando et al. |
| 7,068,623 B1 | 6/2006 | Barany et al. |
| 7,072,900 B2 | 7/2006 | Sweitzer et al. |

(56)  References Cited

U.S. PATENT DOCUMENTS

| | | | |
|---|---|---|---|
| 7,079,079 B2 | 7/2006 | Jo et al. |
| 7,080,049 B2 | 7/2006 | Truitt et al. |
| 7,082,415 B1 | 7/2006 | Robinson et al. |
| 7,090,126 B2 | 8/2006 | Kelly et al. |
| 7,090,128 B2 | 8/2006 | Farley et al. |
| 7,100,053 B1 | 8/2006 | Brown et al. |
| 7,107,455 B1 | 9/2006 | Merkin |
| 7,107,462 B2 | 9/2006 | Fransdonk |
| 7,111,789 B2 | 9/2006 | Rajasekaran et al. |
| 7,112,138 B2 | 9/2006 | Hedrick et al. |
| 7,119,659 B2 | 10/2006 | Bonalle et al. |
| 7,123,149 B2 | 10/2006 | Nowak et al. |
| 7,130,668 B2 | 10/2006 | Chang et al. |
| 7,131,139 B1 | 10/2006 | Meier |
| 7,137,008 B1 | 11/2006 | Hamid et al. |
| 7,137,012 B1 | 11/2006 | Kamibayashi et al. |
| 7,139,914 B2 | 11/2006 | Arnouse |
| 7,150,045 B2 | 12/2006 | Koelle et al. |
| 7,155,416 B2 | 12/2006 | Shatford |
| 7,159,114 B1 | 1/2007 | Zajkowski et al. |
| 7,159,765 B2 | 1/2007 | Frerking |
| 7,167,987 B2 * | 1/2007 | Angelo .................. G06F 21/32 |
| | | 713/186 |
| 7,168,089 B2 | 1/2007 | Nguyen et al. |
| 7,176,797 B2 | 2/2007 | Zai et al. |
| 7,185,363 B1 | 2/2007 | Narin et al. |
| 7,188,110 B1 | 3/2007 | Ludtke et al. |
| 7,191,466 B1 | 3/2007 | Hamid et al. |
| 7,194,438 B2 | 3/2007 | Sovio et al. |
| 7,209,955 B1 | 4/2007 | Major et al. |
| 7,218,944 B2 | 5/2007 | Cromer et al. |
| 7,225,161 B2 | 5/2007 | Lam et al. |
| 7,230,908 B2 | 6/2007 | Vanderaar et al. |
| 7,231,068 B2 | 6/2007 | Tibor |
| 7,231,451 B2 | 6/2007 | Law et al. |
| 7,239,226 B2 | 7/2007 | Berardi et al. |
| 7,239,241 B2 | 7/2007 | Claudatos et al. |
| 7,242,923 B2 | 7/2007 | Perera et al. |
| 7,245,221 B2 | 7/2007 | Claudatos et al. |
| 7,249,177 B1 | 7/2007 | Miller |
| 7,272,723 B1 | 9/2007 | Abbott et al. |
| 7,277,737 B1 | 10/2007 | Vollmer et al. |
| 7,278,025 B2 | 10/2007 | Saito et al. |
| 7,283,650 B1 | 10/2007 | Sharma et al. |
| 7,295,106 B1 | 11/2007 | Jackson et al. |
| 7,295,119 B2 | 11/2007 | Rappaport et al. |
| 7,305,560 B2 | 12/2007 | Giobbi |
| 7,310,042 B2 | 12/2007 | Seifert |
| 7,314,164 B2 | 1/2008 | Bonalle et al. |
| 7,317,799 B2 | 1/2008 | Hammersmith et al. |
| 7,319,395 B2 | 1/2008 | Puzio et al. |
| 7,323,991 B1 | 1/2008 | Eckert et al. |
| 7,330,108 B2 | 2/2008 | Thomas |
| 7,333,002 B2 | 2/2008 | Bixler et al. |
| 7,333,615 B1 * | 2/2008 | Jarboe ...................... H04L 9/30 |
| | | 380/277 |
| 7,336,181 B2 | 2/2008 | Nowak et al. |
| 7,336,182 B1 | 2/2008 | Baranowski et al. |
| 7,337,326 B2 | 2/2008 | Palmer et al. |
| 7,341,181 B2 | 3/2008 | Bonalle et al. |
| 7,342,503 B1 | 3/2008 | Light et al. |
| 7,349,557 B2 | 3/2008 | Tibor |
| 7,356,393 B1 | 4/2008 | Schlatre et al. |
| 7,356,706 B2 | 4/2008 | Scheurich |
| 7,361,919 B2 * | 4/2008 | Setlak ................. G06K 9/00013 |
| | | 250/208.1 |
| 7,363,494 B2 | 4/2008 | Brainard et al. |
| 7,370,366 B2 | 5/2008 | Lacan et al. |
| 7,378,939 B2 | 5/2008 | Sengupta et al. |
| 7,380,202 B1 | 5/2008 | Lindhorst et al. |
| 7,382,799 B1 | 6/2008 | Young et al. |
| 7,387,235 B2 | 6/2008 | Gilbert et al. |
| 7,401,731 B1 | 7/2008 | Pletz et al. |
| 7,404,088 B2 | 7/2008 | Giobbi |
| 7,408,799 B1 | 8/2008 | Kang |
| 7,424,134 B2 | 9/2008 | Chou |
| 7,437,330 B1 | 10/2008 | Robinson et al. |
| 7,447,911 B2 * | 11/2008 | Chou ...................... G06F 21/32 |
| | | 382/115 |
| 7,448,087 B2 | 11/2008 | Ohmori et al. |
| 7,458,510 B1 | 12/2008 | Zhou |
| 7,460,836 B2 | 12/2008 | Smith et al. |
| 7,461,444 B2 | 12/2008 | Deaett et al. |
| 7,464,053 B1 * | 12/2008 | Pylant .................... G06Q 30/06 |
| | | 705/35 |
| 7,464,059 B1 | 12/2008 | Robinson et al. |
| 7,466,232 B2 | 12/2008 | Neuwirth |
| 7,472,280 B2 | 12/2008 | Giobbi |
| 7,477,285 B1 | 1/2009 | Johnson |
| 7,512,806 B2 | 3/2009 | Lemke |
| 7,525,413 B2 | 4/2009 | Jung et al. |
| 7,529,944 B2 | 5/2009 | Hamid |
| 7,533,809 B1 | 5/2009 | Robinson et al. |
| 7,545,312 B2 | 6/2009 | Kiang et al. |
| 7,552,872 B2 | 6/2009 | Tokita et al. |
| 7,565,329 B2 * | 7/2009 | Lapsley ................. G06Q 20/04 |
| | | 435/5 |
| 7,573,382 B2 | 8/2009 | Choubey et al. |
| 7,573,841 B2 | 8/2009 | Lee et al. |
| 7,574,734 B2 | 8/2009 | Fedronic et al. |
| 7,578,442 B2 | 8/2009 | Knowles et al. |
| 7,583,238 B2 | 9/2009 | Cassen et al. |
| 7,583,643 B2 | 9/2009 | Smith et al. |
| 7,587,502 B2 | 9/2009 | Crawford et al. |
| 7,587,611 B2 | 9/2009 | Johnson et al. |
| 7,594,611 B1 | 9/2009 | Arrington, III |
| 7,595,765 B1 | 9/2009 | Hirsch et al. |
| 7,603,564 B2 | 10/2009 | Adachi |
| 7,606,733 B2 | 10/2009 | Shmueli et al. |
| 7,617,523 B2 | 11/2009 | Das et al. |
| 7,620,184 B2 | 11/2009 | Marque Pucheu |
| 7,624,073 B1 | 11/2009 | Robinson et al. |
| 7,624,417 B2 | 11/2009 | Dua |
| 7,640,273 B2 | 12/2009 | Wallmeier et al. |
| 7,644,043 B2 | 1/2010 | Minowa |
| 7,644,443 B2 | 1/2010 | Matsuyama et al. |
| 7,646,307 B2 | 1/2010 | Plocher et al. |
| 7,652,892 B2 | 1/2010 | Shiu et al. |
| 7,653,883 B2 | 1/2010 | Hotelling et al. |
| 7,676,380 B2 | 3/2010 | Graves et al. |
| 7,681,050 B2 | 3/2010 | Blom et al. |
| 7,689,005 B2 | 3/2010 | Wang et al. |
| 7,701,858 B2 | 4/2010 | Werb et al. |
| 7,706,896 B2 | 4/2010 | Music et al. |
| 7,711,152 B1 * | 5/2010 | Davida .................... G06F 21/32 |
| | | 382/115 |
| 7,711,586 B2 | 5/2010 | Aggarwal et al. |
| 7,715,593 B1 | 5/2010 | Adams et al. |
| 7,724,713 B2 | 5/2010 | Del Prado Pavon et al. |
| 7,724,717 B2 | 5/2010 | Porras et al. |
| 7,724,720 B2 | 5/2010 | Korpela et al. |
| 7,764,236 B2 | 7/2010 | Hill et al. |
| 7,765,164 B1 | 7/2010 | Robinson et al. |
| 7,765,181 B2 | 7/2010 | Thomas et al. |
| 7,768,960 B1 | 8/2010 | Barratt |
| 7,773,754 B2 | 8/2010 | Buer et al. |
| 7,774,613 B2 | 8/2010 | Lemke |
| 7,780,082 B2 | 8/2010 | Handa et al. |
| 7,796,551 B1 | 9/2010 | Machiraju et al. |
| 7,813,822 B1 * | 10/2010 | Hoffberg .......... H04N 21/44222 |
| | | 700/94 |
| 7,865,448 B2 | 1/2011 | Pizarro |
| 7,865,937 B1 | 1/2011 | White et al. |
| 7,883,003 B2 | 2/2011 | Giobbi et al. |
| 7,883,417 B2 | 2/2011 | Bruzzese et al. |
| 7,904,718 B2 | 3/2011 | Giobbi et al. |
| 7,943,868 B2 | 5/2011 | Anders et al. |
| 7,957,536 B2 | 6/2011 | Nolte |
| 7,961,078 B1 | 6/2011 | Reynolds et al. |
| 7,984,064 B2 | 7/2011 | Fusari |
| 7,996,514 B2 | 8/2011 | Baumert et al. |
| 8,026,821 B2 | 9/2011 | Reeder et al. |
| 8,036,152 B2 | 10/2011 | Brown et al. |
| 8,049,594 B1 | 11/2011 | Baranowski |

(56) References Cited

U.S. PATENT DOCUMENTS

| | | | |
|---|---|---|---|
| 8,077,041 B2 | 12/2011 | Stern et al. | |
| 8,081,215 B2 | 12/2011 | Kuo et al. | |
| 8,082,160 B2 | 12/2011 | Collins et al. | |
| 8,089,354 B2 | 1/2012 | Perkins | |
| 8,112,066 B2 | 2/2012 | Ben Ayed | |
| 8,117,125 B1 | 2/2012 | Kawan et al. | |
| 8,125,624 B2 | 2/2012 | Jones et al. | |
| 8,135,624 B1 | 3/2012 | Ramalingam et al. | |
| 8,171,528 B1 | 5/2012 | Brown | |
| 8,193,923 B2 | 6/2012 | Rork et al. | |
| 8,200,980 B1 | 6/2012 | Robinson et al. | |
| 8,215,552 B1 | 7/2012 | Rambadt | |
| 8,219,129 B2 | 7/2012 | Brown et al. | |
| 8,248,263 B2 | 8/2012 | Shervey et al. | |
| 8,258,942 B1 | 9/2012 | Lanzone et al. | |
| 8,284,748 B2 | 10/2012 | Borghei | |
| 8,294,554 B2 | 10/2012 | Shoarinejad et al. | |
| 8,296,573 B2 | 10/2012 | Bolle et al. | |
| 8,307,414 B2 | 11/2012 | Zerfos et al. | |
| 8,325,011 B2 | 12/2012 | Butler et al. | |
| 8,327,151 B2 * | 12/2012 | Awatsu | G06Q 20/4014 |
| | | | 713/185 |
| 8,340,672 B2 * | 12/2012 | Brown | H04W 72/0446 |
| | | | 455/443 |
| 8,352,730 B2 | 1/2013 | Giobbi | |
| 8,373,562 B1 * | 2/2013 | Heinze | G06Q 10/06 |
| | | | 340/572.1 |
| 8,387,124 B2 | 2/2013 | Smetters et al. | |
| 8,390,456 B2 | 3/2013 | Puleston et al. | |
| 8,395,484 B2 | 3/2013 | Fullerton | |
| 8,410,906 B1 * | 4/2013 | Dacus | G06K 19/0701 |
| | | | 340/10.1 |
| 8,412,949 B2 | 4/2013 | Giobbi et al. | |
| 8,421,606 B2 | 4/2013 | Collins et al. | |
| 8,424,079 B2 | 4/2013 | Adams et al. | |
| 8,432,262 B2 | 4/2013 | Talty et al. | |
| 8,433,919 B2 | 4/2013 | Giobbi et al. | |
| 8,448,858 B1 | 5/2013 | Kundu et al. | |
| 8,457,672 B2 | 6/2013 | Brown et al. | |
| 8,467,969 B2 | 6/2013 | Nielsen et al. | |
| 8,473,748 B2 | 6/2013 | Sampas | |
| 8,484,696 B2 | 7/2013 | Gatto et al. | |
| 8,494,576 B1 * | 7/2013 | Bye | G07C 9/00571 |
| | | | 455/550.1 |
| 8,508,336 B2 | 8/2013 | Giobbi et al. | |
| 8,511,555 B2 | 8/2013 | Babcock et al. | |
| 8,519,823 B2 * | 8/2013 | Rinkes | G06K 7/0008 |
| | | | 340/7.32 |
| 8,522,019 B2 | 8/2013 | Michaelis | |
| 8,558,699 B2 * | 10/2013 | Butler | G06K 7/0008 |
| | | | 340/572.1 |
| 8,572,391 B2 * | 10/2013 | Golan | G06F 21/40 |
| | | | 713/183 |
| 8,577,091 B2 * | 11/2013 | Ivanov | G06K 9/00013 |
| | | | 382/115 |
| 8,600,674 B1 | 12/2013 | Barbeau et al. | |
| 8,646,042 B1 * | 2/2014 | Brown | G06Q 20/363 |
| | | | 726/3 |
| 8,659,427 B2 | 2/2014 | Brown et al. | |
| 8,678,273 B2 | 3/2014 | McNeal | |
| 8,717,346 B2 | 5/2014 | Claessen | |
| 8,738,925 B2 | 5/2014 | Park et al. | |
| 8,799,574 B2 | 8/2014 | Corda | |
| 8,838,993 B2 | 9/2014 | Giobbi et al. | |
| 8,856,539 B2 | 10/2014 | Weiss | |
| 8,857,716 B1 | 10/2014 | Giobbi et al. | |
| 8,886,954 B1 | 11/2014 | Giobbi | |
| 8,907,861 B2 | 12/2014 | Hirt | |
| 8,914,477 B2 | 12/2014 | Gammon | |
| 8,918,854 B1 | 12/2014 | Giobbi | |
| 8,931,698 B2 | 1/2015 | Ishikawa et al. | |
| 8,977,860 B2 | 3/2015 | Barrus et al. | |
| 8,979,646 B2 | 3/2015 | Moser et al. | |
| 9,020,854 B2 | 4/2015 | Giobbi | |
| 9,037,140 B1 | 5/2015 | Brown | |
| 9,042,819 B2 | 5/2015 | Dua | |
| 9,049,188 B1 | 6/2015 | Brown | |
| 9,113,464 B2 | 8/2015 | Brown et al. | |
| 9,165,233 B2 | 10/2015 | Testanero | |
| 9,189,788 B1 * | 11/2015 | Robinson | G06Q 20/4016 |
| 9,230,399 B2 | 1/2016 | Yacenda | |
| 9,235,700 B1 | 1/2016 | Brown | |
| 9,251,326 B2 | 2/2016 | Giobbi et al. | |
| 9,251,332 B2 | 2/2016 | Giobbi | |
| 9,265,043 B2 | 2/2016 | Brown et al. | |
| 9,265,450 B1 | 2/2016 | Giobbi | |
| 9,269,221 B2 | 2/2016 | Brown et al. | |
| 9,276,914 B2 | 3/2016 | Woodward et al. | |
| 9,298,905 B1 | 3/2016 | Giobbi | |
| 9,305,312 B2 | 4/2016 | Kountotsis et al. | |
| 9,322,974 B1 | 4/2016 | Giobbi | |
| 9,405,898 B2 | 8/2016 | Giobbi | |
| 9,418,205 B2 | 8/2016 | Giobbi | |
| 9,430,624 B1 | 8/2016 | Mortensen et al. | |
| 9,450,956 B1 | 9/2016 | Giobbi | |
| 9,542,542 B2 | 1/2017 | Giobbi et al. | |
| 9,613,483 B2 | 4/2017 | Giobbi | |
| 9,679,289 B1 | 6/2017 | Brown | |
| 9,728,080 B1 | 8/2017 | Giobbi et al. | |
| 9,807,091 B2 | 10/2017 | Giobbi | |
| 9,830,504 B2 | 11/2017 | Masood et al. | |
| 9,892,250 B2 | 2/2018 | Giobbi | |
| 9,898,662 B2 | 2/2018 | Tsuda et al. | |
| 9,904,816 B1 | 2/2018 | Giobbi et al. | |
| 9,990,628 B2 | 6/2018 | Giobbi | |
| 10,026,253 B2 | 7/2018 | Giobbi | |
| 10,073,960 B1 | 9/2018 | Brown | |
| 10,110,385 B1 | 10/2018 | Rush et al. | |
| 10,140,073 B2 | 11/2018 | Chang et al. | |
| 10,171,460 B2 | 1/2019 | Giobbi | |
| 10,217,339 B1 | 2/2019 | Giobbi | |
| 10,229,294 B1 | 3/2019 | Giobbi et al. | |
| 10,303,867 B2 | 5/2019 | Schrder | |
| 10,313,336 B2 | 6/2019 | Giobbi | |
| 10,334,541 B1 | 6/2019 | Brown | |
| 10,362,483 B2 | 7/2019 | Frusina | |
| 10,374,795 B1 | 8/2019 | Giobbi et al. | |
| 10,383,112 B1 | 8/2019 | Brown et al. | |
| 10,403,128 B2 | 9/2019 | Giobbi et al. | |
| 10,405,181 B2 | 9/2019 | Li et al. | |
| 10,437,976 B2 | 10/2019 | Giobbi | |
| 10,455,533 B2 | 10/2019 | Brown | |
| 10,469,456 B1 | 11/2019 | Giobbi | |
| 10,567,965 B2 | 2/2020 | Boettcher et al. | |
| 10,698,989 B2 | 6/2020 | Giobbi | |
| 10,755,300 B2 | 8/2020 | Goodhart et al. | |
| 10,764,044 B1 | 9/2020 | Giobbi et al. | |
| 10,769,939 B2 | 9/2020 | Brown et al. | |
| 10,817,964 B2 | 10/2020 | Guillama et al. | |
| 10,856,148 B2 | 12/2020 | Li et al. | |
| 10,909,229 B2 | 2/2021 | Giobbi | |
| 10,929,869 B2 | 2/2021 | Rosenberg | |
| 10,943,471 B1 | 3/2021 | Giobbi et al. | |
| 11,086,979 B1 | 8/2021 | Giobbi | |
| 11,212,797 B2 | 12/2021 | Brown et al. | |
| 11,219,022 B2 | 1/2022 | Brown et al. | |
| 11,562,644 B2 | 1/2023 | Brown et al. | |
| 11,914,695 B2 | 2/2024 | Giobbi | |
| 2001/0000535 A1 | 4/2001 | Lapsley et al. | |
| 2001/0011276 A1 | 8/2001 | Durst et al. | |
| 2001/0014885 A1 | 8/2001 | Yanagi | |
| 2001/0018763 A1 | 8/2001 | Ikeda et al. | |
| 2001/0021950 A1 | 9/2001 | Hawley et al. | |
| 2001/0024428 A1 | 9/2001 | Onouchi | |
| 2001/0026619 A1 | 10/2001 | Howard et al. | |
| 2001/0027121 A1 | 10/2001 | Boesen | |
| 2001/0027439 A1 | 10/2001 | Holtzman et al. | |
| 2001/0036297 A1 | 11/2001 | Ikegami et al. | |
| 2001/0044337 A1 | 11/2001 | Rowe et al. | |
| 2002/0004783 A1 | 1/2002 | Paltenghe et al. | |
| 2002/0007456 A1 | 1/2002 | Peinado et al. | |
| 2002/0010679 A1 | 1/2002 | Felsher | |
| 2002/0013772 A1 | 1/2002 | Peinado | |

(56) References Cited

U.S. PATENT DOCUMENTS

| | | | |
|---|---|---|---|
| 2002/0014954 A1 | 2/2002 | Fitzgibbon et al. | |
| 2002/0015008 A1 | 2/2002 | Kishida et al. | |
| 2002/0015494 A1 | 2/2002 | Nagai et al. | |
| 2002/0019811 A1 | 2/2002 | Lapsley et al. | |
| 2002/0022455 A1 | 2/2002 | Salokannel et al. | |
| 2002/0023032 A1 | 2/2002 | Pearson et al. | |
| 2002/0023217 A1* | 2/2002 | Wheeler | G06Q 20/02 |
| | | | 713/171 |
| 2002/0026424 A1 | 2/2002 | Akashi | |
| 2002/0037732 A1 | 3/2002 | Gous et al. | |
| 2002/0046336 A1 | 4/2002 | Kon et al. | |
| 2002/0049806 A1 | 4/2002 | Gatz et al. | |
| 2002/0052193 A1 | 5/2002 | Chetty | |
| 2002/0055908 A1 | 5/2002 | Di Giorgio et al. | |
| 2002/0056043 A1 | 5/2002 | Glass | |
| 2002/0059114 A1* | 5/2002 | Cockrill | G06Q 20/04 |
| | | | 705/26.81 |
| 2002/0062249 A1 | 5/2002 | Iannacci | |
| 2002/0064074 A1 | 5/2002 | Kamise et al. | |
| 2002/0065778 A1 | 5/2002 | Bouet et al. | |
| 2002/0068605 A1 | 6/2002 | Stanley | |
| 2002/0069364 A1 | 6/2002 | Dosch | |
| 2002/0071416 A1 | 6/2002 | Carlson et al. | |
| 2002/0071559 A1 | 6/2002 | Christensen et al. | |
| 2002/0073042 A1 | 6/2002 | Maritzen et al. | |
| 2002/0073293 A1 | 6/2002 | Mac et al. | |
| 2002/0076051 A1 | 6/2002 | Nii | |
| 2002/0078367 A1 | 6/2002 | Lang et al. | |
| 2002/0080969 A1 | 6/2002 | Giobbi | |
| 2002/0083178 A1 | 6/2002 | Brothers | |
| 2002/0083318 A1 | 6/2002 | Larose | |
| 2002/0086690 A1 | 7/2002 | Takahashi et al. | |
| 2002/0089890 A1 | 7/2002 | Fibranz et al. | |
| 2002/0091646 A1 | 7/2002 | Lake et al. | |
| 2002/0095586 A1* | 7/2002 | Doyle | G06F 21/32 |
| | | | 713/186 |
| 2002/0095587 A1* | 7/2002 | Doyle | G07F 7/1008 |
| | | | 713/186 |
| 2002/0097876 A1 | 7/2002 | Harrison | |
| 2002/0098888 A1 | 7/2002 | Rowe et al. | |
| 2002/0100798 A1 | 8/2002 | Farrugia et al. | |
| 2002/0103027 A1 | 8/2002 | Rowe et al. | |
| 2002/0103881 A1 | 8/2002 | Granade et al. | |
| 2002/0104006 A1* | 8/2002 | Boate | H04L 63/0853 |
| | | | 713/186 |
| 2002/0104019 A1 | 8/2002 | Chatani et al. | |
| 2002/0105918 A1 | 8/2002 | Yamada et al. | |
| 2002/0108049 A1 | 8/2002 | Xu et al. | |
| 2002/0109580 A1 | 8/2002 | Shreve et al. | |
| 2002/0111919 A1 | 8/2002 | Weller et al. | |
| 2002/0112183 A1 | 8/2002 | Baird et al. | |
| 2002/0115444 A1 | 8/2002 | Yu et al. | |
| 2002/0116615 A1 | 8/2002 | Nguyen et al. | |
| 2002/0124251 A1 | 9/2002 | Hunter et al. | |
| 2002/0128017 A1 | 9/2002 | Virtanen | |
| 2002/0128057 A1 | 9/2002 | Walker et al. | |
| 2002/0129262 A1 | 9/2002 | Kutaragi et al. | |
| 2002/0138438 A1 | 9/2002 | Bardwell | |
| 2002/0138445 A1 | 9/2002 | Laage et al. | |
| 2002/0138767 A1 | 9/2002 | Hamid et al. | |
| 2002/0138768 A1 | 9/2002 | Murakami et al. | |
| 2002/0139848 A1 | 10/2002 | Catan | |
| 2002/0140542 A1 | 10/2002 | Prokoski et al. | |
| 2002/0141586 A1 | 10/2002 | Margalit et al. | |
| 2002/0143623 A1 | 10/2002 | Dayley | |
| 2002/0143634 A1 | 10/2002 | Kumar et al. | |
| 2002/0143655 A1 | 10/2002 | Elston et al. | |
| 2002/0144116 A1* | 10/2002 | Giobbi | H04N 21/4627 |
| | | | 713/168 |
| 2002/0144117 A1 | 10/2002 | Faigle | |
| 2002/0147653 A1 | 10/2002 | Shmueli et al. | |
| 2002/0147658 A1 | 10/2002 | Kwan | |
| 2002/0148892 A1 | 10/2002 | Bardwell | |
| 2002/0150282 A1 | 10/2002 | Kinsella | |
| 2002/0152391 A1 | 10/2002 | Willins et al. | |
| 2002/0153996 A1 | 10/2002 | Chan et al. | |
| 2002/0158121 A1 | 10/2002 | Stanford-Clark | |
| 2002/0158750 A1 | 10/2002 | Almalik | |
| 2002/0158765 A1 | 10/2002 | Pape et al. | |
| 2002/0160820 A1 | 10/2002 | Winkler | |
| 2002/0162009 A1 | 10/2002 | Shmueli et al. | |
| 2002/0165803 A1 | 11/2002 | Iwase et al. | |
| 2002/0174348 A1 | 11/2002 | Ting | |
| 2002/0177460 A1 | 11/2002 | Beasley et al. | |
| 2002/0178063 A1 | 11/2002 | Gravelle et al. | |
| 2002/0184208 A1 | 12/2002 | Kato | |
| 2002/0187746 A1 | 12/2002 | Cheng et al. | |
| 2002/0191816 A1 | 12/2002 | Maritzen et al. | |
| 2002/0196963 A1 | 12/2002 | Bardwell | |
| 2002/0199120 A1 | 12/2002 | Schmidt | |
| 2003/0001016 A1 | 1/2003 | Fraier et al. | |
| 2003/0022701 A1 | 1/2003 | Gupta | |
| 2003/0023882 A1 | 1/2003 | Udom | |
| 2003/0024975 A1 | 2/2003 | Rajasekharan | |
| 2003/0033203 A1 | 2/2003 | Inoue et al. | |
| 2003/0034877 A1 | 2/2003 | Miller et al. | |
| 2003/0036416 A1 | 2/2003 | Pattabiraman et al. | |
| 2003/0036425 A1 | 2/2003 | Kaminkow et al. | |
| 2003/0044050 A1 | 3/2003 | Clark et al. | |
| 2003/0046228 A1 | 3/2003 | Berney | |
| 2003/0046237 A1* | 3/2003 | Uberti | G06Q 40/02 |
| | | | 705/44 |
| 2003/0046552 A1 | 3/2003 | Hamid | |
| 2003/0048174 A1 | 3/2003 | Stevens et al. | |
| 2003/0051173 A1* | 3/2003 | Krueger | G06F 21/32 |
| | | | 726/21 |
| 2003/0054868 A1 | 3/2003 | Paulsen et al. | |
| 2003/0054881 A1 | 3/2003 | Hedrick et al. | |
| 2003/0055689 A1 | 3/2003 | Block et al. | |
| 2003/0055792 A1 | 3/2003 | Kinoshita et al. | |
| 2003/0061154 A1 | 3/2003 | Chacko | |
| 2003/0061172 A1* | 3/2003 | Robinson | G06Q 20/4014 |
| | | | 705/67 |
| 2003/0063619 A1 | 4/2003 | Montano et al. | |
| 2003/0074575 A1 | 4/2003 | Hoberock et al. | |
| 2003/0079133 A1 | 4/2003 | Breiter et al. | |
| 2003/0087601 A1 | 5/2003 | Agam et al. | |
| 2003/0088441 A1 | 5/2003 | McNerney | |
| 2003/0105719 A1 | 6/2003 | Berger et al. | |
| 2003/0109274 A1 | 6/2003 | Budka et al. | |
| 2003/0115227 A1 | 6/2003 | Guthery | |
| 2003/0115351 A1 | 6/2003 | Giobbi | |
| 2003/0115473 A1 | 6/2003 | Sugimura et al. | |
| 2003/0115474 A1 | 6/2003 | Khan et al. | |
| 2003/0117969 A1 | 6/2003 | Koo et al. | |
| 2003/0117980 A1 | 6/2003 | Kim et al. | |
| 2003/0120934 A1* | 6/2003 | Ortiz | H04L 63/0861 |
| | | | 713/186 |
| 2003/0127511 A1 | 7/2003 | Kelly et al. | |
| 2003/0128866 A1 | 7/2003 | McNeal | |
| 2003/0137404 A1 | 7/2003 | Bonneau et al. | |
| 2003/0139190 A1 | 7/2003 | Steelberg et al. | |
| 2003/0142041 A1 | 7/2003 | Barlow et al. | |
| 2003/0146835 A1 | 8/2003 | Carter | |
| 2003/0149744 A1 | 8/2003 | Bierre et al. | |
| 2003/0152059 A1 | 8/2003 | Odman | |
| 2003/0156742 A1 | 8/2003 | Witt et al. | |
| 2003/0159040 A1 | 8/2003 | Hashimoto et al. | |
| 2003/0163388 A1 | 8/2003 | Beane | |
| 2003/0167207 A1 | 9/2003 | Berardi et al. | |
| 2003/0169697 A1 | 9/2003 | Suzuki et al. | |
| 2003/0172028 A1* | 9/2003 | Abell | H04W 4/24 |
| | | | 705/40 |
| 2003/0172037 A1 | 9/2003 | Jung et al. | |
| 2003/0174690 A1 | 9/2003 | Benveniste | |
| 2003/0174839 A1 | 9/2003 | Yamagata et al. | |
| 2003/0176218 A1 | 9/2003 | Lemay et al. | |
| 2003/0177102 A1 | 9/2003 | Robinson | |
| 2003/0186739 A1 | 10/2003 | Paulsen et al. | |
| 2003/0187787 A1 | 10/2003 | Freund | |
| 2003/0189092 A1 | 10/2003 | Takano | |
| 2003/0195842 A1 | 10/2003 | Reece | |
| 2003/0196084 A1 | 10/2003 | Okereke et al. | |

(56)                References Cited

U.S. PATENT DOCUMENTS

2003/0199267 A1   10/2003   Iwasa et al.
2003/0204526 A1   10/2003   Salehi-Had
2003/0204721 A1   10/2003   Barrus et al.
2003/0213840 A1   11/2003   Livingston et al.
2003/0223394 A1   12/2003   Parantainen et al.
2003/0225703 A1*  12/2003   Angel ................. G06Q 20/382
                                               705/64
2003/0226031 A1   12/2003   Proudler et al.
2003/0227382 A1   12/2003   Breed
2003/0233458 A1   12/2003   Kwon et al.
2004/0002347 A1    1/2004   Hoctor et al.
2004/0015403 A1    1/2004   Moskowitz et al.
2004/0021552 A1    2/2004   Koo
2004/0022384 A1    2/2004   Flores et al.
2004/0025179 A1    2/2004   Russ et al.
2004/0029620 A1    2/2004   Karaoguz
2004/0029635 A1    2/2004   Giobbi
2004/0030764 A1    2/2004   Birk et al.
2004/0030894 A1    2/2004   Labrou et al.
2004/0035644 A1    2/2004   Ford et al.
2004/0039909 A1    2/2004   Cheng
2004/0043753 A1    3/2004   Wake et al.
2004/0044627 A1    3/2004   Russell et al.
2004/0048570 A1    3/2004   Oba et al.
2004/0048609 A1    3/2004   Kosaka
2004/0049687 A1    3/2004   Orsini et al.
2004/0059682 A1    3/2004   Hasumi et al.
2004/0059912 A1    3/2004   Zizzi
2004/0064728 A1    4/2004   Scheurich
2004/0068656 A1    4/2004   Lu
2004/0073792 A1    4/2004   Noble et al.
2004/0081127 A1    4/2004   Gardner et al.
2004/0082385 A1    4/2004   Silva et al.
2004/0088558 A1    5/2004   Candelore
2004/0090345 A1    5/2004   Hitt
2004/0092231 A1    5/2004   Ayatsuka et al.
2004/0095911 A1    5/2004   Benveniste
2004/0098597 A1    5/2004   Giobbi
2004/0103061 A1    5/2004   Wood et al.
2004/0103062 A1    5/2004   Wood et al.
2004/0103064 A1    5/2004   Howard et al.
2004/0107169 A1    6/2004   Lowe
2004/0114563 A1    6/2004   Shvodian
2004/0117644 A1*   6/2004   Colvin ................. G06F 21/121
                                               713/193
2004/0123106 A1    6/2004   D'Angelo et al.
2004/0123107 A1    6/2004   Miyazaki et al.
2004/0123127 A1    6/2004   Teicher et al.
2004/0124966 A1    7/2004   Forrest
2004/0127277 A1    7/2004   Walker et al.
2004/0128162 A1    7/2004   Schlotterbeck et al.
2004/0128389 A1    7/2004   Kopchik
2004/0128500 A1    7/2004   Cihula et al.
2004/0128508 A1    7/2004   Wheeler et al.
2004/0128519 A1    7/2004   Klinger et al.
2004/0129787 A1    7/2004   Saito et al.
2004/0132432 A1    7/2004   Moores et al.
2004/0137912 A1    7/2004   Lin
2004/0153344 A1    8/2004   Bui et al.
2004/0153649 A1    8/2004   Rhoads et al.
2004/0158746 A1    8/2004   Hu et al.
2004/0166875 A1    8/2004   Jenkins et al.
2004/0167465 A1*   8/2004   Mihai ................... A61B 5/411
                                               604/67
2004/0176032 A1    9/2004   Kotola et al.
2004/0181695 A1    9/2004   Walker
2004/0193925 A1    9/2004   Safriel
2004/0194133 A1    9/2004   Ikeda et al.
2004/0201755 A1   10/2004   Norskog
2004/0203566 A1   10/2004   Leung
2004/0203885 A1   10/2004   Quaid
2004/0203923 A1   10/2004   Mullen
2004/0208139 A1   10/2004   Iwamura
2004/0209690 A1   10/2004   Bruzzese et al.
2004/0209692 A1   10/2004   Schober et al.

2004/0214582 A1   10/2004   Lan et al.
2004/0215615 A1   10/2004   Larsson et al.
2004/0217859 A1   11/2004   Pucci et al.
2004/0218581 A1   11/2004   Cattaneo
2004/0222877 A1   11/2004   Teramura et al.
2004/0230488 A1   11/2004   Beenau et al.
2004/0230809 A1   11/2004   Lowensohn et al.
2004/0234117 A1   11/2004   Tibor
2004/0238621 A1   12/2004   Beenau et al.
2004/0243519 A1   12/2004   Perttila et al.
2004/0246103 A1   12/2004   Zukowski
2004/0246934 A1   12/2004   Kim
2004/0246950 A1   12/2004   Parker et al.
2004/0250037 A1   12/2004   Takemura et al.
2004/0250074 A1   12/2004   Kilian-Kehr
2004/0252012 A1   12/2004   Beenau et al.
2004/0252659 A1   12/2004   Yun et al.
2004/0253996 A1   12/2004   Chen et al.
2004/0254837 A1   12/2004   Roshkoff
2004/0255139 A1   12/2004   Giobbi
2004/0255145 A1   12/2004   Chow
2004/0262384 A1   12/2004   Nishida et al.
2005/0001028 A1    1/2005   Zuili
2005/0001720 A1    1/2005   Mason et al.
2005/0002028 A1    1/2005   Kasapi et al.
2005/0005136 A1    1/2005   Chen et al.
2005/0006452 A1    1/2005   Aupperle et al.
2005/0009517 A1    1/2005   Maes
2005/0020322 A1    1/2005   Ruuska et al.
2005/0021369 A1    1/2005   Cohen et al.
2005/0021561 A1    1/2005   Noonan
2005/0023345 A1    2/2005   Furuyama et al.
2005/0025093 A1    2/2005   Yun et al.
2005/0028168 A1    2/2005   Marcjan
2005/0033703 A1    2/2005   Holdsworth
2005/0035897 A1    2/2005   Perl et al.
2005/0039027 A1    2/2005   Shapiro
2005/0040961 A1    2/2005   Tuttle
2005/0040968 A1*   2/2005   Damarla ............. G01S 5/02526
                                               455/456.3
2005/0044372 A1    2/2005   Aull et al.
2005/0044387 A1    2/2005   Ozolins
2005/0047386 A1    3/2005   Yi
2005/0049013 A1    3/2005   Chang et al.
2005/0050208 A1*   3/2005   Chatani ............. G06Q 20/3672
                                               709/229
2005/0050324 A1    3/2005   Corbett et al.
2005/0050367 A1    3/2005   Burger et al.
2005/0054431 A1    3/2005   Walker et al.
2005/0055242 A1    3/2005   Bello et al.
2005/0055244 A1    3/2005   Mullan et al.
2005/0058292 A1    3/2005   Diorio et al.
2005/0074126 A1    4/2005   Stanko
2005/0076242 A1    4/2005   Breuer
2005/0081040 A1    4/2005   Johnson et al.
2005/0084137 A1    4/2005   Kim et al.
2005/0085259 A1    4/2005   Conner et al.
2005/0086115 A1    4/2005   Pearson
2005/0086497 A1*   4/2005   Nakayama ............. G06F 21/32
                                               713/185
2005/0086501 A1    4/2005   Woo et al.
2005/0086515 A1    4/2005   Paris
2005/0089000 A1    4/2005   Bae et al.
2005/0090200 A1    4/2005   Karaoguz et al.
2005/0091338 A1    4/2005   De La Huerga
2005/0091553 A1    4/2005   Chien et al.
2005/0094657 A1    5/2005   Sung et al.
2005/0096053 A1    5/2005   Liu et al.
2005/0097037 A1*   5/2005   Tibor ................. H04L 63/0861
                                               705/39
2005/0099824 A1    5/2005   Dowling et al.
2005/0105600 A1    5/2005   Culum et al.
2005/0105734 A1*   5/2005   Buer ..................... H04W 4/021
                                               380/270
2005/0107965 A1    5/2005   Kerr et al.
2005/0108164 A1    5/2005   Salafia et al.
2005/0109836 A1    5/2005   Ben-Aissa
2005/0109841 A1    5/2005   Ryan et al.
2005/0113070 A1    5/2005   Okabe

(56) References Cited

U.S. PATENT DOCUMENTS

| | | |
|---|---|---|
| 2005/0113102 A1 | 5/2005 | Kwon et al. |
| 2005/0114149 A1 | 5/2005 | Rodriguez et al. |
| 2005/0114150 A1 | 5/2005 | Franklin |
| 2005/0114654 A1 | 5/2005 | Brackett et al. |
| 2005/0116020 A1 | 6/2005 | Smolucha et al. |
| 2005/0116050 A1 | 6/2005 | Jei et al. |
| 2005/0117530 A1 | 6/2005 | Abraham et al. |
| 2005/0119979 A1 | 6/2005 | Murashita et al. |
| 2005/0124294 A1 | 6/2005 | Wentink |
| 2005/0125258 A1 | 6/2005 | Yellin et al. |
| 2005/0128083 A1 | 6/2005 | Puzio et al. |
| 2005/0136947 A1 | 6/2005 | Llombart-Juan et al. |
| 2005/0137827 A1 | 6/2005 | Takamiya |
| 2005/0137977 A1 | 6/2005 | Wankmueller |
| 2005/0138390 A1 | 6/2005 | Adams et al. |
| 2005/0138576 A1 | 6/2005 | Baumert et al. |
| 2005/0139656 A1 | 6/2005 | Arnouse |
| 2005/0141451 A1 | 6/2005 | Yoon et al. |
| 2005/0151623 A1 | 7/2005 | von Hoffmann |
| 2005/0152394 A1 | 7/2005 | Cho |
| 2005/0154897 A1 | 7/2005 | Holloway et al. |
| 2005/0161503 A1* | 7/2005 | Remery ............... G06Q 20/341 |
| | | 235/380 |
| 2005/0165684 A1* | 7/2005 | Jensen ............ G06Q 20/40145 |
| | | 705/44 |
| 2005/0166063 A1 | 7/2005 | Huang |
| 2005/0167482 A1* | 8/2005 | Ramachandran .. G06Q 30/0609 |
| | | 235/379 |
| 2005/0169292 A1 | 8/2005 | Young |
| 2005/0177716 A1 | 8/2005 | Ginter et al. |
| 2005/0180385 A1 | 8/2005 | Jeong et al. |
| 2005/0181875 A1 | 8/2005 | Hoehne et al. |
| 2005/0182661 A1 | 8/2005 | Allard et al. |
| 2005/0182975 A1 | 8/2005 | Guo et al. |
| 2005/0187368 A1 | 8/2005 | Ebling et al. |
| 2005/0187792 A1 | 8/2005 | Harper |
| 2005/0192748 A1 | 9/2005 | Andric et al. |
| 2005/0195975 A1* | 9/2005 | Kawakita .............. H04L 9/0825 |
| | | 380/30 |
| 2005/0198208 A1 | 9/2005 | Nystrom |
| 2005/0200453 A1 | 9/2005 | Turner et al. |
| 2005/0201389 A1 | 9/2005 | Shimanuki et al. |
| 2005/0203682 A1 | 9/2005 | Omino et al. |
| 2005/0203844 A1 | 9/2005 | Ferguson et al. |
| 2005/0210270 A1 | 9/2005 | Rohatgi et al. |
| 2005/0212657 A1* | 9/2005 | Simon ..................... G06F 21/32 |
| | | 340/5.74 |
| 2005/0215233 A1 | 9/2005 | Perera et al. |
| 2005/0216313 A1 | 9/2005 | Claud et al. |
| 2005/0216639 A1 | 9/2005 | Sparer et al. |
| 2005/0218215 A1 | 10/2005 | Lauden |
| 2005/0220046 A1 | 10/2005 | Falck et al. |
| 2005/0221869 A1 | 10/2005 | Liu et al. |
| 2005/0224573 A1* | 10/2005 | Yoshizane .............. G07C 9/257 |
| | | 235/379 |
| 2005/0229007 A1 | 10/2005 | Bolle et al. |
| 2005/0229240 A1 | 10/2005 | Nanba |
| 2005/0231328 A1 | 10/2005 | Castle et al. |
| 2005/0235364 A1 | 10/2005 | Wilson |
| 2005/0242921 A1 | 11/2005 | Zimmerman et al. |
| 2005/0243787 A1 | 11/2005 | Hong et al. |
| 2005/0249385 A1 | 11/2005 | Kondo et al. |
| 2005/0251688 A1 | 11/2005 | Nanavati et al. |
| 2005/0253683 A1 | 11/2005 | Lowe |
| 2005/0256878 A1 | 11/2005 | Brown et al. |
| 2005/0257072 A1 | 11/2005 | Cross et al. |
| 2005/0257102 A1 | 11/2005 | Moyer et al. |
| 2005/0258229 A1 | 11/2005 | Minemura |
| 2005/0264416 A1 | 12/2005 | Maurer |
| 2005/0265371 A1 | 12/2005 | Sharma et al. |
| 2005/0268111 A1 | 12/2005 | Markham |
| 2005/0269401 A1* | 12/2005 | Spitzer ................. G06Q 20/341 |
| | | 235/380 |
| 2005/0272403 A1 | 12/2005 | Ryu et al. |
| 2005/0277385 A1 | 12/2005 | Daum |
| 2005/0278547 A1 | 12/2005 | Hyndman et al. |
| 2005/0281215 A1 | 12/2005 | Budampati et al. |
| 2005/0281320 A1 | 12/2005 | Neugebauer |
| 2005/0282558 A1 | 12/2005 | Choi et al. |
| 2005/0284932 A1 | 12/2005 | Sukeda et al. |
| 2005/0287985 A1 | 12/2005 | Balfanz et al. |
| 2005/0288015 A1 | 12/2005 | Azizi et al. |
| 2005/0288069 A1 | 12/2005 | Arunan et al. |
| 2005/0289473 A1 | 12/2005 | Gustafson et al. |
| 2006/0001525 A1 | 1/2006 | Nitzan et al. |
| 2006/0002349 A1 | 1/2006 | Demirhan |
| 2006/0005035 A1 | 1/2006 | Coughlin |
| 2006/0009216 A1 | 1/2006 | Welnick et al. |
| 2006/0014430 A1 | 1/2006 | Liang et al. |
| 2006/0022042 A1 | 2/2006 | Smets et al. |
| 2006/0022046 A1 | 2/2006 | Iwamura |
| 2006/0022800 A1 | 2/2006 | Krishna et al. |
| 2006/0025180 A1 | 2/2006 | Rajkotia et al. |
| 2006/0026338 A1 | 2/2006 | Ebara et al. |
| 2006/0026673 A1 | 2/2006 | Tsuchida |
| 2006/0030279 A1 | 2/2006 | Leabman |
| 2006/0030353 A1 | 2/2006 | Jun |
| 2006/0034250 A1 | 2/2006 | Kim et al. |
| 2006/0034492 A1 | 2/2006 | Siegel et al. |
| 2006/0041746 A1 | 2/2006 | Kirkup et al. |
| 2006/0046664 A1 | 3/2006 | Paradiso et al. |
| 2006/0050742 A1 | 3/2006 | Grandhi et al. |
| 2006/0053234 A1 | 3/2006 | Kumar et al. |
| 2006/0058102 A1 | 3/2006 | Nguyen et al. |
| 2006/0063575 A1 | 3/2006 | Gatto et al. |
| 2006/0064320 A1 | 3/2006 | Postrel |
| 2006/0064605 A1 | 3/2006 | Giobbi |
| 2006/0065730 A1 | 3/2006 | Quan et al. |
| 2006/0066441 A1 | 3/2006 | Knadle et al. |
| 2006/0069814 A1 | 3/2006 | Abraham et al. |
| 2006/0072586 A1 | 4/2006 | Callaway et al. |
| 2006/0074713 A1 | 4/2006 | Conry et al. |
| 2006/0075230 A1 | 4/2006 | Baird et al. |
| 2006/0075255 A1* | 4/2006 | Duffy .................... H04L 9/3236 |
| | | 713/186 |
| 2006/0076401 A1 | 4/2006 | Frerking |
| 2006/0078176 A1* | 4/2006 | Abiko ................ G06K 9/00026 |
| | | 382/124 |
| 2006/0080549 A1 | 4/2006 | Okamura et al. |
| 2006/0087407 A1 | 4/2006 | Stewart et al. |
| 2006/0089138 A1 | 4/2006 | Smith et al. |
| 2006/0095369 A1 | 5/2006 | Hofi |
| 2006/0095792 A1 | 5/2006 | Hurtado et al. |
| 2006/0097882 A1 | 5/2006 | Brinkerhoff et al. |
| 2006/0097949 A1 | 5/2006 | Luebke et al. |
| 2006/0101506 A1 | 5/2006 | Gallo et al. |
| 2006/0106645 A1 | 5/2006 | Bergelson et al. |
| 2006/0110012 A1 | 5/2006 | Ritter |
| 2006/0111955 A1 | 5/2006 | Winter et al. |
| 2006/0112423 A1 | 5/2006 | Mlladiego et al. |
| 2006/0113381 A1 | 6/2006 | Hochstein et al. |
| 2006/0116935 A1 | 6/2006 | Evans |
| 2006/0117013 A1 | 6/2006 | Wada |
| 2006/0120287 A1 | 6/2006 | Foti et al. |
| 2006/0129838 A1 | 6/2006 | Chen et al. |
| 2006/0136728 A1 | 6/2006 | Gentry et al. |
| 2006/0136742 A1 | 6/2006 | Giobbi |
| 2006/0136997 A1 | 6/2006 | Telek et al. |
| 2006/0143441 A1 | 6/2006 | Giobbi |
| 2006/0144943 A1 | 7/2006 | Kim |
| 2006/0156027 A1 | 7/2006 | Blake |
| 2006/0158308 A1 | 7/2006 | McMullen et al. |
| 2006/0163349 A1 | 7/2006 | Neugebauer |
| 2006/0163350 A1 | 7/2006 | Melton et al. |
| 2006/0165060 A1 | 7/2006 | Dua |
| 2006/0169771 A1 | 8/2006 | Brookner |
| 2006/0170530 A1 | 8/2006 | Nwosu et al. |
| 2006/0170565 A1 | 8/2006 | Husak et al. |
| 2006/0172700 A1 | 8/2006 | Wu |
| 2006/0173846 A1 | 8/2006 | Omae et al. |
| 2006/0173991 A1 | 8/2006 | Piikivi |
| 2006/0174349 A1 | 8/2006 | Cronce et al. |
| 2006/0183426 A1 | 8/2006 | Graves et al. |

(56) References Cited

U.S. PATENT DOCUMENTS

| | | |
|---|---|---|
| 2006/0183462 A1 | 8/2006 | Kolehmainen |
| 2006/0184531 A1 | 8/2006 | Russlies |
| 2006/0184795 A1* | 8/2006 | Doradla .................. H04L 63/08 |
| | | 713/167 |
| 2006/0185005 A1 | 8/2006 | Graves et al. |
| 2006/0187029 A1 | 8/2006 | Thomas |
| 2006/0190348 A1 | 8/2006 | Ofer et al. |
| 2006/0190413 A1 | 8/2006 | Harper |
| 2006/0194598 A1 | 8/2006 | Kim et al. |
| 2006/0195576 A1 | 8/2006 | Rinne et al. |
| 2006/0198337 A1 | 9/2006 | Hoang et al. |
| 2006/0200467 A1 | 9/2006 | Ohmori et al. |
| 2006/0205408 A1 | 9/2006 | Nakagawa et al. |
| 2006/0208066 A1 | 9/2006 | Finn et al. |
| 2006/0208853 A1 | 9/2006 | Kung et al. |
| 2006/0218196 A1 | 9/2006 | Kurita |
| 2006/0222042 A1 | 10/2006 | Teramura et al. |
| 2006/0226950 A1 | 10/2006 | Kanou et al. |
| 2006/0229909 A1 | 10/2006 | Kaila et al. |
| 2006/0236373 A1 | 10/2006 | Graves et al. |
| 2006/0237528 A1 | 10/2006 | Bishop et al. |
| 2006/0238305 A1 | 10/2006 | Loving et al. |
| 2006/0245620 A1 | 11/2006 | Roques et al. |
| 2006/0255935 A1 | 11/2006 | Scalisi et al. |
| 2006/0258289 A1 | 11/2006 | Dua |
| 2006/0268891 A1 | 11/2006 | Heidari-Bateni et al. |
| 2006/0273176 A1 | 12/2006 | Audebert et al. |
| 2006/0274711 A1 | 12/2006 | Nelson et al. |
| 2006/0279412 A1 | 12/2006 | Holland et al. |
| 2006/0286969 A1 | 12/2006 | Talmor et al. |
| 2006/0288095 A1 | 12/2006 | Torok et al. |
| 2006/0288233 A1 | 12/2006 | Kozlay |
| 2006/0290473 A1 | 12/2006 | Mahasenan et al. |
| 2006/0290519 A1 | 12/2006 | Boate et al. |
| 2006/0290580 A1 | 12/2006 | Noro et al. |
| 2006/0292986 A1 | 12/2006 | Bitran et al. |
| 2006/0293925 A1 | 12/2006 | Flom |
| 2006/0294388 A1 | 12/2006 | Abraham et al. |
| 2007/0003111 A1 | 1/2007 | Awatsu et al. |
| 2007/0005403 A1 | 1/2007 | Kennedy et al. |
| 2007/0007331 A1 | 1/2007 | Jasper et al. |
| 2007/0008070 A1 | 1/2007 | Friedrich |
| 2007/0008916 A1 | 1/2007 | Haugli et al. |
| 2007/0011724 A1 | 1/2007 | Gonzalez et al. |
| 2007/0016637 A1 | 1/2007 | Brawn et al. |
| 2007/0016800 A1 | 1/2007 | Spottswood et al. |
| 2007/0019845 A1 | 1/2007 | Kato |
| 2007/0029381 A1 | 2/2007 | Braiman |
| 2007/0032225 A1 | 2/2007 | Konicek et al. |
| 2007/0032288 A1 | 2/2007 | Nelson et al. |
| 2007/0033072 A1 | 2/2007 | Bildirici |
| 2007/0033150 A1* | 2/2007 | Nwosu ............ G06Q 20/40145 |
| | | 705/76 |
| 2007/0035381 A1 | 2/2007 | Davis |
| 2007/0035397 A1 | 2/2007 | Patenaude et al. |
| 2007/0036396 A1 | 2/2007 | Sugita et al. |
| 2007/0038751 A1 | 2/2007 | Jorgensen |
| 2007/0039041 A1 | 2/2007 | Davis |
| 2007/0043594 A1 | 2/2007 | Lavergne |
| 2007/0050259 A1 | 3/2007 | Wesley |
| 2007/0050398 A1 | 3/2007 | Mochizuki |
| 2007/0050845 A1 | 3/2007 | Das et al. |
| 2007/0051794 A1 | 3/2007 | Glanz et al. |
| 2007/0051798 A1 | 3/2007 | Kawai et al. |
| 2007/0055630 A1* | 3/2007 | Gauthier .............. G06Q 20/204 |
| | | 705/44 |
| 2007/0060095 A1 | 3/2007 | Subrahmanya et al. |
| 2007/0060319 A1 | 3/2007 | Block et al. |
| 2007/0061041 A1 | 3/2007 | Zweig |
| 2007/0064742 A1 | 3/2007 | Shvodian |
| 2007/0069852 A1 | 3/2007 | Mo et al. |
| 2007/0070040 A1 | 3/2007 | Chen et al. |
| 2007/0072636 A1 | 3/2007 | Worfolk et al. |
| 2007/0073553 A1 | 3/2007 | Flinn et al. |
| 2007/0078761 A1 | 4/2007 | Kagan et al. |
| 2007/0084523 A1 | 4/2007 | McLean et al. |
| 2007/0084913 A1* | 4/2007 | Weston .............. G06Q 20/3224 |
| | | 235/380 |
| 2007/0087682 A1 | 4/2007 | DaCosta |
| 2007/0087834 A1 | 4/2007 | Moser et al. |
| 2007/0090195 A1 | 4/2007 | Kawamura et al. |
| 2007/0094088 A1 | 4/2007 | Mastie et al. |
| 2007/0100507 A1 | 5/2007 | Simon |
| 2007/0100939 A1 | 5/2007 | Bagley et al. |
| 2007/0109117 A1 | 5/2007 | Heitzmann et al. |
| 2007/0112676 A1 | 5/2007 | Kontio et al. |
| 2007/0118891 A1 | 5/2007 | Buer |
| 2007/0119923 A1 | 5/2007 | Garrison et al. |
| 2007/0120643 A1 | 5/2007 | Lee |
| 2007/0120651 A1 | 5/2007 | Kobayashi et al. |
| 2007/0120698 A1 | 5/2007 | Turk et al. |
| 2007/0130025 A1 | 6/2007 | Nakajima |
| 2007/0132586 A1 | 6/2007 | Plocher et al. |
| 2007/0133478 A1 | 6/2007 | Armbruster et al. |
| 2007/0136407 A1 | 6/2007 | Rudelic |
| 2007/0142032 A1 | 6/2007 | Balsillie |
| 2007/0143626 A1 | 6/2007 | Okuda |
| 2007/0147332 A1 | 6/2007 | Lappetelainen et al. |
| 2007/0152826 A1 | 7/2007 | August et al. |
| 2007/0156850 A1 | 7/2007 | Corrion |
| 2007/0157249 A1 | 7/2007 | Cordray et al. |
| 2007/0158411 A1 | 7/2007 | Krieg, Jr. |
| 2007/0159301 A1 | 7/2007 | Hirt et al. |
| 2007/0159994 A1 | 7/2007 | Brown et al. |
| 2007/0164847 A1 | 7/2007 | Crawford et al. |
| 2007/0169121 A1 | 7/2007 | Hunt et al. |
| 2007/0174809 A1 | 7/2007 | Brown et al. |
| 2007/0174868 A1 | 7/2007 | Hitaka |
| 2007/0176756 A1 | 8/2007 | Friedrich |
| 2007/0176778 A1 | 8/2007 | Ando et al. |
| 2007/0180047 A1 | 8/2007 | Dong et al. |
| 2007/0187266 A1 | 8/2007 | Porter et al. |
| 2007/0192601 A1 | 8/2007 | Spain et al. |
| 2007/0194882 A1 | 8/2007 | Yokota et al. |
| 2007/0197261 A1 | 8/2007 | Humbel |
| 2007/0198436 A1 | 8/2007 | Weiss |
| 2007/0198848 A1 | 8/2007 | Bjorn |
| 2007/0204078 A1 | 8/2007 | Boccon-Gibod et al. |
| 2007/0205860 A1 | 9/2007 | Jones et al. |
| 2007/0205861 A1 | 9/2007 | Nair et al. |
| 2007/0207750 A1 | 9/2007 | Brown et al. |
| 2007/0213048 A1 | 9/2007 | Trauberg |
| 2007/0213090 A1 | 9/2007 | Holmberg |
| 2007/0214492 A1 | 9/2007 | Gopi et al. |
| 2007/0218921 A1 | 9/2007 | Lee et al. |
| 2007/0219926 A1 | 9/2007 | Korn |
| 2007/0220272 A1 | 9/2007 | Campisi et al. |
| 2007/0223403 A1 | 9/2007 | Furuskar et al. |
| 2007/0229260 A1 | 10/2007 | Braun et al. |
| 2007/0229268 A1 | 10/2007 | Swan et al. |
| 2007/0236332 A1 | 10/2007 | Quan et al. |
| 2007/0245157 A1 | 10/2007 | Giobbi et al. |
| 2007/0245158 A1 | 10/2007 | Giobbi et al. |
| 2007/0247366 A1 | 10/2007 | Smith et al. |
| 2007/0250718 A1* | 10/2007 | Lee .................... H04L 63/0861 |
| | | 713/186 |
| 2007/0258626 A1 | 11/2007 | Reiner |
| 2007/0260883 A1 | 11/2007 | Giobbi et al. |
| 2007/0260888 A1 | 11/2007 | Giobbi et al. |
| 2007/0262134 A1 | 11/2007 | Humphrey et al. |
| 2007/0266257 A1 | 11/2007 | Camaisa et al. |
| 2007/0268862 A1 | 11/2007 | Singh et al. |
| 2007/0271194 A1 | 11/2007 | Walker et al. |
| 2007/0271433 A1 | 11/2007 | Takemura |
| 2007/0273517 A1 | 11/2007 | Govind |
| 2007/0277044 A1 | 11/2007 | Graf et al. |
| 2007/0279190 A1 | 12/2007 | Lugt et al. |
| 2007/0280509 A1 | 12/2007 | Owen et al. |
| 2007/0285212 A1 | 12/2007 | Rotzoll |
| 2007/0285238 A1 | 12/2007 | Batra |
| 2007/0287386 A1 | 12/2007 | Agrawal et al. |
| 2007/0288263 A1 | 12/2007 | Rodgers |
| 2007/0288752 A1 | 12/2007 | Chan |
| 2007/0293155 A1 | 12/2007 | Liao et al. |

(56) References Cited

U.S. PATENT DOCUMENTS

| | | |
|---|---|---|
| 2007/0294755 A1 | 12/2007 | Dadhia et al. |
| 2007/0296544 A1 | 12/2007 | Beenau et al. |
| 2007/0300052 A1 | 12/2007 | Jevans |
| 2008/0001724 A1 | 1/2008 | Soleimani et al. |
| 2008/0001783 A1 | 1/2008 | Cargonja et al. |
| 2008/0005432 A1 | 1/2008 | Kagawa |
| 2008/0008359 A1 | 1/2008 | Beenau et al. |
| 2008/0011842 A1 | 1/2008 | Curry et al. |
| 2008/0012685 A1 | 1/2008 | Friedrich et al. |
| 2008/0012767 A1 | 1/2008 | Caliri et al. |
| 2008/0016004 A1 | 1/2008 | Kurasaki et al. |
| 2008/0019578 A1 | 1/2008 | Saito et al. |
| 2008/0028227 A1 | 1/2008 | Sakurai |
| 2008/0028453 A1 | 1/2008 | Nguyen et al. |
| 2008/0040609 A1 | 2/2008 | Giobbi |
| 2008/0046366 A1 | 2/2008 | Bemmel et al. |
| 2008/0046715 A1 | 2/2008 | Balazs et al. |
| 2008/0049700 A1 | 2/2008 | Shah et al. |
| 2008/0056544 A1 | 3/2008 | Aikawa et al. |
| 2008/0061941 A1 | 3/2008 | Fischer et al. |
| 2008/0065181 A1 | 3/2008 | Stevenson |
| 2008/0071577 A1 | 3/2008 | Highley |
| 2008/0072063 A1 | 3/2008 | Takahashi et al. |
| 2008/0077359 A1 | 3/2008 | Ito |
| 2008/0080022 A1 | 4/2008 | Gogulapati |
| 2008/0088475 A1 | 4/2008 | Martin |
| 2008/0090548 A1 | 4/2008 | Ramalingam |
| 2008/0094228 A1 | 4/2008 | Welch et al. |
| 2008/0095359 A1 | 4/2008 | Schreyer et al. |
| 2008/0107089 A1 | 5/2008 | Larsson et al. |
| 2008/0109895 A1 | 5/2008 | Janevski |
| 2008/0111752 A1 | 5/2008 | Lindackers et al. |
| 2008/0125965 A1 | 5/2008 | Carani et al. |
| 2008/0127176 A1 | 5/2008 | Lee et al. |
| 2008/0129450 A1 | 6/2008 | Riegebauer |
| 2008/0129463 A1 | 6/2008 | Tuttle |
| 2008/0141361 A1 | 6/2008 | Balfanz |
| 2008/0142588 A1 | 6/2008 | Blum |
| 2008/0148351 A1 | 6/2008 | Bhatia et al. |
| 2008/0149705 A1 | 6/2008 | Giobbi et al. |
| 2008/0150678 A1 | 6/2008 | Giobbi et al. |
| 2008/0156866 A1 | 7/2008 | McNeal |
| 2008/0159599 A1 | 7/2008 | Kajihara et al. |
| 2008/0164997 A1 | 7/2008 | Aritsuka et al. |
| 2008/0169909 A1 | 7/2008 | Park et al. |
| 2008/0176713 A1 | 7/2008 | Olivera et al. |
| 2008/0180213 A1 | 7/2008 | Flax |
| 2008/0186166 A1 | 8/2008 | Zhou et al. |
| 2008/0188308 A1 | 8/2008 | Shepherd et al. |
| 2008/0195863 A1 | 8/2008 | Kennedy |
| 2008/0201768 A1 | 8/2008 | Koo et al. |
| 2008/0203107 A1 | 8/2008 | Conley et al. |
| 2008/0208016 A1 | 8/2008 | Hughes et al. |
| 2008/0209571 A1 | 8/2008 | Bhaskar et al. |
| 2008/0211627 A1 | 9/2008 | Shinzaki |
| 2008/0214300 A1 | 9/2008 | Williams et al. |
| 2008/0218416 A1 | 9/2008 | Handy et al. |
| 2008/0222701 A1 | 9/2008 | Saaranen et al. |
| 2008/0223918 A1 | 9/2008 | Williams et al. |
| 2008/0228524 A1 | 9/2008 | Brown |
| 2008/0235144 A1 | 9/2008 | Phillips |
| 2008/0238625 A1 | 10/2008 | Rofougaran et al. |
| 2008/0246613 A1* | 10/2008 | Linstrom ......... G08B 13/19695 340/572.4 |
| 2008/0250388 A1 | 10/2008 | Meyer et al. |
| 2008/0251579 A1 | 10/2008 | Larsen |
| 2008/0278325 A1 | 11/2008 | Zimman et al. |
| 2008/0278327 A1 | 11/2008 | Nierenberg et al. |
| 2008/0289018 A1 | 11/2008 | Kawaguchi |
| 2008/0289030 A1 | 11/2008 | Poplett |
| 2008/0289032 A1 | 11/2008 | Aoki et al. |
| 2008/0303637 A1 | 12/2008 | Gelbman et al. |
| 2008/0306759 A1 | 12/2008 | Ilkin et al. |
| 2008/0313728 A1 | 12/2008 | Pandrangi et al. |
| 2008/0314971 A1* | 12/2008 | Faith ................... G06Q 20/322 235/379 |
| 2008/0316002 A1 | 12/2008 | Brunet et al. |
| 2008/0316045 A1 | 12/2008 | Sriharto et al. |
| 2009/0002134 A1 | 1/2009 | McALLISTER |
| 2009/0006846 A1 | 1/2009 | Rosenblatt |
| 2009/0013191 A1 | 1/2009 | Popowski |
| 2009/0016573 A1 | 1/2009 | McAfee et al. |
| 2009/0024584 A1 | 1/2009 | Dharap et al. |
| 2009/0033464 A1 | 2/2009 | Friedrich |
| 2009/0033485 A1 | 2/2009 | Naeve et al. |
| 2009/0036164 A1 | 2/2009 | Rowley |
| 2009/0040041 A1 | 2/2009 | Janetis et al. |
| 2009/0041309 A1 | 2/2009 | Kim et al. |
| 2009/0043253 A1 | 2/2009 | Podaima |
| 2009/0045916 A1 | 2/2009 | Nitzan et al. |
| 2009/0052389 A1 | 2/2009 | Qin et al. |
| 2009/0070146 A1 | 3/2009 | Haider et al. |
| 2009/0070219 A1 | 3/2009 | D'Angelo et al. |
| 2009/0075592 A1 | 3/2009 | Nystrom et al. |
| 2009/0076849 A1 | 3/2009 | Diller |
| 2009/0081996 A1 | 3/2009 | Duggal et al. |
| 2009/0085724 A1 | 4/2009 | Naressi et al. |
| 2009/0085748 A1 | 4/2009 | Barnes et al. |
| 2009/0094681 A1 | 4/2009 | Sadler et al. |
| 2009/0096580 A1 | 4/2009 | Paananen |
| 2009/0115609 A1 | 5/2009 | Weaver |
| 2009/0121890 A1 | 5/2009 | Brown et al. |
| 2009/0125401 A1 | 5/2009 | Beenau et al. |
| 2009/0138953 A1 | 5/2009 | Lyon |
| 2009/0140045 A1 | 6/2009 | Evans |
| 2009/0150762 A1 | 6/2009 | Febonio et al. |
| 2009/0157512 A1 | 6/2009 | King |
| 2009/0160646 A1 | 6/2009 | MacKenzie et al. |
| 2009/0165123 A1 | 6/2009 | Giobbi |
| 2009/0176566 A1 | 7/2009 | Kelly |
| 2009/0177495 A1 | 7/2009 | Abousy et al. |
| 2009/0182582 A1 | 7/2009 | Hammon |
| 2009/0195461 A1 | 8/2009 | Hirt |
| 2009/0199206 A1 | 8/2009 | Finkenzeller et al. |
| 2009/0206992 A1 | 8/2009 | Giobbi et al. |
| 2009/0221301 A1 | 9/2009 | Riley et al. |
| 2009/0232362 A1 | 9/2009 | Otsubo et al. |
| 2009/0237245 A1 | 9/2009 | Brinton et al. |
| 2009/0237253 A1 | 9/2009 | Neuwirth |
| 2009/0239667 A1 | 9/2009 | Rowe et al. |
| 2009/0253516 A1 | 10/2009 | Hartmann et al. |
| 2009/0254448 A1 | 10/2009 | Giobbi |
| 2009/0254971 A1 | 10/2009 | Herz et al. |
| 2009/0264712 A1 | 10/2009 | Baldus et al. |
| 2009/0307764 A1 | 12/2009 | Isobe et al. |
| 2009/0310514 A1 | 12/2009 | Jeon et al. |
| 2009/0313689 A1 | 12/2009 | Nystroem et al. |
| 2009/0319788 A1 | 12/2009 | Zick et al. |
| 2009/0320118 A1 | 12/2009 | Mueller et al. |
| 2009/0322510 A1 | 12/2009 | Berger et al. |
| 2009/0322566 A1 | 12/2009 | Shirakawa |
| 2009/0327102 A1 | 12/2009 | Maniar et al. |
| 2009/0328182 A1 | 12/2009 | Malakapalli et al. |
| 2010/0005526 A1 | 1/2010 | Tsuji et al. |
| 2010/0007498 A1 | 1/2010 | Jackson |
| 2010/0008545 A1 | 1/2010 | Ueki et al. |
| 2010/0022239 A1 | 1/2010 | Anzai |
| 2010/0022308 A1 | 1/2010 | Hartmann et al. |
| 2010/0023074 A1 | 1/2010 | Powers et al. |
| 2010/0037255 A1 | 2/2010 | Sheehan et al. |
| 2010/0039280 A1 | 2/2010 | Holm et al. |
| 2010/0062743 A1 | 3/2010 | Jonsson |
| 2010/0077214 A1 | 3/2010 | Jogand-Coulomb et al. |
| 2010/0091987 A1 | 4/2010 | Takahashi et al. |
| 2010/0117794 A1 | 5/2010 | Adams et al. |
| 2010/0134257 A1 | 6/2010 | Puleston et al. |
| 2010/0169442 A1 | 7/2010 | Liu et al. |
| 2010/0169964 A1 | 7/2010 | Liu et al. |
| 2010/0172567 A1 | 7/2010 | Prokoski |
| 2010/0174911 A1 | 7/2010 | Isshiki |
| 2010/0188226 A1 | 7/2010 | Seder et al. |
| 2010/0214100 A1 | 8/2010 | Page |
| 2010/0277283 A1 | 11/2010 | Burkart et al. |

(56) References Cited

U.S. PATENT DOCUMENTS

| | | |
|---|---|---|
| 2010/0277286 A1 | 11/2010 | Burkart et al. |
| 2010/0289644 A1 | 11/2010 | Slavin et al. |
| 2010/0291896 A1 | 11/2010 | Corda |
| 2010/0305843 A1 | 12/2010 | Yan et al. |
| 2010/0328033 A1 | 12/2010 | Kamei |
| 2010/0330958 A1 | 12/2010 | Corda et al. |
| 2011/0034160 A1 | 2/2011 | Corda et al. |
| 2011/0072034 A1 | 3/2011 | Sly et al. |
| 2011/0072132 A1 | 3/2011 | Shafer et al. |
| 2011/0080264 A1 | 4/2011 | Clare et al. |
| 2011/0082735 A1 | 4/2011 | Kannan et al. |
| 2011/0085287 A1 | 4/2011 | Ebrom et al. |
| 2011/0091136 A1 | 4/2011 | Danch et al. |
| 2011/0105854 A1 | 5/2011 | Kiani et al. |
| 2011/0116358 A9 | 5/2011 | Li et al. |
| 2011/0121964 A1 | 5/2011 | Bannard |
| 2011/0126188 A1 | 5/2011 | Bernstein et al. |
| 2011/0169668 A1 | 7/2011 | Henriksson |
| 2011/0181443 A1 | 7/2011 | Gutierrez et al. |
| 2011/0221568 A1 | 9/2011 | Giobbi |
| 2011/0227740 A1 | 9/2011 | Wohltjen |
| 2011/0238517 A1 | 9/2011 | Ramalingam et al. |
| 2011/0246790 A1 | 10/2011 | Koh et al. |
| 2011/0266348 A1 | 11/2011 | Denniston, Jr. |
| 2011/0307599 A1 | 12/2011 | Saretto et al. |
| 2012/0016305 A1 | 1/2012 | Jollota et al. |
| 2012/0028609 A1 | 2/2012 | Hruska |
| 2012/0030006 A1 | 2/2012 | Yoder et al. |
| 2012/0069776 A1 | 3/2012 | Caldwell et al. |
| 2012/0086571 A1 | 4/2012 | Scalisi et al. |
| 2012/0161936 A1 | 6/2012 | Yoon et al. |
| 2012/0182123 A1 | 7/2012 | Butler et al. |
| 2012/0212322 A1 | 8/2012 | Idsoee |
| 2012/0226451 A1 | 9/2012 | Bacot et al. |
| 2012/0226565 A1 | 9/2012 | Drozd |
| 2012/0226907 A1 | 9/2012 | Hohberger et al. |
| 2012/0238287 A1 | 9/2012 | Scherzer |
| 2012/0278188 A1 | 11/2012 | Attar et al. |
| 2012/0300753 A1 | 11/2012 | Brown et al. |
| 2012/0310720 A1 | 12/2012 | Balsan et al. |
| 2013/0019295 A1 | 1/2013 | Park et al. |
| 2013/0019323 A1 | 1/2013 | Arvidsson et al. |
| 2013/0044111 A1 | 2/2013 | Vangilder et al. |
| 2013/0111543 A1 | 5/2013 | Brown et al. |
| 2013/0135082 A1 | 5/2013 | Xian et al. |
| 2013/0179201 A1 | 7/2013 | Fuerstenberg et al. |
| 2013/0219186 A1 | 8/2013 | Giobbi et al. |
| 2013/0276140 A1 | 10/2013 | Coffing et al. |
| 2013/0277425 A1 | 10/2013 | Sharma et al. |
| 2013/0297514 A1 | 11/2013 | Giobbi |
| 2013/0312082 A1 | 11/2013 | Izu et al. |
| 2013/0315210 A1 | 11/2013 | Brown et al. |
| 2013/0331063 A1 | 12/2013 | Cormier et al. |
| 2014/0074696 A1 | 3/2014 | Glaser |
| 2014/0147018 A1 | 5/2014 | Argue et al. |
| 2014/0256511 A1 | 9/2014 | Smith |
| 2014/0266604 A1 | 9/2014 | Masood et al. |
| 2014/0266713 A1 | 9/2014 | Sehgal et al. |
| 2014/0337920 A1 | 11/2014 | Giobbi |
| 2015/0026480 A1 | 1/2015 | Giobbi et al. |
| 2015/0039451 A1 | 2/2015 | Bonfiglio |
| 2015/0138330 A1 | 5/2015 | Krishnamoorthi |
| 2015/0294293 A1 | 10/2015 | Signarsson |
| 2015/0310385 A1 | 10/2015 | King et al. |
| 2015/0310440 A1 | 10/2015 | Hynes et al. |
| 2016/0005020 A1 | 1/2016 | Fernando et al. |
| 2016/0093081 A1 | 3/2016 | Kim et al. |
| 2016/0133123 A1 | 5/2016 | Giobbi et al. |
| 2016/0171200 A1 | 6/2016 | Giobbi |
| 2016/0203349 A1 | 7/2016 | Giobbi |
| 2016/0205682 A1 | 7/2016 | Brown et al. |
| 2016/0210614 A1 | 7/2016 | Hall |
| 2016/0300236 A1 | 10/2016 | Wiley et al. |
| 2016/0306956 A1 | 10/2016 | Giobbi |
| 2017/0041315 A1 | 2/2017 | Giobbi |
| 2017/0085564 A1 | 3/2017 | Giobbi et al. |
| 2017/0091548 A1 | 3/2017 | Agrawal et al. |
| 2017/0221327 A1 | 8/2017 | Wu et al. |
| 2017/0270738 A1 | 9/2017 | Giobbi |
| 2017/0309165 A1 | 10/2017 | Brown et al. |
| 2017/0353500 A1 | 12/2017 | Jacobsen et al. |
| 2018/0019998 A1 | 1/2018 | Giobbi |
| 2018/0129799 A1 | 5/2018 | Giobbi |
| 2018/0322718 A1 | 11/2018 | Qian et al. |
| 2018/0357475 A1 | 12/2018 | Honda et al. |
| 2019/0065721 A1 | 2/2019 | Giobbi |
| 2019/0172281 A1 | 6/2019 | Einberg et al. |
| 2019/0260724 A1 | 8/2019 | Hefetz et al. |
| 2019/0289562 A1 | 9/2019 | Brown |
| 2020/0351873 A1 | 11/2020 | Brown et al. |
| 2021/0219869 A1 | 7/2021 | Ryu et al. |
| 2021/0241592 A1 | 8/2021 | Allen et al. |
| 2022/0210643 A1 | 6/2022 | Hynds et al. |

FOREIGN PATENT DOCUMENTS

| | | | |
|---|---|---|---|
| EP | 1600885 A1 | 11/2005 | |
| EP | 2937805 A1 | 10/2015 | |
| JP | 10-049604 A | 2/1998 | |
| WO | 90/06633 A1 | 6/1990 | |
| WO | 99/56429 A1 | 11/1999 | |
| WO | 00/62505 A1 | 10/2000 | |
| WO | 01/22724 A1 | 3/2001 | |
| WO | 01/35334 A1 | 5/2001 | |
| WO | 01/48714 A1 | 7/2001 | |
| WO | 01/75876 A1 | 10/2001 | |
| WO | 01/77790 A1 | 10/2001 | |
| WO | WO/2002/067009 | 8/2002 | |
| WO | 2004/010774 A1 | 2/2004 | |
| WO | 2004/038563 A2 | 5/2004 | |
| WO | WO-2005031663 A2 * | 4/2005 | ........... G06Q 20/327 |
| WO | 2005/050450 A1 | 6/2005 | |
| WO | 2005/086802 A2 | 9/2005 | |
| WO | 2005/104584 A1 | 11/2005 | |
| WO | 2007/008540 A2 | 1/2007 | |
| WO | 2007/087558 A2 | 8/2007 | |

OTHER PUBLICATIONS

University of Birmingham, "PRISM: Probabilistic Symbolic Model Checker," at least as early as Aug. 3, 2004, 3 pgs., archived at https://web.archive.org/web/20040803193058/http://www.cs.bham. ac.uk/~dxp/prism/casestudies/index.html.

Unixhelp, "Whal is a file?" Apr. 30, 1998, retrieved from unixhelp. ed.ac.uk/editors/whatisafile.html accessed Mar. 11, 2010 via http:// waybackmachine.org/19980615000000*/http://unixhelp.ed.ac.uk/ editors/whatisafile.html on Mar. 11, 2011, 1 pg.

Vainio, "Bluetoolh Security," Helsinki University of Technology, May 25, 2000, 17 pgs.

Van Winkle, "Bluetooth: The King of Connectivity," Laptop Buyer's Guide and Handbook, Jan. 2000, pp. 148-153.

Wade, "Using Fingerprints to Make Payments at POS Slowly Gaining Popularity," Credit Union Journal, International Biometric Group, Apr. 21, 2003, retrieved from http://www.biometricgroup. com/in_the_news/04.21.03.html on Jan. 7, 2007, 3 pgs.

Wallace, "The Internet Unplugged," InformationWeek, vol. 765, No. 22, Dec. 13, 1999, pp. 22-24.

Weber, "In the Age of Napster, Protecting Copyright is a Digital Arms Race," Wall Street Journal, Eastern ed., Jul. 24, 2000, p. B1.

Weissman, "Indoor Location," Tadlys Ltd. white paper, at least as early as Oct. 31, 2004, 15 pgs., archived at https://web.archive.org/ web/20041031125859/http:/www.tadlys.com/media/downloads/ Indoors_Location_Systems.pdf.

White, "How computers Work," Millennium Edition, 1999, Que Corporation, Indianapolis, IN, all pages.

Yoshida, "Content Protection Plan Targets Wireless Home Networks," EE Times, Jan. 11, 2002, retrieved from www.eetimes.com/ story/OEG20020111S0060 on Mar. 4, 2002, 2 pgs.

Zhang et al., "A User-Centric M-Payment Solution," The ISG-Smart Card Centre and the Information Security Group, Royal Holloway, University of London, Egham, Surrey, TW20 0EX, UK, 2005, 8 pgs.

(56) References Cited

OTHER PUBLICATIONS

Zigbee Alliance, "The ZigBeeTM Buzz Is Growing: New Low-Power Wireless Standard Opens Powerful Possibilities," Electronic Design, Jan. 12, 2004, 12 pgs., archived at https://web.archive.org/web/20040411172015/ http://www.elecdesign.com/Files/29/7186/7186_01.pdf.

Zigbee Alliance, "Welcome to the ZigBeeTM Alliance," exemplary web page, at least as early as Sep. 24, 2004, 2 pgs., archived at https://web.archive.org/web/20040924045517/http://zigbee.org/.

Zigbee Alliance, "ZigBee Specification," ZigBee Document 053474r06, Version 1.0, Dec. 14, 2004, 378 pgs.

Zigbee Alliance, "ZigBeeTM Positioned to Drive Wireless Networking in Building Automation, Industrial and Residential Control and Sensors Markets in 2004," press release, Feb. 17, 2004, 3 pgs., archived at https://web.archive.org/web/20040423220244/http:/www.zigbee.org/documents/04036r5ZB_MWG-Momentum-Release_FINAL.pdf.

"IEEE." IEEE Standards: Get IEEE 801 (TM) Wireless Lans IEEE 802, 2004, web.archive. org/web/200404141121 001 standards. IEEE. org:80/getieee802.

"802.15.3b Part 15.3: Wireless Medium Access Control (MAC) and Physical Layer (PHY) Specifications for High Rate Wireless Personal Area Networks (WPANs)." IEEE-SA Standards Board, May 5, 2006.

"Get IEEE 802 Update." Nov. 9, 2018. 8 pgs.

"IEEE Standards Association." Terms of Use for IEEE Standards Publications Delivered in Electronic Form, IEEE, 2005, https:/ /web.archive.org/web/20050529084555/standards.ieee.org:80/getieee802/download/.

"IEEE." "get IEEE 802"(Tm) Home Page 2003, web.archive.org/web/20031008112815/standards.ieee.org:80/getieee802/.

"IEEE." Welcome to Standards Information Network, Jun. 3, 2004, web.archive.org/web/20040603154924/standards.ieee.org:80/standardspress/.

Cai, et al. "A Novel Design of IEEE 802.15.3 Mac over UWB." IEEE 60th Vehicular Technology Conference, 2004. VTC2004-Fall. 2004, vol. 7, pp. 5297-5301, doi:10.1109/vetecf.2004.1405113.

Cooklev, Todor. "A Study of IEEE 802.11, 802.15, and 802.16." Wireless Communication Standards, Standards Information Network, IEEE Press, New York, NY, 2004, pp. 1-200.

Gilb, James P. K. "Draft Running Comment Resolution." IEEE P802.15 Working Group for Wireless Personal Area Networks (WPANs), Oct. 10, 2004, pp. 1-27.

Gilb, James P. K. Wireless Multimedia: A Guide to the IEEE 802.15.3 Standard. Standards Information Network, IEEE Press, 2004.

Guo, et al. "Intra-Superframe Power Management for IEEE 802. 15.3 WPAN." IEEE Communications Letters, vol. 9, No. 3, Mar. 2005, pp. 228-230, doi:10.1109/lcomm.2005.03023.

IEEE Computer Society, "IEEE Std 802.15.3 - Part 15.3: Wireless Medium Access Control (MAC) and Physical Layer (PHY) Specifications for High Rate Wireless Personal Area Networks (WPANs)," The Institute of electrical and Electronics Engineers, Inc., New York, NY, Oct. 1, 2003, 324 pgs.

Petition for Inter Partes Review of U.S. Pat. No. 10,698,989, Mar. 18, 2025, 99 pgs.

Petition for Inter Partes Review of U.S. Pat. No. 8,219,129, Dec. 23, 2024, 102 pgs.

Petition for Inter Partes Review of U.S. Pat. No. 8,457,672, Dec. 23, 2024, 94 pgs.

Petition for Inter Partes Review of U.S. Pat. No. 9,049,188, Feb. 7, 2025, 84 pgs.

Petition for Inter Partes Review of U.S. Pat. No. 9,265,043, Dec. 23. 2024, 94 pgs.

Wang et al. "Comparison of IEEE 802.11e and IEEE 802.15.3 MAC," 2004, pp. 675-680.

Zeng RanRan and Kuo, Geng-Sheng. "A Novel Scheduling Scheme and Mac Enhancements for IEEE 802.15.3 High-Rate WPAN." IEEE Wireless Communications and Networking Conference, 2005, vol. 4, pp. 2478-2483, doi:10.1109/wcnc.2005.1424903.

"How to find the serial number on TP-Link devices," https://www.tp-link.com/us/support/faq/503/ (last visited Apr. 15, 2024), 3 pgs.

Google Pixel Serial Number Guide, HomeServe webpage, https://www.homeserve.com/en-us/customers/find-serial-numberdevice-type/google/, 3 pgs.

NPL Search Terms (Year: 2024).

Product Identification Codes, https://www.uc.edu/content/dam/uc/ce/docs/OLLI/Page%20Content/PRODUCT%20IDENTIFICATION%20CODES%20BAR%20QR.pdf, last visited Apr. 19, 2024, 88 pgs.

Specification of the Bluetooth System, Wireless Connections Made Easy, v 1.0 B, Dec. 1, 1999, 440 pgs., Dec. 1, 1999.

UK IT Security Evaluation and Certification Scheme, UK IT Security Evaluation and Certification Scheme, Certification Report No. P165, Sony FeliCa Contactless Smart Card, Issue 1.0, Mar. 2002, 27 pgs., Mar. 1, 2002.

Adams, "Designing with 802.15.4 and Zigbee," presented at Industrial Wireless Applications Summit, San Diego, California, Mar. 9, 2004, 22 pgs.

Adams, "Meet the ZigBee Standard," Sensors Online, Jun. 2003, 7 pgs., archived at https://web.archive.org/web/20031008191032/http:/sensorsmag.com/articles/0603/14/pf_main.shtml.

Adams, "Zigbee vital in industrial applications," EE Times, Jul. 29, 2003, 3 pgs., archived at https://web.archive.org/web/20031013062940/http:/www.eetimes.com/story/OEG20030727S0002.

Agourare et al., "Authentication and location control via RFID analysis," 2009 IEEE Conference on Emerging Technologies & Factory Automation, Sep. 1, 2009, 8 pgs.

Anonymous, "Applying Biometrics to Door Access," Security Magazine, Sep. 26, 2002, retrieved from http://www.securitymagazine.com/CDA/Articles/Technologies/3ae610eaa34d8010Vgn VCM100000f932a8cO on Jan. 7, 2007, 5 pgs.

Anonymous, "BluePayz: A Seamless Payment Method Using Bluetooth-Enabled Mobile Phones," IP.com Publication Date Jun. 20, 2003, 2003, https://priorart.ip.com/1 PCOM/000015495 (Year: 2003).

Anonymous, "Firecrest Shows Flow Truly Commercially-Minded Companies Will Exploit the Internet," Computergram International, Jan. 18, 1996, 2 pgs.

Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.

Antonoff, "Visiting Video Valley," Sound & Vision, Nov. 2001, pp. 116, 118-119.

Apple et al., "Smart Card Setup Guide," 2006, downloaded from http://manuals.info.apple.com/en_US/Smart_Card_Setup_Guide.pdf on or before May 3, 2012, 16 pgs.

Balanis, "Antenna Theory: A Review," Jan. 1992, Proceedings of the IEEE, vol. 80, No. 1, p. 13.

Beaufour, "Personal Servers as Digital Keys," Proceedings of the Second IEEE Annual Conference on Pervasive Computing and Communications (PERCOM'04), Mar. 14-17, 2004, pp. 319-328.

Biopay, LLC, "Frequently Asked Questions (FAQs) About BioPay," retrieved from http://www.biopay.com/faqs-lowes.asp on Jan. 7, 2007, 5 pgs.

Blip Systems, "Mar. 8, 2004—Bluetooth at the office?" at least as early as Oct. 11, 2004, archived at https://web.archive.org/web/20041011094320/http:/www.blipsystems.com/Default.asp? ID=16&M=News&PID=25&NewsID=9.

Blip Systems, "BlipManager," at least as early as May 17, 2004, 1 pg., archived at https://web.archive.org/web/20040517050728/http:/www.blipsystems.com/Default.asp?ID=11.

Blip Systems, "BlipMobility," at least as early as Apr. 7, 2004, archived at https://web. archive. org/web/20040407212934/http:/www. blipsystems. com/Default.asp?ID=1 18.

Blip Systems, "BlipNet API," at least as early as May 18, 2004, 1 pg., archived at https://web.archive.org/web/20040518060132/http:/www.blipsystems.com/Default.asp?ID=92.

Blip Systems, "BlipNet Explore a wireless world . . . of great opportunities," brochure available Sep. 2002, 6 pgs., availabe online at https://web.archive.org/web/20031012184406/http:/www.blipsystems.com/products_blipnet.shtml.

(56)          References Cited

OTHER PUBLICATIONS

Blip Systems, "BlipNet Technical Overview," Mar. 2003, 30 pgs., archived at https://web.archive.org/web/20031012184406/http:/www.blipsystems.com/products_blipnet.shtml.
Blip Systems, "BlipNode," at least as early as May 16, 2004, 1 pg., archived at https://web.archive.org/web/20040516001554/http:/www.blipsystems.com/Default.asp?ID=10.
Blip Systems, "BlipServer," at least as early as May 17, 2004, 1 pg., archived at https://web.archive.org/web/20040517044955/http:/www.blipsystems.com/Default.asp?ID=9.
Blip Systems, "Bluetooth Networks: Products: Bluetooth infracture," product description, at least as early as Oct. 2003, archived at https://web.archive.org/web/20031012184406/http:/www.blipsystems.com/products_blipnet.shtml.
Blip Systems, "Product Information—BlipNet—Presentation of BlipNet 1.0—A Bluetooth Access System," Aug. 2002, 2 pgs., archived at https://web.archive.org/web/20031012184406/http:/www.blipsystems.com/products_blipnet.shtml.
Blip Systems, BlipMobihty, at least as early as Apr. 7, 2004, archived at https://web. archive. org/web/20040407212934/http:/www. blipsystems.com/Default.asp?ID=1 18.
Blueproximity, "BlueProximity- Leave it- it's locked, come back, it's back too . . . " Aug. 26, 2007, retrieved from http://blueproximity.sourceforge.net/viahttp://www.archive.org/ on or before Oct. 11, 2011, 1 pg.
Bluetooth SIG, Inc. "Specification of the Bluetooth System," Version 1.2, Nov. 5, 2003, 82 pgs., archived at https://web.archive.org/web/20031119092849/http:/www.bluetooth.com/dev/spec.v12.asp.
Bluetooth SIG, Inc., "Bluetooth," www.bluetooth.com, Jun. 1, 2000, 8 pgs.
Bluetooth SIG, Inc., "Say Hello to Bluetooth," retrieved from www.bluetooth.com, at least as early as Jan. 14, 2005, 4 pgs.
Blum, "Digital Rights Management May Solve the Napster 'Problem,'" Technology Investor, Oct. 2000, pp. 24-27.
Bohrsatom et al., "Automatically unlock PC when entering proximity," Dec. 7, 2005, retrieved from http://salling. com/forums/viewtopic.php?t=3190 on or before Oct. 11, 2011, 3 pgs.
Brown, "Techniques for Privacy and Authentication in Personal Communication Systems," Personal Communications, IEEE, Aug. 1995, vol. 2, No. 4, pp. 6-10.
Callaway, "Wireless Sensor Networks: Architectures and Protocols," book description, Motorola Labs, Auerbach Publications, Aug. 26, 2003, 3 pgs., archived at https://web.archive.org/web/20031023101953/http:/www.crcpress.com/shopping cart/products/product detail.asp? sku=AU1823.
Callaway, Wireless Sensor Networks: Architectures and Protocols, Jan. 1, 2004, Auerbach Publications, 366 pgs.
Chen et al."On Enhancing Biometric Authentication with Data Protection." KES2000. Fourth International Conference on Knowledge-Based Intelligent Engineering Systems and Allied Technologies. Proceedings (Cat. No. 00TH8516), vol. 1, Aug. 1, 2000, pp. 249-252.
Chi et al., "Industrial Wireless Sensor Networking: A Market Dynamics Study," ON World, Jun. 28, 2004, 5 pgs., archived at https://web.archive.org/web/20040710182216/http:/onworld.com:80/html/industrialwirelesssensor.htm.
Cisco Systems, Inc., "Antenna Patterns and Their Meaning," 1992-2007, p. 10.
Costa, "Imation USB 2.0 Micro Hard Drive," Nov. 22, 2005, retrieved from http://www.pcmag.com/article2/0,2817,1892209,00.asp on or before Oct. 11, 2011, 2 pgs.
Dagan, "Power over Ethernet (POE) Midspan—The Smart Path to Providign Power for IP Telephony," Product Manager, Systems, Aug. 2005, Power Dsine Inc., 28 pgs.
Dai et al., "Toward Blockchain-Based Accounting and Assurance," Journal of Information Systems, vol. 31, No. 3, Fal 2017, pp. 5-21.
David et al., Security Issues for Contactless Smart Cards, Sep. 1, 1997, conference paper, available online at https://link.springer.com/chapter/10.1007/BFb0054029, 6 pgs.

Debow, "Credit/Debit Debuts in Midwest Smart Card Test," Computers in Banking, vol. 6, No. 11, Nov. 1989, pp. 10-13.
Dennis, "Digital Passports Need Not Infringe Civil Liberties," Newsbytes, NA, Dec. 2, 1999, 2 pgs.
Derfler, "How Networks Work," Bestseller Edition, 1996, Ziff-Davis Press, Emeryville, CA, all pages.
Disclosed Anonymously (Method and Apparatus for Mobile Identity Authentication)., An IP.com Prior Art Database Technical IP.com No. IPCDM000194545D., IP.com Electronic Publication Date: Mar. 29, 2010 (Year: 2010).
Duflot et al., "A Formal Analysis of Bluetooth Device Discovery," presented at the 1st International Symposium on Leveraging Applications of Formal Methods (ISOLA'04), Oct. 30-Nov. 2, 2004, Paphos, Cyprus, and published in the International Journal on Software Tools for Technology Transfer 8, pp. 621-632,16 pgs., https://doi.org/10.1007/sl0009-006-0014-x.
Dvorak, IEEE 802.15.4 and Zigbee Overview, Sep. 27, 2005, Motorola, 26 pgs.
Eshed, "Bluetooth Wireless Technology Application for the Retail Market," published at www.tadlys.com on May 2001, 8 pgs.
Farouk et al., "Authentication Mechanisms in Grid Computing Environment: Comparative Study," IEEE, Oct. 2012, p. 1-6.
FASCA, "S3, Via Formalize Agreement," Electronic News, The Circuit, 45(45, Nov. 8, 1999), p. 20.
Machine generated English translation of JPH10049604 Shimadzu Corp. published Feb. 20, 1998. 33 pages, downloaded from Espacenet on Nov. 13, 2017.
Micronas, "Micronas and Thomson Multimedia Showcase a New Copy Protection System that Will Drive the Future of Digital Television," www.micronas.com: Jan. 8, 2002, 3 pgs.
MIT Computer Science and Artificial Intelligence Laboratory, "Cricket v2 User Manual," Cricket Project, MIT Computer Science and Artificial Intelligence Lab, Cambridge, MA, Jan. 2005, 57 pgs., available online at https://web.archive.org/web/20041206144922/http:/cricket.csail.mit.edu/v2man.html.
Motorola, Inc., "Motorola First to Demonstrate ZigBee 2.4 GHz Wireless Networking Technology," press release, Mar. 27, 2003, 2 pgs., archived at https://web.archive.org/web/20050205053308/http:/www.motorola.com/mediacenter/news/detail/0, 1958,2743_2228 23,00.html.
Muller, "Desktop Encyclopedia of the Internet," 1999, Artech House Inc., Norwood, MA, all pages.
National Criminal Justice Reference Service, "Antenna Types," Dec. 11, 2006, online at http://ncjrs.gov/pdffiles1/nij/185030b.pdf, retrieved from http://web.archive.erg/web/*/http://www.ncjrs.gov/pdffiles1/nij/185030b.pdf on Jan. 12, 2011, 1 pg.
Nel et al., "Generation of Keys for use with the Digital Signature Standard (DSS)," Communications and Signal Processing, Proceedings of the 1993 IEEE South African Symposium, Aug. 6, 1993, pp. 6-11.
Nerd Vitiles, "magicJack: Could It Be the Asterisk Killer?" Aug. 1, 2007, retrieved from http://nerdvilles.com/index.php7p=187 on or before Oct. 11, 2011, 2 pgs.
Nilsson et al., "Match-on-Card for Java Cards," Precise Biometrics, white paper, Apr. 2004, retrieved from www.ibiaorg/membersadmin/whitepapers/pdf/17/Precise%20Match-on-Card%20for%20Java%20Cards.pdf on Jan. 7, 2007, 5 pgs.
Noore, "Highly Robust Biometric Smart Card Design." IEEE Transactions on Consumer Electronics, vol. 46, No. 4, Nov. 2000, pp. 1059-1063.
Nordin, "Match-on-Card Technology," Precise Biometrics, white paper, Apr. 2004, retrieved from www.ibia.org/membersadmin/whitepapers/pdf/17/Precise%20Match-on-Card%2otechnology.pdf on Jan. 7, 2007, 7 pgs.
NPL Search Terms (Year: 2023).
Paget, "The Security Behind Secure Extranels," Enterprise Systems Journal, vol. 14, No. 12, Dec. 1999, 4 pgs.
Pash, "Automate proximity and location-based computer actions," Jun. 5, 2007, retrieved from http://lifehacker.com/265822/automate-proximity-and-location+based-computer-actionson or before Oct. 11, 2011, 3 pgs.

(56) References Cited

OTHER PUBLICATIONS

PCT International Preliminary Report and Written Opinion of the International Searching Authority, Application No. PCT/US2008/087835, mailing date Jul. 1, 2010, 8 pages.

Petition for Inter Partes Review of U.S. Pat. No. 10,698,989, Aug. 26, 2021, 3356 pgs.

Petition for Inter Partes Review of U.S. Pat. No. 8,352,730, Aug. 26, 2021, 2450 pgs.

Petition for Inter Partes Review of U.S. Pat. No. 9,049,188, Aug. 26, 2021, 800 pgs.

Petition for Inter Partes Review of U.S. Pat. No. 9,235,700, Aug. 26, 2021, 466 pgs.

Petition for Inter Partes Review of U.S. Pat. No. 9,298,905, Aug. 26, 2021, 1941 pgs.

Pope et al., "Oasis Digital Signature Services: Digital Signing without the Headaches," IEEE Internet Computing, vol. 10, Sep./Oct. 2006, pp. 81-84.

Priyantha, "The Cricket Indoor Location System," Ph.D. thesis submitted to Department of Electrical Engineering and Computer Science, Massachusetts Institute of Technology, Jun. 2005, 199 pgs.

Request for Ex Parte Reexamination of U.S. Pat. No. 10,698,989, Jun. 8, 2022, 1505 pgs.

Request for Ex Parte Reexamination of U.S. Pat. No. 8,352,730, Jun. 8, 2022, 1401 pgs.

Request for Ex Parte Reexamination of U.S. Pat. No. 9,298,905, Jun. 8, 2022, 1123 pgs.

Rodriguez et al., "In-building location using Bluetooth," Proceedings of the International Workshop on Wreless Ad-Hoc Networks (IWWAN 2005), May 23-26, 2005, London, England, 7 pgs.

Saflink Corporation, "SAFModule (Trademark): A Look Into Strong Authentication," white paper, retrieved from www.ibia.org/membersadmin/whilepapers/pdf/6/SAFmod_WP.pdf on Jan. 7, 2007, 8 pgs.

Sapsford, "E-Business: Sound Waves Could Help Ease Web-Fraud Woes," Wall Street Journal, Aug. 14, 2000, p. B1.

Schneier, Applied Cryptography, Second Edition: Protocols, Algorithms, and Source Doe in C, Jan. 1, 1996, John Wley & Sons, Inc., 1027 pgs.

Serrao et al., "Protecting Digital Music Delivery and Consumption using the OCCAMM Project Framework," Proceedings of the Second International Conference on Web Delivering of Music, 2002, pp. 38-45, doi: 10.1109/WDM.2002.1176192.

Singh et al. "A Constraint-Based Biometric Scheme on ATM and Swiping Machine." 2016 International Conference on Computational Techniques in Information and Communication Technologies (ICCTICT), Mar. 11, 2016, pp. 74-79.

Smart Card Alliance, "Alliance Activities: Publications: Identity: Identity Management Systems, Smart Cards anc Privacy," 1997-2007, retrieved from www.smartcardalliance.org/pages/publications-identity on Jan. 7, 2007, 3 pgs.

Smart Card Alliance, "Contactless Technology for Secure Physical Access: Technology and Standards Choices," Smart Card Alliance, Oct. 2002, pp. 1-48.

Smart Card Alliance, "Smart Cards and Biometrics White Paper: Smart Card Alliance," May 2002, retrieved from http://www.securitymanagement.com/library/smartcard faqtech0802.pdf on Jan. 7, 2007, 7 pgs.

Smart Card Alliance, Contactless Payment and the Retail Point of Sale: Applications, Technologies and Transaction Models, Mar. 1, 2003, a Smart Card Alliance Report, 50 pgs.

Smart Card Alliance, Smart Card Alliance—The Alliance, Jan. 22, 2001, http://www.smartcardalliance.org, 1 pg.

SplashID, "SplashID—Secure Password Manager for PDA's and Smartphones," Mar. 8, 2007, retrieved from http://www.splashdata/com/splashid/ via http://www.archive.org/ on or before Oct. 11, 2011, 2 pgs.

Srivastava, "Is internet security a major issue with respect to the slow acceptance rate of digital signatures," Jan. 2, 2005, Computer Law & Security Report, pp. 392-404.

Tadlys Ltd., "'Hotspot' Gaming Arcade," at least as early as Dec. 9, 2004, 2 pgs., archived at https://web.archive.org/web/20041209234518/http://www.tadlys.com/media/downloads/Tadlys_gaming_arcade.pdf.

Tadlys Ltd., "About Tadlys," at least as early as Apr. 5, 2001, 1 pg., archived at https://web.archive.org/web/20010405044249/http:/www.tadlys.com/about.html.

Tadlys Ltd., "An Advertisers' Dream—From direct marketing to sales," Nov. 2004, 2 pgs., archived at https://web.archive.org/web/20041101092944/http://www.tadlys.com/media/downloads/m-commerce_app.pdf.

Tadlys Ltd., "Bluetooth Glossary," at least as early as Jun. 2004, 12 pgs., archived at https://web.archive.org/web/20040531082349/http://www.tadlys.com/pages/Downloads_content.asp?intGlobalId=1.

Tadlys Ltd., "First Demo of Distribution and Redemption of e-Coupons over Bluetooth," Tadlys Company News anc Events, Jun. 5, 2001, 1 pg., archived at https://web.archive.org/web/20040601051516/http://tadlys.com/Pages/news_content.asp?iGlobalID=17.

Tadlys Ltd., "Indoor Location Networks," at least as early as Apr. 3, 2004, 1 pg., archived at https://web. archive.org/web/20040403200221/http:/www.tadlys.com/Pages/Product_content.asp?iGlobalId=2.

Tadlys Ltd., "Operator Systems," at least as early as Nov. 1, 2004, 2 pgs., archived at https://web.archive.org/web/20041101101402/http://www.tadlys.com/media/downloads/operator_network.pdf.

Tadlys Ltd., "Tadlys Announces Range of Bluetooth Access Network Solutions," Tadlys Company News and Events, Jan. 22, 2001, 1 pg., archived at https://web.archive.org/web/20040624122319/http://www.tadlys.com/Pages/news_content.asp?iGloballID=16.

Tadlys Ltd., "Tadlys' Wire free networking solutions," Feb. 2001, 2 pgs., archived at https://web.archive.org/web/20010204012700/http:/www.tadlys.com/solutions.html.

Tadlys Ltd., "Wireless hospital network," at least as early as Jul. 1, 2004, 2 pgs., archived at https://web.archive.org/web/20040701105046/http://www.tadlys.com/media/downloads/tadlys_hospital_wireless_network.pdf.

Tadlys Ltd., "Wireless Museum Information," at least as early as Dec. 12, 2005, 2 pgs., archived at https://web.archive.org/web/20051212162456/http://www.tadlys.com/media/downloads/Tadlys_wireless_museum_network.pdf.

Tadlys Ltd., "Corporate Systems," at least as early as Nov. 1, 2004, 2 pgs., archived at https://web.archive.org/ web/20041101095441/http://www.tadlys.com/media/downloads/Corporate_network.pdf.

Thomson Multimedia, "Thomson multimedia unveils copy protection proposal designed to provide additional laye of digital content security," retrieved from www.thompson-multimedia.com/gb/06/c01/010530.htm on Mar. 4, 2002, May 30, 2001, 2 pgs.

Fasca, Chad, "The Circuit," Electronic News, 45(45) (Nov. 8, 1999), 20.

Feng Bao, et al., "Design of portable mobile devices based e-payment system and e-ticketing system with digital signature," 2001 International Conferences on Info-Tech and Info-Net. Proceedings (Cat. No. 01 EX479), Beijing, China, 2001, pp. 7-12 vol. 6, doi:10.1109/ICII.2001.982996. (Year: 2001).

Freescale Semicondutor, Inc., "Freescale Events," see ZigBee Open House Event, Aug. 18, 2004, 6 pgs., archived at https://web.archive.org/web/20040909082726/https://www.freescale.com/webapp/sps/site/overview.jsp? nodeId=02XPgQ7JgbBqJQ#zigbee_openhouse_04.

Freescale Semiconductor, Inc., "Overview," ZigBee General Information, at least as early as Aug. 17, 2004, 1 pg., archived at https://web.archive.org/web/20040817210006/http:/www.freescale.com/webapp/sps/site/overview.jsp? nodeId=02XPgQhHPRjdyB37087725.

Freescale Semiconductor, Inc., "ZigBeeTM," Freescale Semiconductor Wireless Standards, at least as early as Aug. 18, 2004, 2 pgs., archived at https://web.archive.org/web/20040818075046/http:/www.freescale.com/webapp/sps/site/overview.jsp? nodeId=02XPgQhHPRjdyB.

Freescale Semiconductor, Inc., "ZigBeeTM," Freescale Semiconductor Wireless Standards, at least as early as Jun. 11, 2004, 2 pgs.,

(56)          References Cited

OTHER PUBLICATIONS archived at https://web.archive.org/web/20040611051834/http:/e-www.motorola.com/webapp/sps/site/overview.jsp? nodeId=02XPgQhHPRjdyB.

Freescale Semiconductor, Inc., "Freescale's ZigBeeTM-ready Platform Wins Sensors Magazine Best of Sensors Expo Award," Freescale Semiconductor Wireless, at least as early as Aug. 17, 2004, 1 pg., archived at https://web.archive.org/web/20040817203409mp_/http:/www.freescale.com/webapp/sps/site/overview.jsp? nodeId=02XPgQ6988.

Freescale Semiconductor, Inc., "ZigBee Alliance Successfully Concludes First Multi-node Network Test," press release, Jul. 6, 2004, 2 pgs., archived at https://web.archive.org/web/20040717113733/http:/www.zigbee.org/documents/First-Multi-Node_Testing_FINAL_000.pdf.

Freescale Semiconductor, Inc., "ZigBeeTM Technology from Freescale," Freescale Semiconductor, Inc. white paper, 2004, 4 pgs., archived at https://web.archive.org/web/20050513024652/http:/www.freescale.com/files/wireless comm/doc/brochure/BRZIGBEETECH.pdf.

Freescale Semiconductor, Inc., "ZRP-1 : ZigBee-ready Platform," at least as early as Oct. 19, 2005, 6 pgs., archived at https://web.archive.org/web/20051019122919/http://www.freescale.com/webapp/sps/site/prod_summary.jsp?code=ZRP-1 &nodeId=02XPgQhCQ6m6cy7103.

Freescale Semiconductor, Inc., M68HC08 microcontroller ordering web page, at least as early as Aug. 17, 2004, 5 pgs., archived at https://web.archive.org/web/20040817014804/http:/www.freescale.com/webapp/sps/site/taxonomy.jsp? NodeId=01 624684498634.

Giobbi, Specification of U.S. Appl. No. 60/824,758, filed Sep. 6, 2006, all pages.

Govindan et al. "Real Time Security Management Using RFID, Biometric and Smart Messages." 2009 3rd International Conference on Anti-Counterfeiting, Security, and Identification in Communication, Aug. 20, 2009, pp. 282-285.

Gralla, "How the Internet works," Millennium Edition, 1999, Que Corporation, Indianapolis, IN, all pages.

Hendron, "File Security, Keychains, Encryptioin, and More with Mac OS X (10.3+)" Apr. 4, 2005, downloaded from http://www.johnhendron.net/documents/OSX_Security.pdf on or before May 3, 2012, 30 pgs.

Hester et al., "neuRFon(TM) Netform: A Self-Organizing Wireless Sensor Network", Oct. 14, 2002, Proceedings of the Eleventh International Conference on Computer Communications and Networks, pp. 364-369.

Honkanen et al, "Low End Extension for Bluetooth", Sep. 19, 2004, Proceedings of the 2004 IEEE Radio and Wireless Conference, Atlanta, GA, pp. 199-202.

IBM Corporation, "Tadlys' Bluetooth Wireless Local Network for Hotspots," Wireless e-business, at least as early as May 6, 2004, 2 pgs., archived at https://web.archive.org/web/20040508123915/http://www.tadlys.com/media/downloads/Hotspots%20PVDEE01006-3.pdf.

IEEE Computer Society, "IEEE Std 802.15.4 (Trade Mark)—Part 15.4: Wireless Medium Access Control (MAC) and Physical Layer (PHY) Specifications for Low-Rate Wireless Personal Area Networks (LR-WPANs)," The Institute of electrical and Electronics Engineers, Inc., New York, NY, Oct. 1, 2003, 679 pgs.

IEEE, "IEEE 802.15 WPANTM Task Group 4 (TG4)" exemplary web page, Aug. 24, 2004, 2 pgs., archived at https://web.archive.org/web/20040824085452/http:/www.ieee802.org/15/pub/TG4.html.

International Search Report and Written Opinion for International Application No. PCT/US04/38124, mailed Apr. 7, 2005, 10 pgs.

International Search Report and Written Opinion for International Application No. PCT/US05/00349, mailed Mar. 19, 2008, 10 pgs.

International Search Report and Written Opinion for International Application No. PCT/US05/07535, mailed Dec. 6, 2005, 6 pgs.

International Search Report and Written Opinion for International Application No. PCT/US05/43447, mailed Feb. 22, 2007, 7 pgs.

International Search Report and Written Opinion for International Application No. PCT/US05/46843, mailed Mar. 1, 2007, 10 pgs.

International Search Report and Written Opinion for International Application No. PCT/US07/11102, mailed Oct. 3, 2008, 11 pgs.

International Search Report and Written Opinion for International Application No. PCT/US07/11103, mailed Apr. 23, 2008, 9 pgs.

International Search Report and Written Opinion for International Application No. PCT/US07/11104, mailed Jun. 26, 2008, 9 pgs.

International Search Report and Written Opinion for International Application No. PCT/US07/11105, mailed Oct. 20, 2008, 10 pgs.

International Search Report and Written Opinion for International Application No. PCT/US08/83060, mailed Dec. 29, 2008, 9 pgs.

International Search Report and Written Opinion for International Application No. PCT/US08/87835, mailed Feb. 11, 2009, 8 pgs.

International Search Report and Written Opinion for International Application No. PCT/US09/34095, mailed Mar. 25, 2009, 11 pgs.

International Search Report and Written Opinion for International Application No. PCT/US2009/039943, mailed Jun. 1, 2009, 9 pgs.

International Search Report and Written Opinion for International Application No. PCT/US2014/037609, mailed Dec. 9, 2014, 13 pgs.

International Search Report received for PCT Patent Application No. PCT/US2001/049916, mailed on Apr. 25, 2002, 1 page.

Jeyaprakash et al., "Secured Smart Card Using Palm Vein Biometric On-Card-Process," 2008 International Conference on Convergence and Hybrid Information Technology, 2008, pp. 548-551.

Jonker et al., "Digital rights management in consumer electronics products," IEEE Signal Processing Magazine, vol. 21, No. 2, pp. 82-91, Mar. 2004, doi: 10.1109/MSP.2004.1276116.

Katz et al., "Smart Cards and Biometrics in Privacy-Sensitive Secure Personal Identification System," May 2002, Smart Card Alliance, p. 1-29.

Kontzer, "Thomson Bets on Smart Cards for Video Encryption," www.informationweek.com, Jun. 7, 2001, 1 pg.

Korzeniowski, "First Intelligent, Wireless Consumer Devices About to Hit Market," TechNewsWorid, Jul. 28, 2004, 3 pgs., archived at https://web.archive.org/web/20040821061130/http:/www.technewsworid.com/story/35376.html%20com/.

Kuhn et al., Introduction to Public Key Technology and the Federal PKI Infrastructure, Feb. 26, 2001, National Institute of Standards and Technology, 54 pgs.

Labrou et al., "Wireless Wallet," Proceedings of the First Annual International Conference on Mobile and Ubiquitous Systems: Networking and Services (MobiQuitos '04), IEEE, Aug. 22-26, 2004, 10 pgs.

Lake, "Downloading for Dollars: Who said buying music off the Net would be easy?" Sound & Vision, Nov. 2000, pp. 137-138.

Lee et al., "Effects of dielectric superstrates on a two-layer electromagnetically coupled patch antenna," Digest on Antennas and Propagation Society International Symposium, 1989, pp. 620-623 vol.2, doi: 10.1109/APS.1989.134763.

Lewis, "Sony and Visa in On-Line Entertainment Venture," New York Times, vol. 145, Thurs. Ed., Nov. 16, 1995, 1 pg.

Liu et al., "A Practical Guide to Biometric Security Technology, " IT Pro, vol. 3, No. 1, Jan./Feb. 2001, pp. 27-32.

Lockton et al., RFID: The next serious threat to privacy, Ethics and Information Technology (2005) 7:221-231 (Year: 2006).

Machine translation of JPH10049604, 27 pages.

Malan, "Here come Wireless Sensors," Machine Design, Jun. 10, 2004, 3 pgs., archived at https://web.archive.org/web/20040610131354/http:/www.machinedesign.com/ASP/viewSelectedArticle.asp?strArticleId=56796&strSite=MDSite&Screen=CURRENTISSUE.

McIver et al., "Identification and Verification Working Together," Bioscrypl, While Paper: Identification and Verification Working Together, Aug. 27, 2004, retrieved from www.ibia.org/membersadmin/whilepapers/pdf/15/Identification%20and%20Verification%20Working%20Together.pdf on Jan. 7, 2007, 5 pgs.

* cited by examiner

1002/1004

1006

REQUEST BIOMETRIC INPUT — 1202

SCAN BIOMETRIC DATA — 1204

CHECK SCAN QUALITY — 1206

QUALITY OK? — 1208

NO

YES

COMPUTE BIO-PROFILE DATA — 1210

1008

RECEIVE INITIALIZATION APPROVAL FROM NOTARY — 1302

WRITE PROFILE INFORMATION TO USER PDK — 1304

WRITE INITIALIZATION HISTORY DATA TO USER PDK — 1306

STORE INITIALIZATION HISTORY DATA IN PROGRAMMER MEMORY — 1308

PERSONAL DIGITAL KEY INITIALIZATION AND REGISTRATION FOR SECURE TRANSACTIONS

CROSS-REFERENCE TO RELATED APPLICATIONS

This application is a continuation of U.S. patent application Ser. No. 17/501,734, titled "Personal Digital Key Initialization and Registration for Secure Transactions," filed on Oct. 14, 2021, which is a continuation of U.S. patent application Ser. No. 16/893,155, titled "Personal Digital Key Initialization and Registration for Secure Transactions," filed on Jun. 4, 2020, which is a continuation of U.S. patent application Ser. No. 16/503,066, titled "Personal Digital Key Initialization and Registration for Secure Transactions," filed on Jul. 3, 2019, which is a continuation of U.S. patent application Ser. No. 14/986,306, titled, "Personal Digital Key Initialization and Registration for Secure Transactions," filed on Dec. 31, 2015, which is a continuation of U.S. patent application Ser. No. 14/448,891, titled "Personal Digital Key Initialization and Registration for Secure Transactions," filed on Jul. 31, 2014, which is a continuation of U.S. patent application Ser. No. 13/791,553, titled "Personal Digital Key Initialization and Registration for Secure Transactions," filed on Mar. 8, 2013, which is a continuation of U.S. patent application Ser. No. 11/744,832, titled "Personal Digital Key Initialization and Registration for Secure Transactions," filed May 5, 2007, which claims the benefit of U.S. Provisional Application No. 60/798,172, titled "Touch Pay," filed on May 5, 2006; U.S. Provisional Application No. 60/798,843, titled "Touch Pay," filed on May 8, 2006; U.S. Provisional Application No. 60/838,788, titled "Personal Digital Key Accessible Storage Device and Processor," filed on Aug. 17, 2006; U.S. Provisional Application No. 60/824,758, titled "Truprox Touch Technology," filed on Sep. 6, 2006; and U.S. Provisional Application No. 60/894,608, titled "TruProx Stored-Photo Extension," filed on Mar. 13, 2007, the entire contents of all of which are herein incorporated by reference.

Applicants hereby notify the USPTO that the claims of the present application are different from those of the aforementioned related applications. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application, the grandparent application or any other related application.

BACKGROUND

1. Field of Art

The invention generally relates to electronic authentication, and more specifically, to secure authentication using biometric verification. In particular, the present invention relates to the initialization and registration of personal digital keys.

2. Description of the Related Art

Optimizing sales transactions and providing secure access to physical and/or digital assets are challenges faced by many businesses and organizations. Ensuring these processes are safe, efficient and simple is important to merchants, providers, users and consumers alike. Conventionally, technologies such as magnetic cards (e.g., credit cards, debit cards, ATM cards, and employee badges) have been used in attempt to address these needs. More recently, various contactless cards or tokens requiring placement near compatible readers have been used.

Each of these technologies, however, has inherent problems in providing secure transaction processing and access control. In particular, the conventional technologies fail to sufficiently ensure that individuals attempting to perform a transaction are associated with the access device and are authorized to do so. Conventional attempts to address this issue include requiring users to provide Personal Identification Numbers (PINs) or passwords in conjunction with account numbers. While in some instances, these options have helped to combat fraudulent activity, these solutions add unwanted complexity and delay to transactions. With the growing need to memorize various PINs and passwords, individuals tend to repeatedly use the same, simple phrase to protect many items, or worse, keep the written phrases in their purse/wallet or next to their computer. Thus, the use of PINs and passwords are often defeated.

A technology better suited to address the issue of authenticating users is biometrics. In biometric authentication, physical and/or behavioral characteristics of an individual are analyzed to uniquely identify the individual. For example, biometric characteristics can include fingerprint, retinal, iris, face, palm, DNA, voice or signature characteristics that can each be uniquely associated with the individual. However, traditional biometric authentication solutions also suffer from significant problems. First, traditional biometric authentication techniques typically expose the participating parties to serious liabilities, risks and inefficiencies. Conventional biometric authentication techniques nearly always require users to release personal, private and unchangeable data to a controlling-entity (e.g., a merchant or business authority) or to a third-party relied upon by the controlling-entity. This exposes an individual's personal biometric information to the possibility of theft and fraudulent use. Further, controlling entities must either assume the risks and liabilities of storing this data, or trust the data to a third-party's care.

Second, conventional biometric authentication techniques generally require an individual to submit biometric information (e.g., a fingerprint, retinal scan, facial scan, or signature) for storage in a database that can then be later used for comparison with biometric data acquired at the point of transaction. This "enrollment" process is time-consuming, risky, error-prone and considered intrusive by many individuals. Further, the enrollment process must be repeated for each individual for every intended use. For example, a user may need to enroll for biometric authentication with his/her company (e.g., for secure access to facilities or digital files), and separately enroll with various merchants using biometric authentication for transactions. Thus, the individual has to spend significant time completing each separate enrollment, and additionally must trust each entity with his/her personal biometric information. For these reasons alone many individuals do not even consider these options.

The above-defined issues represent serious roadblocks to the widespread deployment and acceptance of conventional biometric authentication options. Unless the identified deficiencies are addressed, the full potential of biometric solutions will never be realized. Therefore, a new technology is needed that provides highly reliable, safe and efficient secure authentication for transaction-processing and/or access control. Moreover, the new technology should allow for a simple and efficient enrollment process that does not put an individual's highly personal information at risk of identity theft or other fraudulent use.

SUMMARY

A system and method provide efficient, secure and highly reliable authentication for transaction processing and/or access control applications. A portable physical device, referred to herein as a Personal Digital Key or "PDK", stores one or more profiles (e.g., a biometric profile) in a tamper-proof memory. The biometric profile is acquired in a secure trusted process and is uniquely associated with an individual that is authorized to use and is associated with the PDK. The PDK can wirelessly transmit the identification information including a unique PDK identification number and the biometric profile over a secure wireless channel for use in an authentication process. Additionally, the PDK can store other information such as credit/debit card information, bank information, or personal information in a memory for use in authorizing or completing a transaction.

Typically, a receiving device, referred to herein as a Reader, wirelessly receives the profile from the PDK in order to process a transaction or provide access to secure digital or physical assets. In one embodiment, the Reader acquires a biometric input from the individual carrying the PDK at the point of transaction. The biometric input can be acquired by, for example, a fingerprint scan, iris scan, retinal scan, palm scan, face scan, DNA analysis, signature analysis, voice analysis or any other input mechanism that provides physical or behavioral characteristics uniquely associated with the individual. The Reader compares the biometric profile received from the PDK to the biometric input obtained at the point of transaction to determine if a transaction should be authorized.

In one embodiment, the Reader is further adapted to communicate with one or more remote registries to provide an additional layer of security in the authentication process. Information transmitted from the PDK can be compared to entries stored in the registries to ensure the PDK (and its owner) have not participated in any fraudulent use and that the PDK is not invalid, lost or stolen. In yet another embodiment, one or more biometric authentications, remote registry authentications or other types of authentication are used in combination.

The PDK is programmed by a programming device referred to herein as a "Programmer" during initialization and registration processes. In one embodiment, the programming process is witnessed and authenticated by a specialized trusted Notary. In one embodiment of the initialization process, the Programmer is communicatively coupled with a PDK from the user and a PDK from the Notary. Information is read from the user PDK to determine if the PDK is authorized for initialization and Notary information is read from the Notary PDK to determine if the Notary is authorized to perform the initialization. If both the user and the Notary are authorized, the Programmer prompts the user to provide a biometric input. The Notary witnesses the biometric acquisition process either in person or remotely to ensure the information can be trusted. The Programmer then writes biometric profile data to a memory in the user PDK. In one embodiment, the Programmer does not store the personal biometric data.

In registration, the Programmer communicates to the Central Registry and/or one or more private entries to create or update entries associated with the user PDK. Registration allows the PDK owner to be authenticated for transactions requiring registry authentication. A registry entry may include, for example, a unique PDK ID, purchasing information associated with the user and personal information associated with the user.

The initialization and registration processes further enhance security by storing initialization/registration history data to both the user PDK and the Programmer memory. This data includes, for example, the user PDK ID, the Notary PDK ID, the programmer ID, a site ID, or other information associated with programming including software revisions, checksums and other metrics intended to verify the current software versions used in both the Programmer and the PDK. The history can be recalled in the future for auditing purposes.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
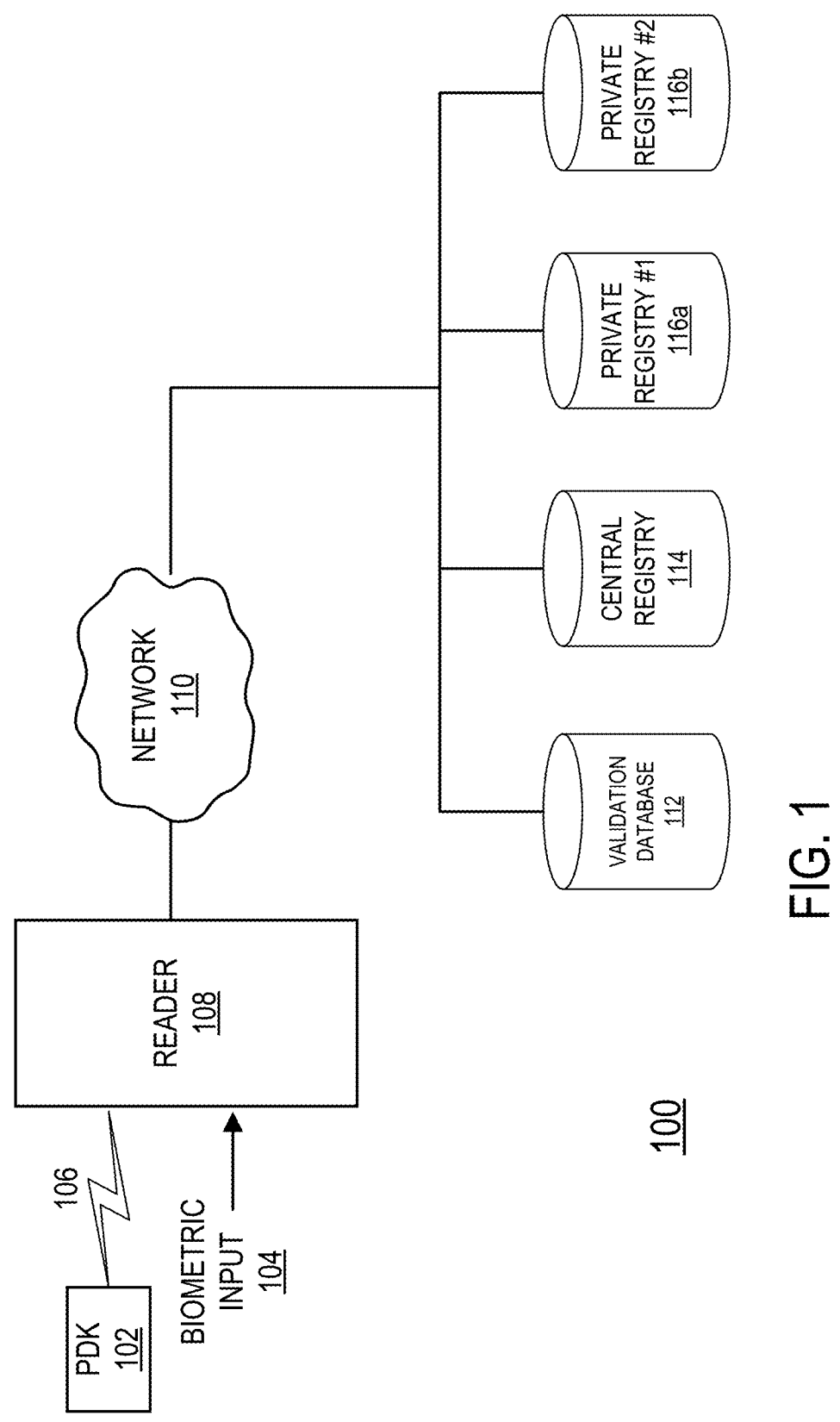
FIG. 1 is a high level block diagram illustrating a system for secure electronic authentication.

FIG. 1 is a high level block diagram illustrating a system for securely authenticating an individual for transaction-processing and/or access control applications. The system 100 comprises a Personal Digital Key (PDK) 102, a Reader 108, a network 110 and one or more external databases including a validation database 112, a Central Registry 114 and one or more private registries 116. The Reader 108 is coupled to the PDK 102 by a wireless link 106 and coupled to a network 110 by either a wired or wireless link. The Reader 108 is also adapted to receive a biometric input 104 from a user and is capable of displaying status to a user. The network 110 couples the validation database 112, the Central Registry 114 and two private registries 116 to the Reader 108. In alternative embodiments, different or additional external registries or databases may be coupled to the network 110. In another embodiment, the Reader 108 operates as a standalone device without a connection to the network 110.

The system 100 addresses applications where it is important to ensure a specific individual is authorized to perform a given transaction. A transaction as used herein can include executing a purchase or financial dealing, enabling access to physical and/or digital items, verifying identification or personal information or executing other tasks where it is important to authenticate an individual for use. Generally, the Reader 108 wirelessly receives information stored in the PDK 102 that uniquely identifies the PDK 102 and the individual carrying the PDK 102. The Reader 108 can also receive a biometric input 104 from the individual. Based on the received information, the Reader 108 determines if the transaction should be authorized. Beneficially, the system 100 provides comprehensive authentication without the need for PINs or passwords. Moreover, personal biometric information need not be stored in any local or remote storage database and is only stored on the user's own PDK. Furthermore, in one embodiment, purchase transactions can be efficiently completed without requiring the use of physical credit cards, tokens or other user action beyond initiating the transaction.

The credibility of the system 100 is ensured by the use of a PDK 102 that stores trusted information. The PDK 102 is a compact, portable uniquely identifiable wireless device typically carried by an individual. The PDK 102 stores digital information in a tamper-proof format that uniquely associates the PDK 102 with an individual. Example embodiments of PDKs are described in more detail in U.S. patent application Ser. No. 11/292,330, entitled "Personal Digital Key And Receiver/Decoder Circuit System And Method" filed on Nov. 30, 2005; U.S. patent application Ser. No. 11/620,581 entitled "Wireless Network Synchronization Of Cells And Client Devices On A Network" filed on Jan. 5, 2007; and U.S. patent application Ser. No. 11/620,577 entitled "Dynamic Real-Time Tiered Client Access" filed on Jan. 5, 2007, the entire contents of which are all incorporated herein by reference.

To establish the trust, credibility and confidence of the authentication system, information stored in the PDK 102 is acquired by a process that is trusted, audited and easily verified. The process is ensured by a trusted third-party system, referred to herein as a Notary, that administers the acquisition and storage of information in the PDK 102 according to defined security protocols. In one embodiment, the Notary is a system and/or a trusted individual that witnesses the acquisition and storage either in person or remotely. In another embodiment, the Notary comprises trusted hardware that administers the initialization process by an automated system. Thus, once initialized by the trusted process, the PDK 102 can prove that the information it stores is that of the individual. Example embodiments of the initialization process are described in more detail below with reference to FIGS. 8-14.

The Reader 108 wirelessly communicates with the PDK 102 when the PDK 102 is within a proximity zone of the Reader 108. The proximity zone can be, for example, several meters in radius and can be adjusted dynamically by the Reader 108. Thus, in contrast to many conventional RF ID devices, the Reader 108 can detect and communicate with the PDK 102 without requiring the owner to remove the PDK 102 from his/her pocket, wallet, purse, etc. Generally, the Reader 108 receives uniquely identifying information from the PDK 102 and initiates an authentication process for the individual carrying the PDK 102. In one embodiment, the Reader 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The Reader 108 compares the biometric input 104 to information received from the PDK 102 to determine if a transaction should be authorized. Alternatively, the biometric input 104 can be obtained by a biometric reader on the PDK 102 and transmitted to the Reader 108 for authentication. In additional alternative embodiment, some or all of the authentication process can be performed by the PDK 102 instead of the Reader 108.

The Reader 108 is further communicatively coupled to the network 110 in order to receive and/or transmit information to remote databases for remote authentication. In an alternative embodiment, the Reader 108 includes a non-volatile data storage that can be synchronized with one or more remote databases 112 or registries 114-116. Such an embodiment alleviates the need for a continuous connection to the network 110 and allows the Reader 108 to operate in a standalone mode and for the local data storage to be updated when a connection is available. For example, a standalone Reader 108 can periodically download updated registry entries and perform authentication locally without any remote lookup.

The network 110 provides communication between the Reader 108 and the validation database 112, Central Registry 114 and one or more private registries 116. In alternative embodiments, one or more of these connections may not be present or different or additional network connections may be present. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The validation database 112 stores additional information that may be used for authorizing a transaction to be processed at the Reader 108. For example, in purchase transactions, the validation database 112 is a credit card validation database that is separate from the merchant providing the sale. Alternatively, a different database may be used to validate different types of purchasing means such as a debit card, ATM card, or bank account number.

The registries 114-116 are securely-accessible databases coupled to the network 110 that store, among other items, PDK, Notary, and Reader information. In one embodiment, the registries 114-116 do not store biometric information. In an alternative embodiment, a registry stores biometric information in an encoded format that can only be recovered using an algorithm or encoding key stored in the PDK 102. Information stored in the registries can be accessed by the Reader 108 via the network 110 for use in the authentication process. There are two basic types of registries illustrated: private registries 116 and the Central Registry 114. Private registries 116 are generally established and administered by their controlling entities (e.g., a merchant, business authority, or other entity administering authentication). Private registries 116 can be custom configured to meet the specialized and independent needs of each controlling entity. The Central Registry 114 is a single highly-secured, centrally-located database administered by a trusted third-party organization. In one embodiment, all PDKs 102 are registered with the Central Registry 114 and may be optionally registered with one or more selected private registries 116. In alternative embodiments, a different number or different types of registries may be coupled to the network 110.

Figure 2:
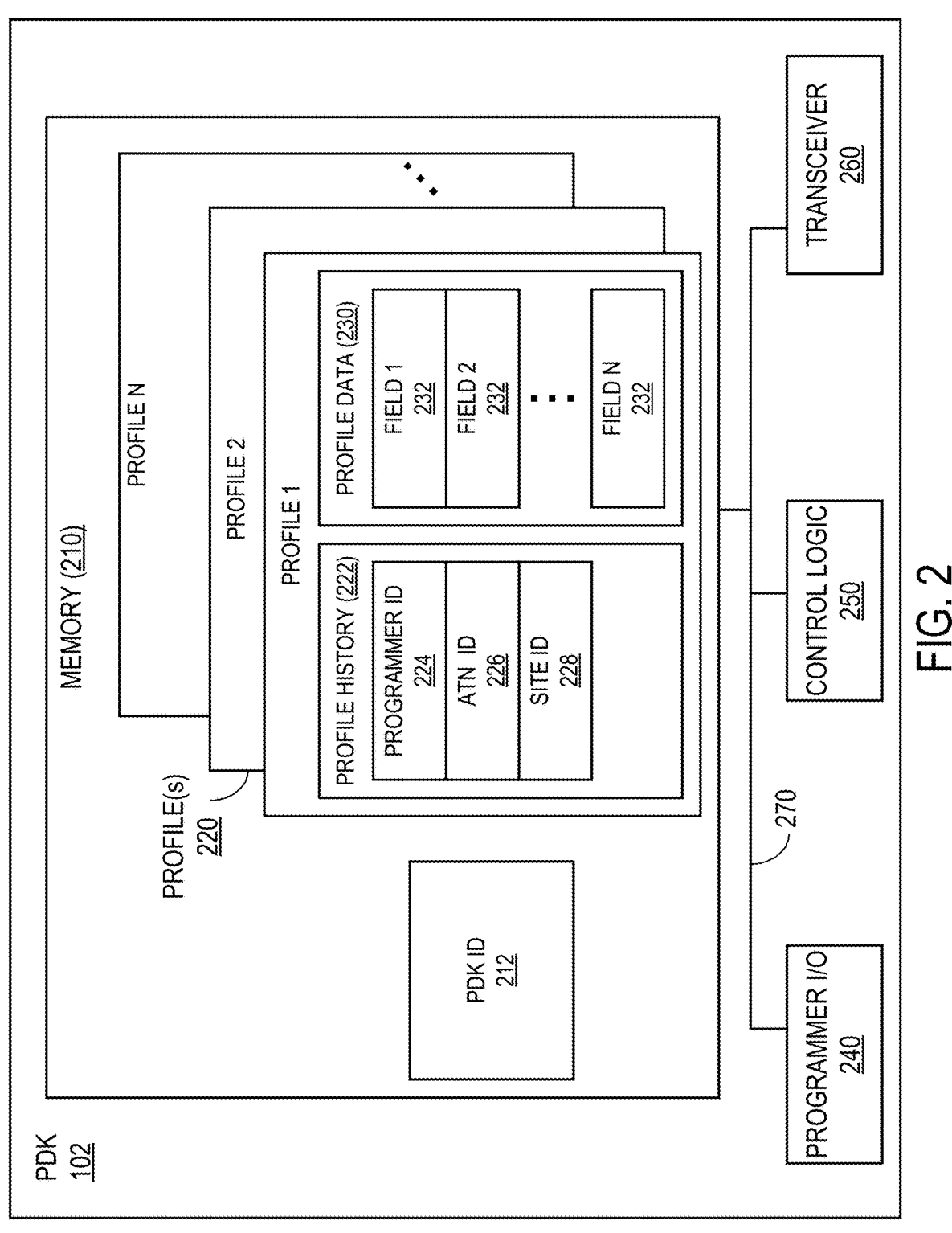
FIG. 2 is a block diagram illustrating one embodiment of a Personal Digital Key (PDK).

Turning now to FIG. 2, an example embodiment of a PDK 102 is illustrated. The PDK 102 comprises a memory 210, a programmer I/O 240, control logic 250, and a transceiver 260, coupled by a bus 270. The PDK 102 can be standalone as a portable, physical device or can be integrated into commonly carried items. For example, a PDK 102 can be integrated into a portable electronic device such as a cell phone, Personal Digital Assistant (PDA), or GPS unit, an employee identification tag, clothing, or jewelry items such as watches, rings, necklaces or bracelets. In one embodiment, the PDK 102 can be, for example, about the size of a Subscriber Identity Module (SIM) card and be as small as a square inch in area or less. In another embodiment, the PDK 102 can be easily contained in a pocket, on a keychain, or in a wallet.

The memory 210 can be a read-only memory, a once-programmable memory, a read/write memory or any combination of memory types including physical access secured and tamperproof memories. The memory 210 typically stores a unique PDK ID 212 and one or more profiles 220. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private 116 or Central 114 registry entries. In an alternative embodiment, the registries can identify a PDK 102 by a different ID than the PDK ID 212 stored in the PDK 102, or may use both the PDK ID 212 and the different ID in conjunction. The PDK ID 212 can also be used in basic PDK authentication to ensure that the PDK 102 is a valid device.

The profile fields 220 can be initially empty at the time of manufacture but can be written to by authorized individuals (e.g., a Notary) and/or hardware (e.g., a Programmer). In one embodiment, each profile 220 comprises a profile history 222 and profile data 230. Many different types of profiles 220 are possible. A biometric profile, for example, includes profile data 230 representing physical and/or behavioral information that can uniquely identify the PDK owner. A PDK 102 can store multiple biometric profiles, each comprising a different type of biometric information. In one embodiment, the biometric profile 220 comprises biometric information transformed by a mathematical operation, algorithm, or hash that represents the complete biometric information (e.g., a complete fingerprint scan). In one embodiment, a mathematical hash is a "one-way" operation such that there is no practical way to re-compute or recover the complete biometric information from the biometric profile. This both reduces the amount of data to be stored and adds an additional layer of protection to the user's personal biometric information. In one embodiment, the biometric profile is further encoded using a encoding key and/or algorithm that is stored with the biometric profile data. Then, for authentication, both the biometric profile data and the encoding key and/or algorithm are passed to the Reader 108.

In one embodiment the PDK 102 also stores one or more biometric profile "samples" associated with each biometric profile. The biometric profile sample is a subset of the complete profile that can be used for quick comparisons of biometric data. In one embodiment, the profile samples can be transmitted over a public communication channel or transmitted with reduced level of encryption while the full biometric profiles are only transmitted over secure channels. In the case of fingerprint authentication, for example, the biometric profile sample may represent only small portion area of the full fingerprint image. In another embodiment, the fingerprint profile sample is data that describes an arc of one or more lines of the fingerprint. In yet another embodiment, the fingerprint profile sample can be data representing color information of the fingerprint.

In another embodiment, the stored profiles 220 include a PIN profile that stores one or more PINs or passwords associated with the PDK owner. Here, the number or password stored in the PIN profile can be compared against an input provided by the user at the point of transaction to authenticate the user. In one embodiment, a PIN profile sample is also stored with the PIN profile that comprises a subset of the full PIN. For example, a PIN profile sample can be only the first two numbers of the PIN that can be used to quickly compare the stored PIN profile to a PIN obtained at the point of transaction.

In yet another embodiment, the PDK 102 stores a picture profile that includes one or more pictures of the PDK owner. In a picture profile authentication, the picture stored in the PDK 102 is transmitted to a display at the point of transaction to allow an administrator (e.g., a clerk or security guard) to confirm or reject the identity of the individual requesting the transaction. In another embodiment, an image is captured of the individual at the point of transaction and compared to the picture profile by an automated image analysis means. Furthermore, picture profiles could be used, for example, in place of conventional passports or drivers licenses to authenticate the identity of an individual and allow for remote identification of individuals. For example, a police officer following a vehicle could obtain an image and identity of the driver while still maintaining a safe distance from the vehicle. In the hospitality industry, a host could greet a guest at the door of a hotel, casino or restaurant and easily recognize the guest by obtaining the guest's picture profile as he/she enters.

A registry or database profile typically stores information associating the user with a registry. The registry profile can be used to determine if the individual is associated with the controlling entity for that registry and if different types of transactions are authorized for the individual. A registry profile can further include additional user information for use with the registry. For example, a private registry profile associated with a particular merchant may include a credit card number that the user has selected as a default for that merchant. In one embodiment, a profile can further include spending limits that limits the amount of purchases a user can make with a particular vendor or using a particular profile.

A profile can further include personal identification information such as name, address, phone number, etc., bank information, credit/debit card information, or membership information. This information can be useful for certain types of transactions. For example, with purchases that require delivery, a PDK 102 can automatically transmit address information to the Reader 108 at the point of transaction. In one embodiment, a profile can store multiple addresses. At the point of transaction, the Reader 108 displays the address options and allows the user to select which address to use.

Generally, some types of profile information (e.g., a biometric profile) can only be acquired during a trusted initialization process that is administered by a trusted Notary. In one embodiment, other secure information such as credit card information are also stored to the PDK in the presence of a Notary. Alternatively, certain types of low-risk information can be added by the user without a Notary, such as, for example a change of address. In another embodiment, once an initial profile has been stored to the PDK 102, a user can add information to the PDK 102 using a Programmer without a Notary through self-authentication. For example, in one embodiment, a PDK 102 that has a stored biometric profile can be "unlocked" by providing a matching biometric input. Then, once unlocked, the user can add or remove additional profiles, credit cards, personal information, etc. to the PDK 102 using a Programmer. For example, in one embodiment, a user that has unlocked his/her own PDK 102 can store additional biometric information (such as fingerprint information for other fingers) in his/her PDK 102. In another example, a user that cancels a credit card, can unlock his/her PDK 102 to remove the credit card information. In another embodiment, the user can make copies of the PDK 102 or move profiles from one PDK 102 to another once the PDK 102 is unlocked.

The profile history 222 includes a programmer ID field 224, a Notary ID 226, and a site ID field 228. The profile history 222 relates to the specific hardware, Notary, and site used at the time the profile data was created and stored to the PDK. Typically each profile 220 stores its specific profile history 222 along with the profile data 230. The profile history 222 can be recalled for auditing purposes at a later time to ensure the credibility of the stored data. In one embodiment, transaction history can also be stored to the PDK memory 210. Here, the PDK 102 stores information associated with any transactions made with the PDK 102 such as the name of the merchant, the purchase amount, credit card used, etc.

The PDK 102 also includes a programmer I/O 240 that provides an interface to a trusted Programmer (not shown). The Programmer comprises trusted hardware that is used to program the memory 210 of the PDK 102. An example embodiment of a Programmer is described in more detail below with reference to FIG. 9. The programmer I/O 240 can be, for example, a USB interface, serial interface, parallel interface, or any other direct or wireless link for transferring information between the PDK 102 and the Programmer. When coupled to the Programmer, the programmer I/O 240 receives initialization data, registration data or other information to be stored in the memory 210.

The control logic 250 coordinates between functions of the PDK 102. In one embodiment, the control logic 250 facilitates the flow of information between the programmer I/O 240, transceiver 260 and memory 210. The control logic 250 can further process data received from the memories 210, programmer I/O 240 and transceiver 260. Note that the control logic 250 is merely a grouping of control functions in a central architecture, and in other embodiments, the control functions can be distributed between the different modules of the PDK 102. The operation of the control logic will be understood to those skilled in the art based on the description below corresponding to FIGS. 4-7D.

The transceiver 260 is a wireless transmitter and receiver for wirelessly communicating with a Reader 108 or other wireless device. The transceiver 260 can send and receive data as modulated electromagnetic signals. Moreover, the data can be encrypted by the transceiver 260 and transmitted over a secure link. Further, the transceiver 260 can actively send connection requests, or can passively detect connection requests from another wireless source. In one embodiment, the transceiver 260 is used in place of a separate programmer I/O 240 and is used to wirelessly communicate with the Programmer for programming. In one embodiment, the transceiver 260 is adapted to communicate over a range of up to around 5 meters.

Optionally, a PDK 102 can also include a built in biometric reader (not shown) to acquire a biometric input from the user. The biometric input can be used to unlock the PDK 102 for profile updates, or for various types of authentication. For example, in one embodiment, a biometric input is received by the PDK 102 and compared to stored biometric information. Then, if the user is authenticated, the PDK 102 can indicate to the Reader 108 that the user is authenticated and transmit additional information (e.g., a credit card number) needed to complete a transaction.

Figure 3:
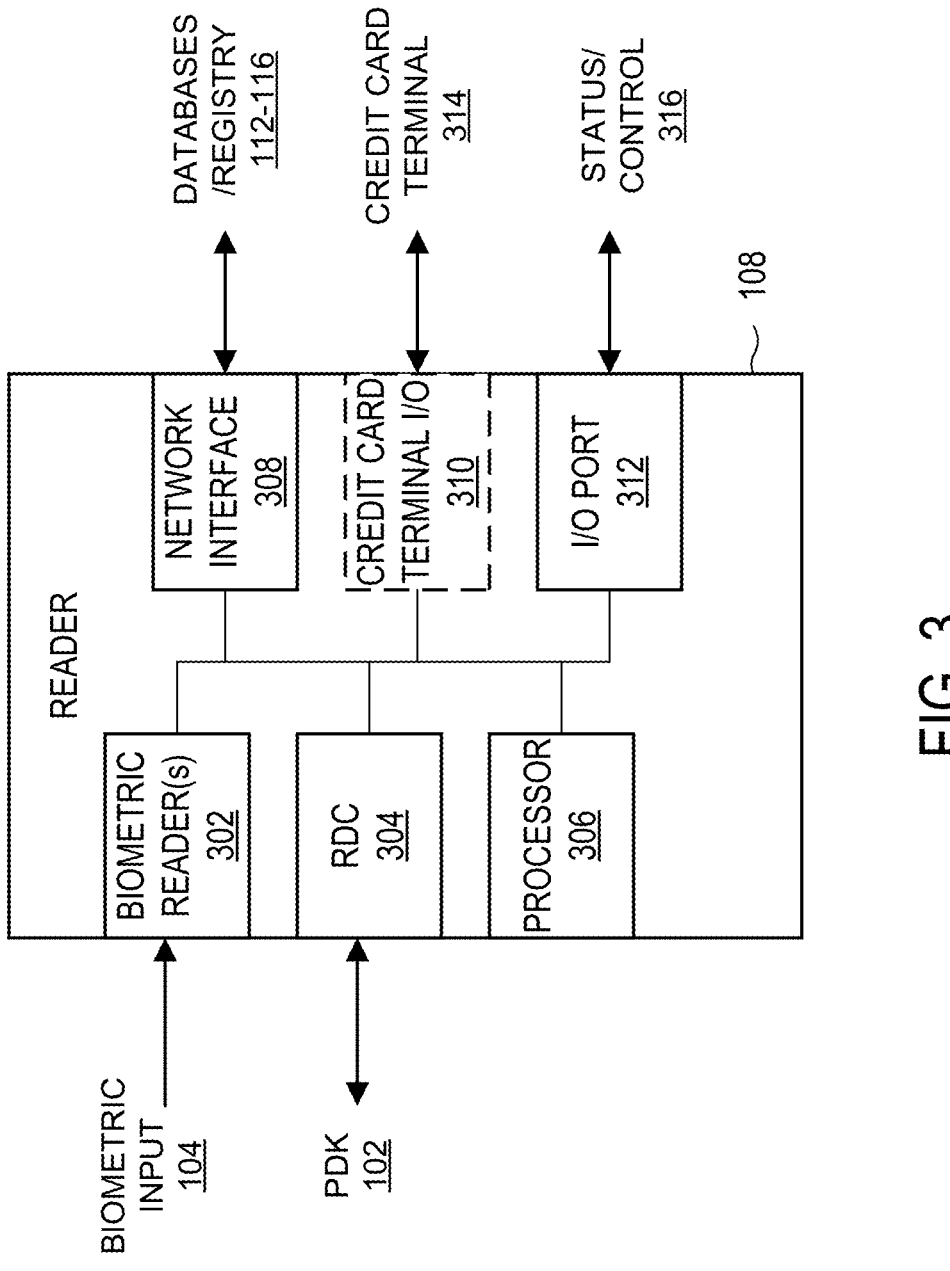
FIG. 3 is a block diagram illustrating one embodiment of a Reader.

Turning now to FIG. 3, an example embodiment of a Reader 108 is illustrated. The embodiment includes one or more biometric readers 302, a receiver-decoder circuit (RDC) 304, a processor 306, a network interface 308, an I/O port 312 and optionally a credit card terminal I/O 310. In alternative embodiments, different or additional modules can be included in the Reader 108.

The RDC 304 provides the wireless interface to the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method", the entire contents of which are incorporated herein by reference. Encrypting data transmitted between the PDK 102 and Reader 108 minimizes the possibility of eavesdropping or other fraudulent activity. In one embodiment, the RDC 304 is also configured to transmit and receive certain types of information in an unencrypted, or public, format.

The biometric reader 302 receives and processes the biometric input 104 from an individual at the point of transaction. In one embodiment, the biometric reader 302 is a fingerprint scanner. Here, the biometric reader 302 includes an image capture device adapted to capture the unique pattern of ridges and valleys in a fingerprint also known as minutiae. Other embodiments of biometric readers 302 include retinal scanners, iris scanners, facial scanner, palm scanners, DNA/RNA analyzers, signature analyzers, cameras, microphones, and voice analyzers. Furthermore, the Reader 108 can include multiple biometric readers 302 of different types. In one embodiment, the biometric reader 302 automatically computes mathematical representations or hashes of the scanned data that can be compared to the mathematically processed biometric profile information stored in the PDK 102.

The processor 306 can be any general-purpose processor for implementing a number of processing tasks. Generally, the processor 306 processes data received by the Reader 108 or data to be transmitted by the Reader 108. For example, a biometric input 104 received by the biometric reader 302 can be processed and compared to the biometric profile 220 received from the PDK 102 in order to determine if a transaction should be authorized. In different embodiments, processing tasks can be performed within each individual module or can be distributed between local processors and a central processor. The processor 306 further includes a working memory for use in various processes such as performing the method of FIGS. 4-7D.

The network interface 308 is a wired or wireless communication link between the Reader 108 and one or more external databases such as, for example, a validation database 112, the Central Registry 114 or a private registry 116. For example, in one type of authentication, information is received from the PDK 102 at the RDC 304, processed by the processor 306, and transmitted to an external database 112-116 through the network interface 308. The network interface 308 can also receive data sent through the network 110 for local processing by the Reader 108. In one embodiment, the network interface 308 provides a connection to a remote system administrator to configure the Reader 108 according to various control settings.

The I/O port 312 provides a general input and output interface to the Reader 108. The I/O port 312 may be coupled to any variety of input devices to receive inputs such as a numerical or alphabetic input from a keypad, control settings, menu selections, confirmations, and so on. Outputs can include, for example, status LEDs, an LCD, or other display that provides instructions, menus or control options to a user.

The credit card terminal I/O 310 optionally provides an interface to an existing credit card terminal 314. In embodiments including the credit card terminal I/O 310, the Reader 108 supplements existing hardware and acts in conjunction with a conventional credit card terminal 314. In an alternative embodiment, the functions of an external credit card terminal 314 are instead built into the Reader 108. Here, a Reader 108 can completely replace an existing credit card terminal 314.

In one embodiment, a Reader 108 is adapted to detect and prevent fraudulent use of PDKs that are lost, stolen, revoked, expired or otherwise invalid. For example, the Reader 108 can download lists of invalid PDKs IDs 212 from a remote database and block these PDKs 102 from use with the Reader 108. Furthermore, in one embodiment, the Reader 108 can update the blocked list and/or send updates to remote registries 114-116 or remote Readers 108 upon detecting a fraudulently used PDK 102. For example, if a biometric input 104 is received by the Reader 108 that does not match the biometric profile received from the PDK 102, the Reader 108 can obtain the PDK ID 212 and add it to a list of blocked PDK IDs 212. In another embodiment, upon detecting fraudulent use, the Reader 108 can send a signal to the PDK 102 that instructs the PDK 102 to deactivate itself. The deactivation period can be, for example, a fixed period of time, or until the rightful owner requests re-activation of the PDK 102. In yet another embodiment, the Reader 108 can send a signal instructing the fraudulently obtained PDK 102 to send alarm signals indicating that the PDK 102 a stolen device. Here, a stolen PDK 102 can be tracked, located and recovered by monitoring the alarm signals. In one embodiment, the Reader 108 stores biometric or other identifying information from an individual that attempts to fraudulently use a PDK 102 so that the individual's identity can be determined.

Generally, the Reader 108 is configured to implement at least one type of authentication prior to enabling a transaction. In many cases, multiple layers of authentication are used. A first layer of authentication, referred to herein as "device authentication", begins any time a PDK 102 moves within range of a Reader 108. In device authentication, the Reader 108 and the PDK 102 each ensure that the other is valid based on the device characteristics, independent of any profiles stored in the PDK 102. In some configurations, when fast and simple authentication is desirable, only device authentication is required to initiate the transaction. For example, a Reader 108 may be configured to use only device authentication for low cost purchases under a predefined amount (e.g., $25). The configuration is also useful in other types of low risk transactions where speed is preferred over additional layers of authentication.

Other configurations of the Reader 108 require one or more additional layers of authentication, referred to herein as "profile authentication" based on one or more profiles stored in the PDK 102. Profile authentication can include, for example, a biometric authentication, a PIN authentication, a photo authentication, a registry authentication, etc. or any combination of the above authentication types. Profile authentications are useful when a more exhaustive authentication process is desired, for example, for high purchase transactions or for enabling access to classified assets.

Figure 4:
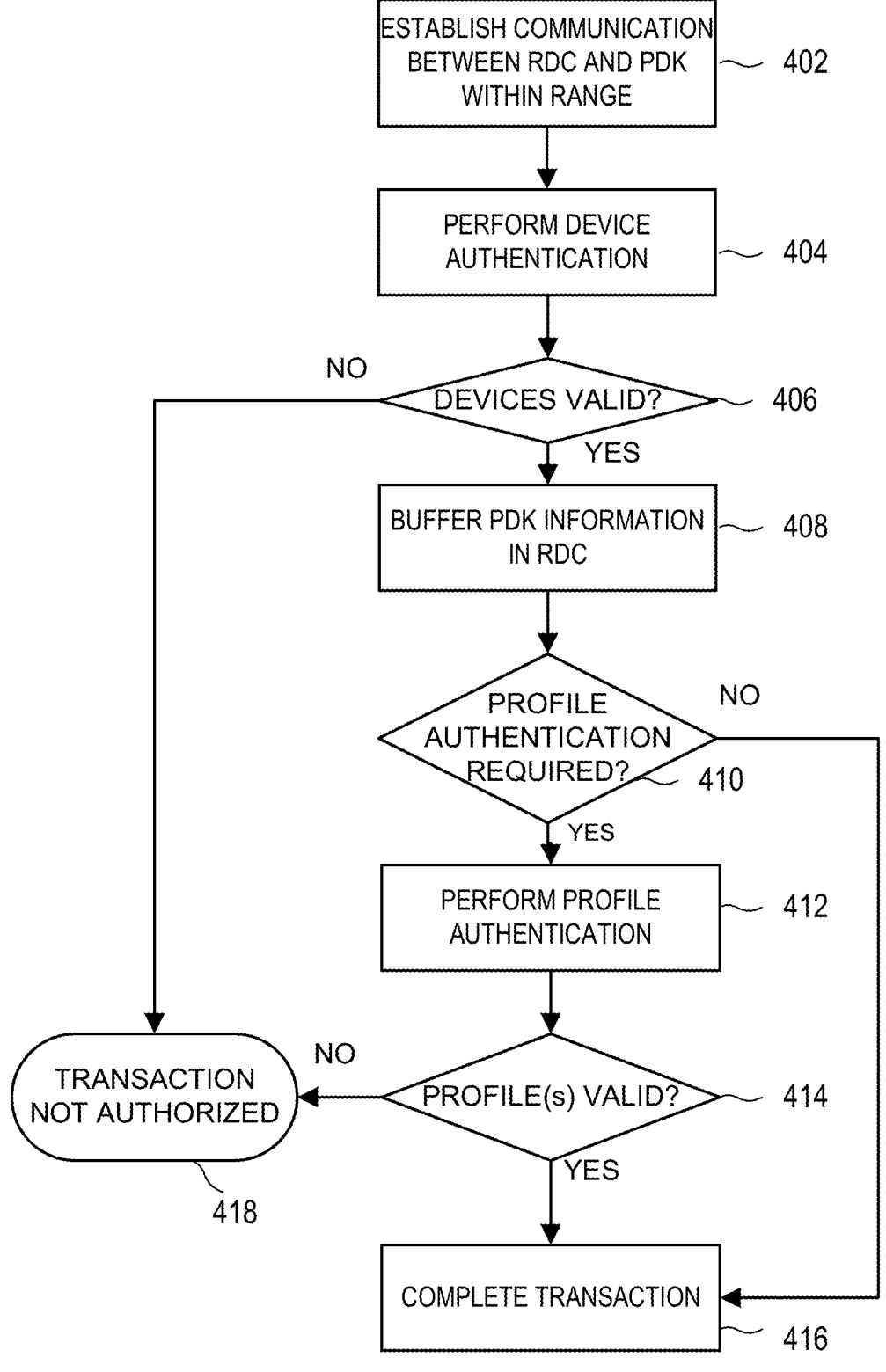
FIG. 4 is a flowchart illustrating one embodiment of a process for authorizing a transaction using secure authentication.

FIG. 4 illustrates an example embodiment of a process for secure authentication of a transaction. When a PDK 102 comes within range of a Reader 108, communication is automatically established 402 between the RDC 304 of the Reader 108 and the PDK 102. In one embodiment, the RDC 304 continually transmits beacons that are detected by the PDK 102 when it enters a proximity zone of the Reader 108. In an alternative embodiment, the communication is instead initiated by the PDK 102 and acknowledged by the Reader 108. Generally, initial communication between the Reader 108 and the PDK 102 is not encrypted in order to provide faster and more power efficient communication.

In step 404, a device authentication is performed. Here, the Reader 108 establishes if the PDK 102 is a valid device and PDK 102 establishes if the Reader 108 is valid. Furthermore, device authentication determines if the PDK is capable of providing the type of authentication required by the Reader 108.

Figure 5:
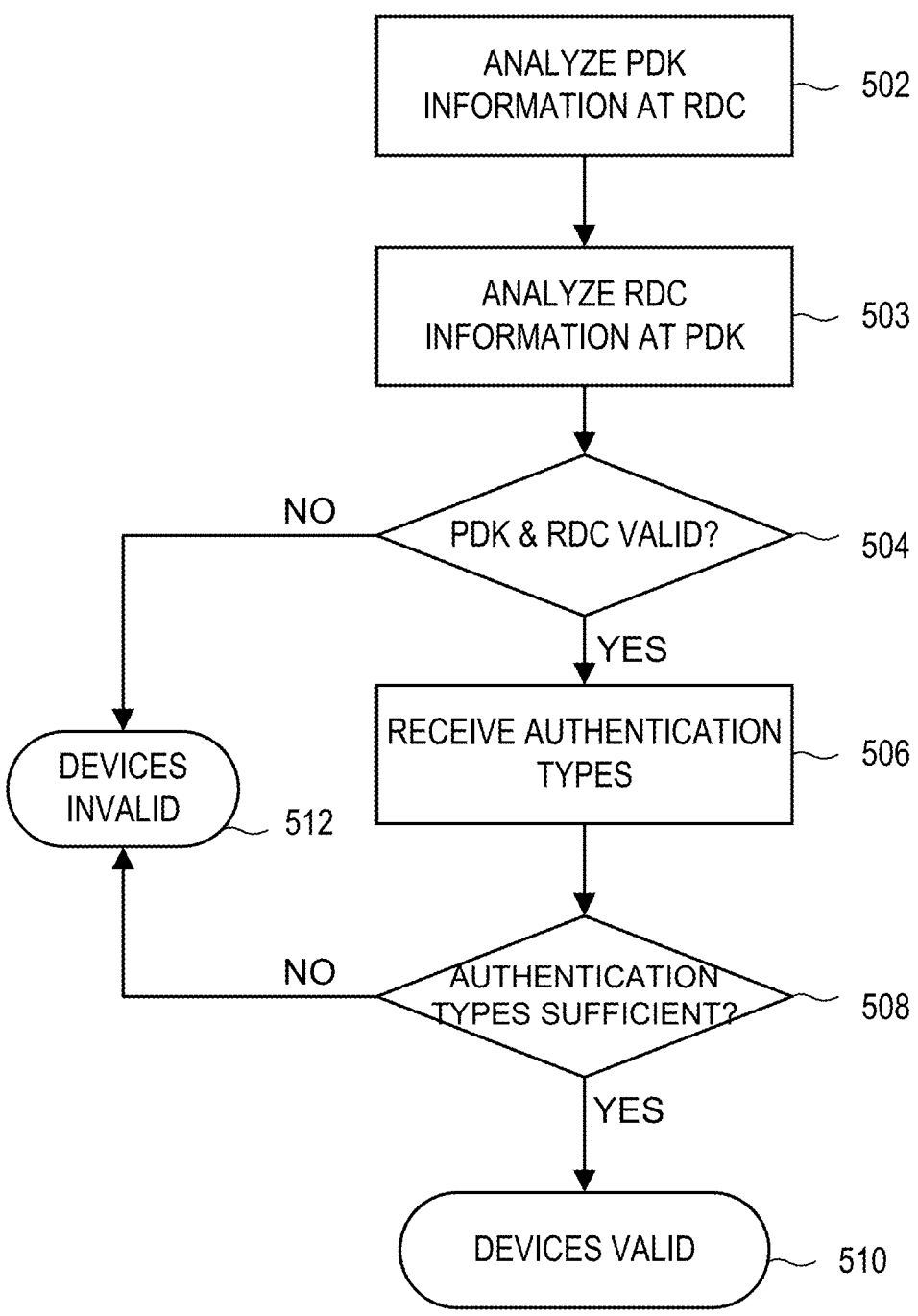
FIG. 5 is a flowchart illustrating one embodiment of a process for device authentication by a Reader.

An example embodiment of a method for performing 404 device authentication is illustrated in FIG. 5. The RDC 304 receives and analyzes 502 information from the PDK 102; and the PDK 102 receives and analyzes 502 information received from the RDC 304. Generally, this initial information is transmitted over a public communication channel in an unencrypted format. Based on the received information, each device 102, 304 determines 504 if the other is valid. As will be apparent to one of ordinary skill in the art, a number of different protocols can be used for this type of authentication such as, for example, a challenge-response authentication or a challenge handshake authentication protocol (CHAP). If either of the devices 102, 304 is invalid 512, the process ends. If both the PDK 102 and the RDC 304 are determined by the other to be valid, the Reader 108 requests and receives 506 authentication type information from the PDK 102 indicating the different types of authentication the PDK 102 is capable of satisfying based on the types of profiles the PDK 102 stores. The available profile types in the PDK 102 are compared against the authentication types that can be used by the Reader 108. For example, a particular Reader 108 may be configured to perform only a fingerprint authentication and therefore any PDK without a fingerprint biometric profile cannot be used with the Reader 108. In one embodiment, the Reader 108 can allow more than one type of profile to be used. In another embodiment, the Reader 108 requires more than one type of profile for authentication, while in yet further embodiments no profile authentications are required. Next, the method determines 508 whether the PDK 102 has one or more profiles sufficient for authentication. If the PDK 102 does not have one or more profiles sufficient for authentication with the Reader 108, the devices 102, 304 are determined to be invalid 512 because they cannot be used with each other. If the PDK 102 does have one or more sufficient types of profiles, the devices are valid 510.

Turning back to FIG. 4, if either the PDK 102 or RDC 304 is not found valid during device authentication 404, the transaction is not authorized 418 and the process ends. If the devices are valid, the RDC 304 temporarily buffers 408 the received PDK information. It is noted that in one embodiment, steps 402-408 are automatically initiated each time a PDK 102 enters the proximity zone of the Reader 108. Thus, if multiple PDKs 102 enter the proximity zone, the Reader 108 automatically determines which PDKs 102 are valid and buffers the received information from each valid PDK 102.

The method next determines 410 whether profile authentication is required based on the configuration of the Reader 108, the type of transaction desired or by request of a merchant or other administrator. If the Reader 108 configuration does not require a profile authentication in addition to the PDK authentication, then the Reader 108 proceeds to complete the transaction for the PDK 102. If the Reader 108 does require profile authentication, the profile authentication is performed 412 as will be described below with references to FIGS. 6-7D. If a required profile is determined 414 to be valid, the Reader 108 completes 416 the transaction. Otherwise, the Reader 108 indicates that the transaction is not authorized 418. In one embodiment, completing 416 the transaction includes enabling access to secure physical or digital assets (e.g., unlocking a door, opening a vault, providing access to a secured hard drive, etc.). In another embodiment, completing 416 the transaction includes charging a credit card for a purchase. Alternatively, bank information, debit/check/ATM card information, coupon codes, or any other purchasing means information (typically stored in a profile memory field 232) can be transmitted by the PDK 102 in place of credit card information. In one embodiment, the PDK 102 is configured with multiple purchasing means and a default is configured for different types of transactions. In another embodiment, each credit card or other purchasing means is displayed to the customer by the Reader 108 and the customer is allowed to select which to use for the transaction.

Figure 6:
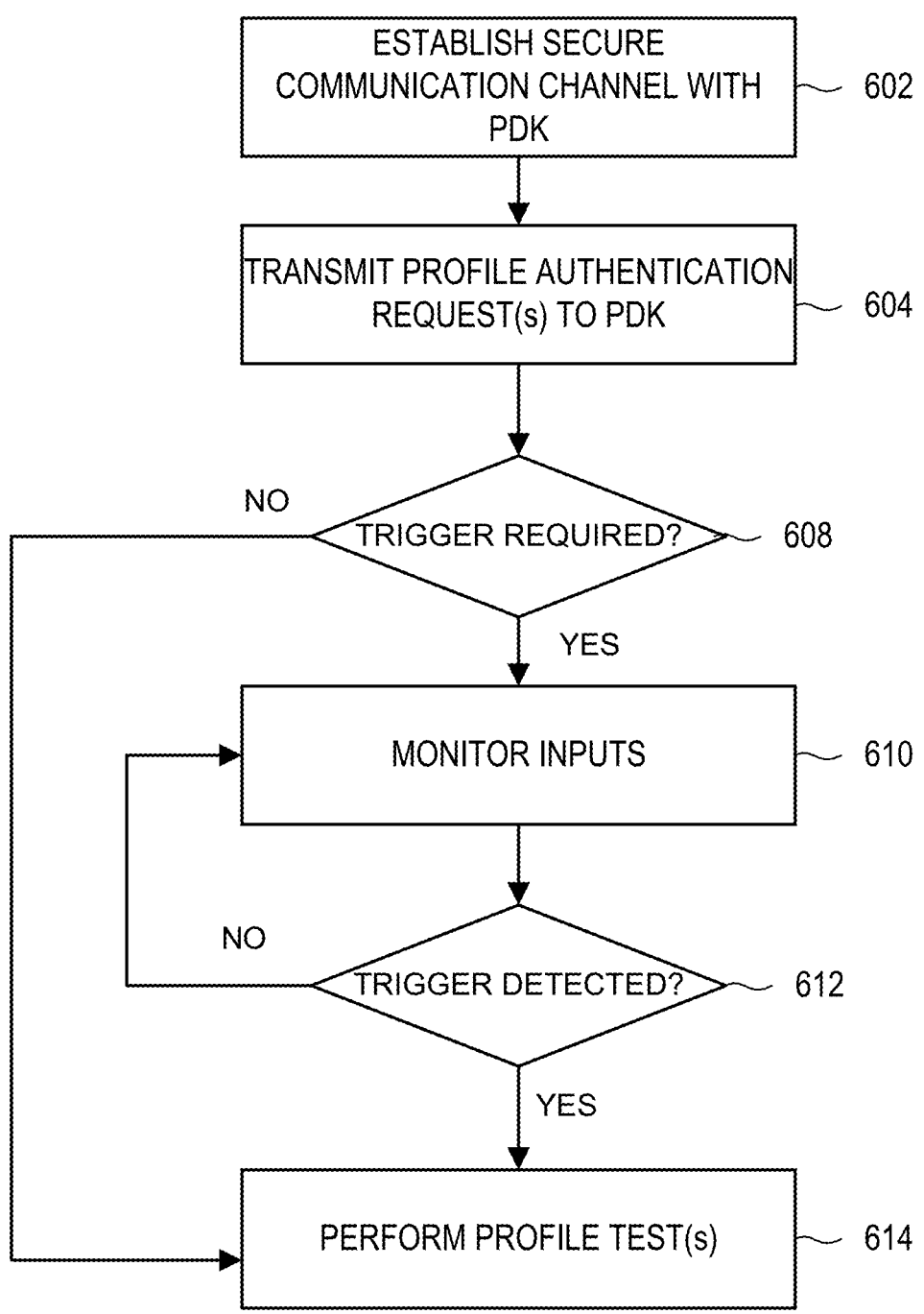
FIG. 6 is a flowchart illustrating one embodiment of a process for profile authentication by a Reader.

Turning now to FIG. 6, an embodiment of a process for profile authentication is illustrated. In step 602, a secure communication channel is established between the RDC 304 and the PDK 102. Information sent and received over the secure channel is in an encrypted format that cannot be practically decoded, retransmitted, reused, or replayed to achieve valid responses by an eavesdropping device. The Reader 108 transmits 604 profile authentication requests to the PDK 102 requesting transmission of one or more stored profiles over the secure channel. At 608, the process determines whether a "trigger" is required for authentication. The requirement for a trigger depends on the configuration of the Reader 108, the specific type of transaction to be executed and the type of authentication requested.

In a first configuration, a trigger is required to continue the process because of the type of authentication being used. For example, in biometric authentication, the authentication process cannot continue until the Reader detects a biometric contact and receives biometric information. It is noted that biometric contact is not limited to physical contact and can be, for example, the touch of a finger to a fingerprint scanner, the positioning of a face in front of a facial or retinal scanner, the receipt of a signature, the detection of a voice, the receipt of a DNA sample, RNA sample, or derivatives or any other action that permits the Reader 108 to begin acquiring the biometric input 104. By supplying the biometric contact, the user indicates that the authentication and transaction process should proceed. For example, a PDK holder that wants to make a withdrawal from an Automated Teller Machine (ATM) equipped with a Reader 108 initiates the withdrawal by touching a finger to the Reader 108. The ATM then begins the transaction process for the withdrawal.

In a second configuration, some other user action is required as a trigger to proceed with the transaction even if the authentication process itself doesn't necessarily require any input. This can be used for many purchasing transactions to ensure that the purchase is not executed until intent to purchase is clear. For example, a Reader 108 at a gas station can be configured to trigger the transaction when a customer begins dispensing gas. At a supermarket, a Reader 108 can be configured to trigger the transaction when items are scanned at a checkout counter.

In a third configuration, no trigger is used and the Reader 108 automatically completes the remaining authentication/transaction with no explicit action by the user. This configuration is appropriate in situations where the mere presence of a PDK 102 within range of the Reader 108 is by itself a clear indication of the PDK owner's desire to complete a transaction. For example, a Reader 108 can be positioned inside the entrance to a venue hosting an event (e.g., a sporting event, a concert, or a movie). When a PDK owner walks through the entrance, the Reader 108 detects the PDK 102 within range, authenticates the user, and executes a transaction to purchase an electronic ticket for the event. In another embodiment, the electronic ticket can be purchased in advance, and the Reader 108 can confirm that the user is a ticket holder upon entering the venue. Other examples scenarios where this configuration is useful include boarding a transportation vehicle (e.g., a train, bus, airplane or boat), entering a hotel room, or accessing secure facilities or other assets. Thus, if no trigger is required, the process next performs 614 the requested profile authentication tests.

If a trigger is required, the Reader monitors 610 its inputs (e.g., a biometric reader, key pad, etc.) and checks for the detection 612 of a trigger. If the required trigger is detected, the process continues to perform 614 one or more profile authentication test. FIGS. 7A-7D illustrate various embodiments of profile authentication tests. According to different configurations of the Reader 108, one or more of the illustrated authentication processes may be used. Further, in some embodiments, one or more of the processes may be repeated (e.g., for different types of biometric inputs).

Figure 7B:
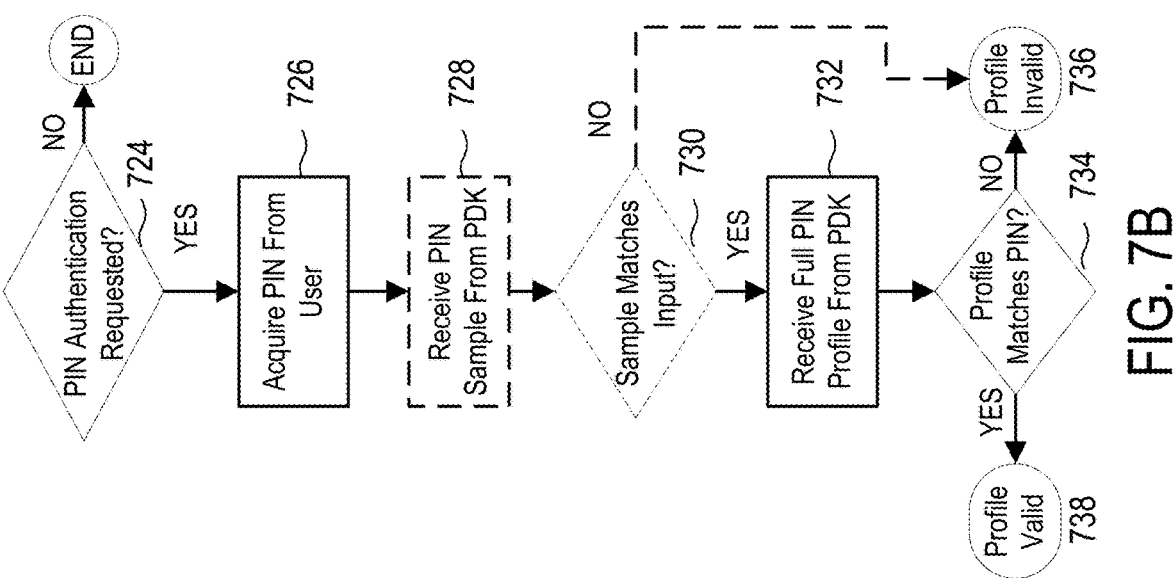
FIG. 7B is a flowchart illustrating one embodiment of a process for profile testing using a personal identification number.
Figure 7A:
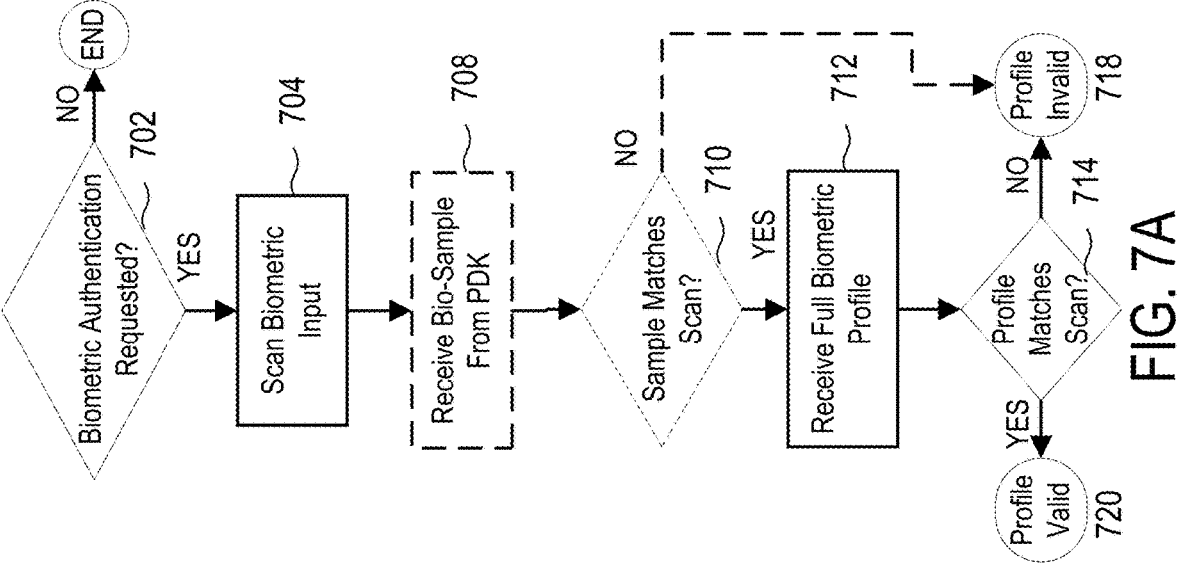
FIG. 7A is a flowchart illustrating one embodiment of a process for profile testing using a biometric input.

Referring first to FIG. 7A, it illustrates a process for biometric authentication. In biometric authentication, a Reader 108 compares a biometric profile stored in the PDK 102 to the biometric input 104 acquired by the biometric reader 302. Advantageously, the biometric input 104 is not persistently stored by the Reader 108, reducing the risk of theft or fraudulent use. If 702 biometric authentication is requested, the Reader 108 scans 704 the biometric input 104 supplied by the user. In one embodiment, scanning 704 includes computing a mathematical representation or hash of the biometric input 104 that can be directly compared to the biometric profile.

Furthermore, in one embodiment, scanning 704 also includes obtaining a biometric input sample from the biometric input according to the same function used to compute the biometric profile sample stored in the PDK 102. Optionally, the Reader 108 receives 708 a biometric profile sample from the PDK 102 and determines 710 if the biometric profile sample matches the biometric input sample. If the biometric profile sample does not match the input sample computed from the scan, the profile is determined to be invalid 718. If the biometric profile sample matches, the full biometric profile 712 is received from the PDK 102 to determine 714 if the full biometric profile 712 matches the complete biometric input 104. If the profile 712 matches the scan, the profile 712 is determined to be valid 720, otherwise the profile 712 is invalid 718. It is noted that in one embodiment, steps 708 and 710 are skipped and only a full comparison is performed. In one embodiment, the biometric profile and/or biometric profile sample is encoded and transmitted to the Reader 108 along with an encoding key and/or algorithm. Then, the Reader 108 uses the encoding key and/or algorithm to recover the biometric profile and/or biometric profile sample. In another alternative embodiment, only the encoding key and/or algorithm is transmitted by the PDK 102 and the biometric profile data is recovered from a remote database in an encoded form that can then be decoded using the key and/or algorithm.

It will be apparent to one of ordinary skill that in alternative embodiments, some of the steps in the biometric profile authentication process can be performed by the PDK 102 instead of the Reader 108 or by an external system coupled to the Reader 108. For example, in one embodiment, the biometric input 104 can be scanned 704 using a biometric reader built into the PDK 102. Furthermore, in one embodiment, the steps of computing the mathematical representation or hash of the biometric input and/or the steps of comparing the biometric input to the biometric profile can be performed by the PDK 102, by the Reader 108, by an external system coupled to the Reader 108, or by any combination of the devices. In one embodiment, at least some of the information is transmitted back and forth between the PDK 102 and the Reader 108 throughout the authentication process. For example, the biometric input 104 can be acquired by the PDK 102, and transmitted to the Reader 108, altered by the Reader 108, and sent back to the PDK 102 for comparison. Other variations of information exchange and processing are possible without departing from the scope of the invention. The transfer of data between the PDK 102 and the Reader 108 and/or sharing of processing can provide can further contribute to ensuring the legitimacy of each device.

FIG. 7B illustrates a process for PIN authentication. If PIN authentication is requested 724, a PIN is acquired 726 from the user through a keypad, mouse, touch screen or other input mechanism. Optionally, the Reader 108 receives 728 a PIN sample from the PDK 102 comprising a subset of data from the full PIN. For example, the PIN sample can comprise the first and last digits of the PIN. If the Reader 108 determines 730 that the PIN sample does not match the input, the profile is immediately determined to be invalid 736. If the PIN sample matches, the full PIN profile is received 732 from the PDK and compared to the input. If the Reader 108 determines 734 that the profile matches the input, the profile is determined to be valid and is otherwise invalid 736. It is noted that in one embodiment, steps 728 and 730 are skipped.

Figure 7D:
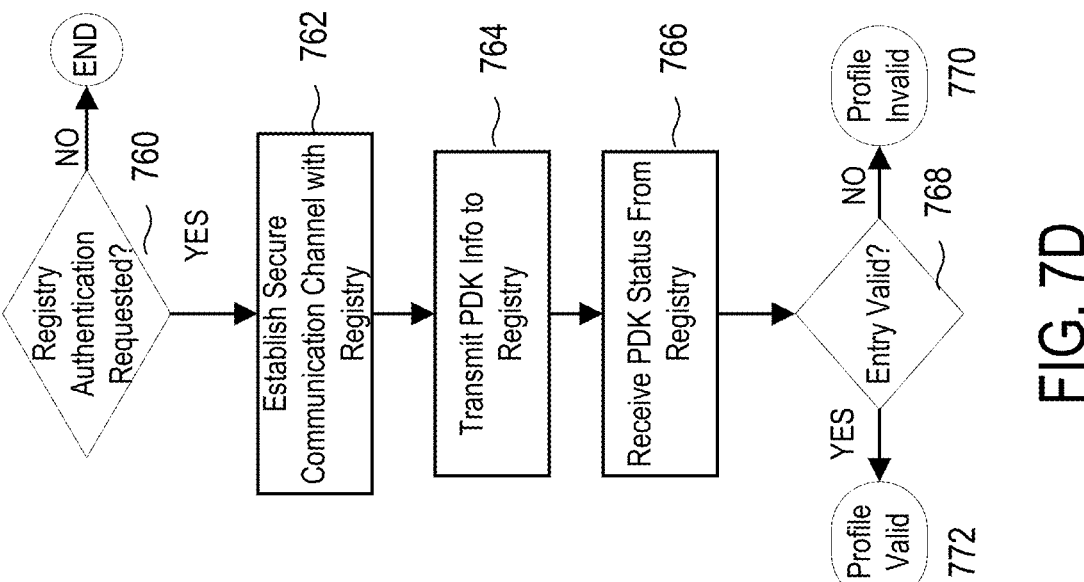
FIG. 7D is a flowchart illustrating one embodiment of a process for profile testing using a private or central registry.
Figure 7C:
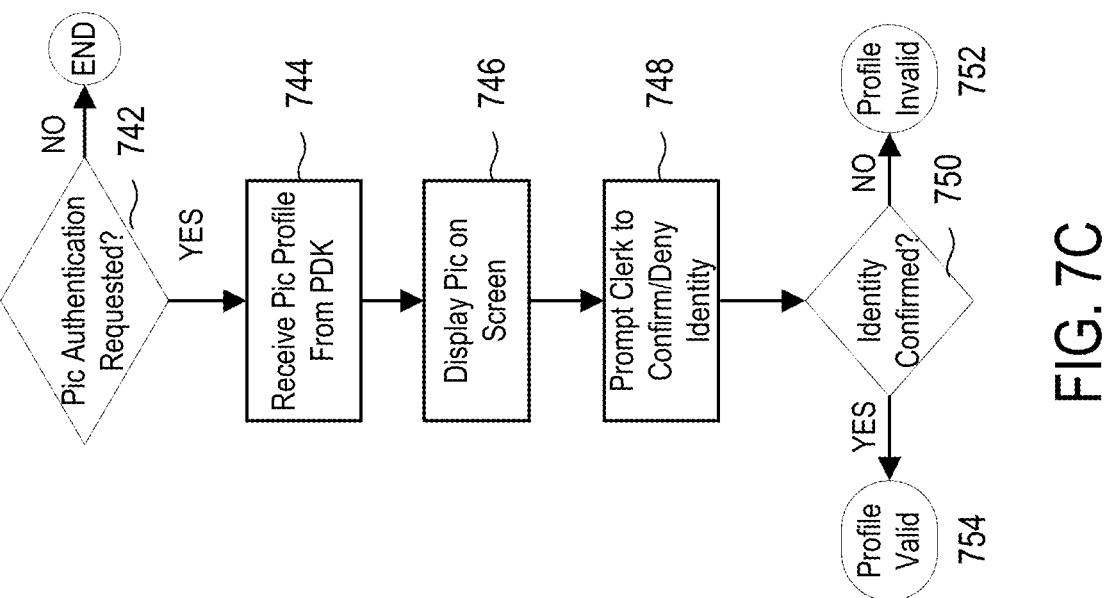
FIG. 7C is a flowchart illustrating one embodiment of a process for profile testing using a picture profile.

FIG. 7C illustrates a process for a picture authentication. If the Reader 108 determines 724 that picture authentication is requested, a picture profile is received 744 from the PDK 102 by the Reader 108 and displayed 746 on a screen. An administrator (e.g., a clerk, security guard, etc.) is prompted 748 to compare the displayed picture to the individual and confirms or denies if the identities match. If the administrator confirms that the identities match, the picture profile is determined to be valid 764 and is otherwise invalid 752. In an alternative embodiment, the process is automated and the administrator input is replaced with a process similar to that described above with reference to FIG. 7A. Here, an image of the user is captured and face recognition is performed by comparing picture profile information received from the PDK 102 to the captured image.

FIG. 7D illustrates a process for authentication with a private registry 114 or the Central Registry 116. If the Reader 108 determines that registry authentication is requested, a secure communication channel is established 762 over the network 110 between the Reader 108 and one or more registries (e.g., the Central Registry 114, any private registry 116, or other validation database 112). If any additional information is needed to process the registry authentication (e.g., a credit card number), the Reader 108 requests and receives the additional information from the PDK 102. Identification information is transmitted 764 from the Reader 108 to the registry 114-116 through the network interface 308. The PDK status is received 766 from the registry to determine 768 if the status is valid 772 or invalid 770. In one embodiment, the information is processed remotely at the registry 114-116 and the registry 114-116 returns a validation decision to the Reader 108. In another embodiment, the Reader 108 queries the private 116 or Central registry 114 for information that is returned to the Reader 108. The information is then analyzed by the Reader 108 and the authorization decision is made locally. In one embodiment, the process involves transmitting credit card (or other purchasing information) to a validation database 112 to authorize the purchase and receive the status of the card. Status information may include, for example, confirmation that the card is active and not reported lost or stolen and that sufficient funds are present to execute the purchase.

Figure 8:
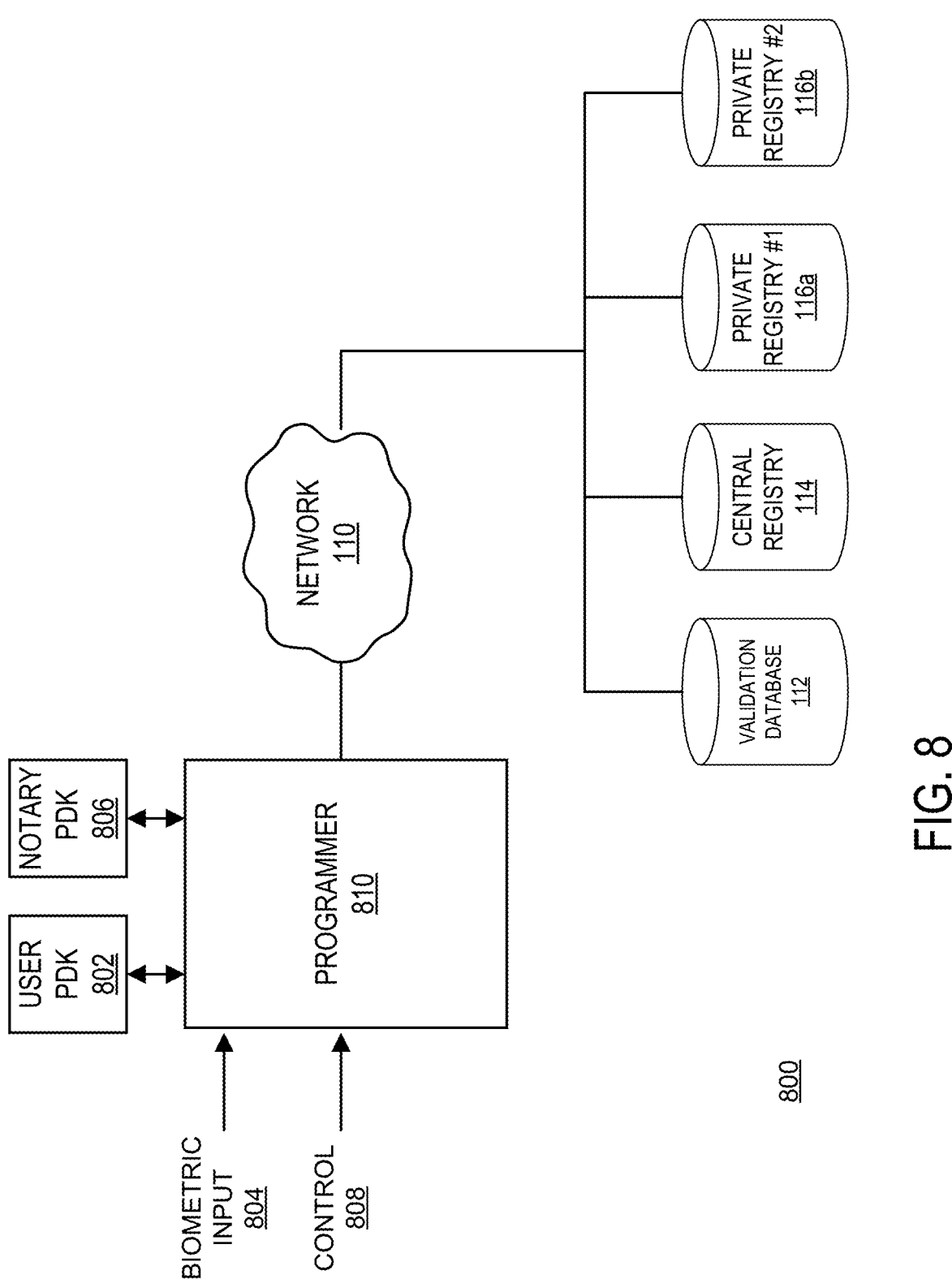
FIG. 8 is a high level block diagram illustrating a system for initializing and registering a PDK for use in secure electronic authentication.

Turning now to FIG. 8, a system 800 is illustrated for initializing and registering a PDK 802 through secure trusted initialization and registration processes. The system 800 comprises a Programmer 810, a user PDK 802, a Notary PDK 806, a network 110 and a set of external databases including a validation database 112, a Central Registry 114 and one or more private registries 116. The Programmer 810 couples to the user PDK 802, the Notary PDK 806, and a network 110 by either wired or wireless links. The Programmer 810 is also capable of receiving a biometric input 104 from a user and a control input 808 from either the user or the Notary. The network 110 is coupled to the validation database 112, the Central Registry 114 and two private registries 116. In alternative embodiments, different or additional external registries or databases may be coupled to the network. In another alternative embodiment, the Programmer can operate as a standalone device without any connection to the network 110.

Generally, the system 800 is adapted to initialize and/or register a user PDK 802 through a secure trusted process. Initialization includes configuring a user PDK 802 for at least its most basic use and can include acquiring one or more biometric profiles (or other profile) from the user according to a trusted process. The registration process registers a user PDK 802 with the Central Registry 114 and/or one or more private registries 116. Additionally, registration can include programming profile memory fields 232 in the user PDK 802 to store, for example, credit card information, personal information or other information used for authentication or transaction purposes.

As previously mentioned, in one embodiment, the initialization process is administered and witnessed by a trusted third-party referred to as a Notary. Conceptually, a Notary can be thought of as an enhanced public notary that can be trusted to verify that an individual's identification has been properly authenticated prior to the execution of a transaction. Instead of witnessing an individual sign a legally-binding document, the Notary witnesses the acquisition and storage of an authenticated individual's biometric profile. The Notary ensures that the individual's identification and biometric profile comply with, and have been acquired and processed according to defined security protocols. In one embodiment, various requirements may be imposed on the Notary to be eligible for administering initialization and the requirements may be definable for different types of initialization. For example, in one embodiment a Notary has to pass an extensive background check, receive training, or provide signatures agreeing to fulfill the duties of a trusted Notary. Furthermore, regular audits may be performed on Notaries to ensure that they can be trusted and are not associated with any fraudulent activity. It is noted that not all types of initialization and registration require a Notary.

The initialization and registration processes are enabled by using a Programmer 810 to write initialization and registration information to a user PDK 802. In one embodiment, the Programmer 810 also communicates with a Notary PDK 806 belonging to a Notary that verifies the processes and ensures that the initialization and registration information can be trusted. For registration, the Programmer 810 communicates to the Central Registry 114, one or more validation databases 112 or one or more private registries 116 through the network 110.

Figure 9:
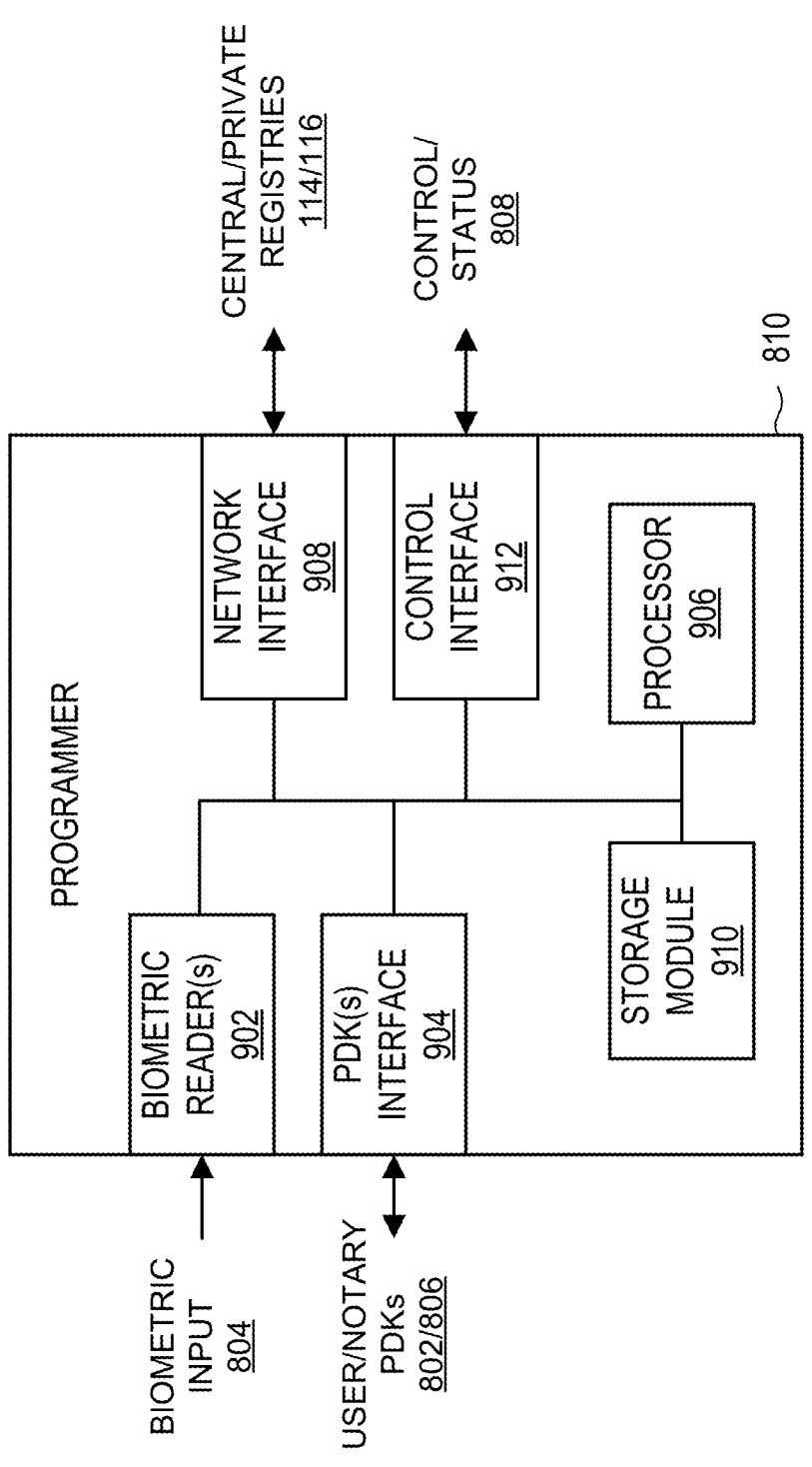
FIG. 9 is a block diagram illustrating one embodiment of a Programmer for programming a PDK.

FIG. 9 illustrates an example embodiment of a Programmer 810. The Programmer 810 includes one or more biometric readers 902, an interface 904 for one or more PDKs, a storage module 910, a processor 906, a control interface 912, and a network interface 908.

It is noted that some of the modules of the Programmer 810 operate similarly to modules of the Touch Reader 108 previously described. For example, the biometric reader 902, network interface 908 and processor 906 can be similar in architecture to the biometric reader 302, network interface 308 and processor 306 of the Touch Reader 108. However, the operation of these components is as described below with reference to FIGS. 10-14. The PDK interface 904 couples the Programmer 810 to the programmer I/O 240 of one or more PDKs. In one embodiment, the PDK interface 904 simultaneously couples to a Notary PDK 806 and a user PDK 802. In another embodiment, two or more Notary PDKs 806 can be coupled to the interface 904 in addition to the user PDK 802. In yet another embodiment, the interface 904 only couples to one PDK at a time but allows different PDKs to be swapped in and out. In an alternative configuration, the Notary PDK 806 can couple to the PDK interface 904 from a remote location. For example, a Notary PDK 806 can couple to the Programmer through a network, allowing the Notary to perform the initialization from a remote location. In another configuration, the Notary function is performed by trusted hardware or other automated means that can be built into the Programmer, rather than by a human.

The control interface 912 receives control inputs 808 from a user or from a Notary and outputs status indicators. Control inputs 808 can include, for example, programming settings, menu selections, confirmations and so on. Outputs can include, for example, status LEDs, an LCD with or without a touchscreen interface, or other display that provides instructions, menus or programming options to the user and/or Notary.

The storage module 910 temporarily stores user information during programming. In one embodiment, the storage module 910 includes volatile and non-volatile memory. Typically, biometric information or other highly personal information is erased from the storage module 910 upon completion of programming or removal of the Notary PDK 806 or user PDK 802. In one embodiment, the storage module 910 includes long-term storage for storing programming history information. Programming history can include, for example, the PDK ID, Notary ID, site ID, and time-stamps associated with the programming of any PDK. The programming history can be recalled at a later time for auditing purposes.

Figure 10:
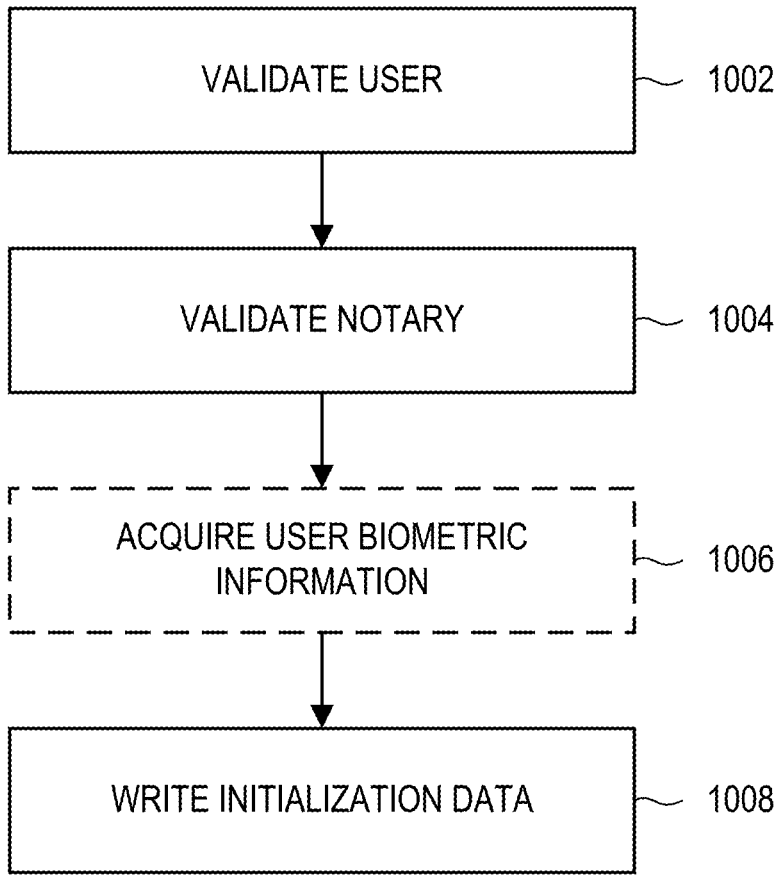
FIG. 10 is a flowchart illustrating one embodiment of a process for PDK initialization.

Turning now to FIG. 10, an embodiment of a high-level process for initializing a PDK is illustrated. To establish trust and credibility of data stored on the PDK, the Programmer validates 1002 a user and validates 1004 an Notary. The process for validation is described in more detail below with reference to FIG. 11. Validation ensures that both the user and Notary are who they claim to be, that the user is eligible for PDK initialization, and that the Notary is authorized to administer the registration process. In the case of a biometric initialization, the Programmer 810 acquires 1006 biometric information from the user for storage in a biometric profile of the user PDK 802. This process is described in more detail below with reference to FIG. 12. The Programmer 810 can further acquire multiple types of biometric profiles, or other types of user profiles. The initialization history is then written 1008 to the PDK 802 and optionally to the Programmer 810 for future auditing. This process is described in more detail below with reference to FIG. 12.

Figure 11:
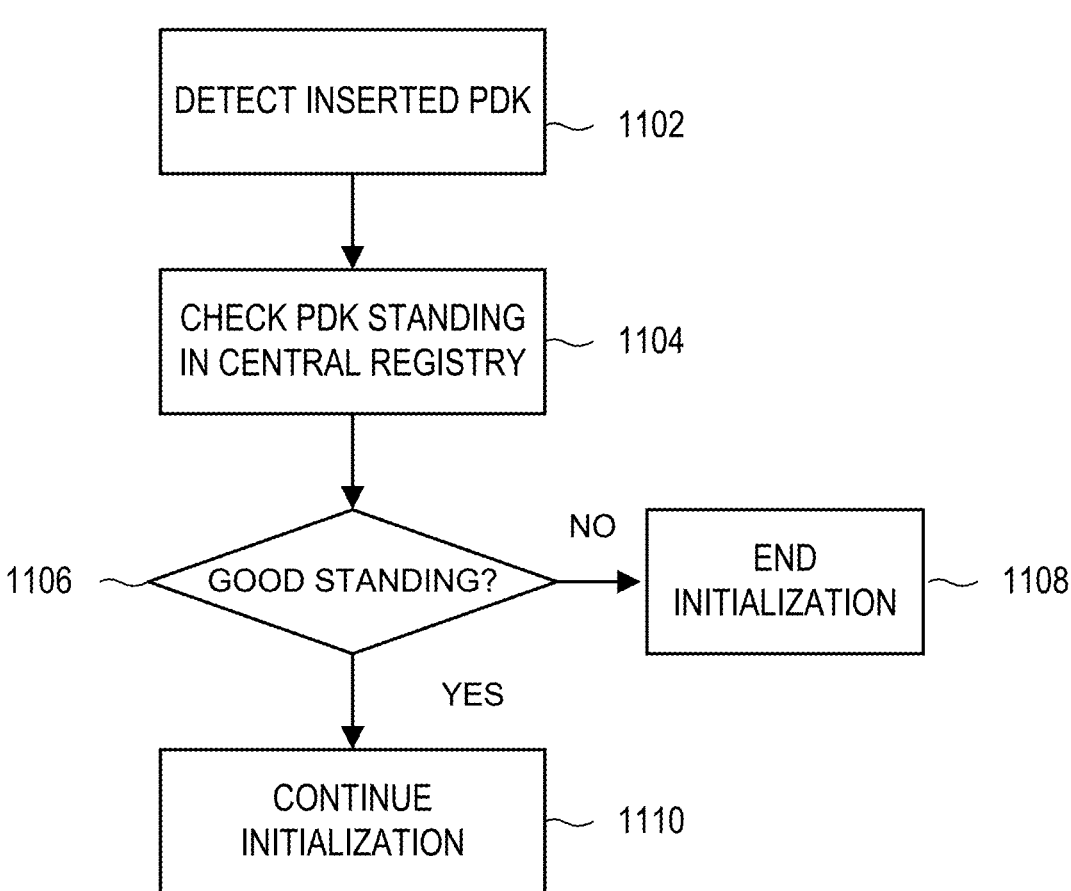
FIG. 11 is a flowchart illustrating one embodiment of a process for validating a PDK for initialization.

The steps of FIG. 10 are described in more detail with reference to FIGS. 11-13. FIG. 11 corresponds to a process for validating 1002 a user PDK 802 and the process for validating 1004 a Notary PDK 806. The user PDK 802 and Notary PDK 806 validation can occur in either order, or can be processed in parallel. To begin validation, the Programmer 810 detects 1102 a PDK 802/806 at the PDK interface 904. The Programmer 810 next checks 1104 standing or status of the PDK 802/806 with the Central Registry 114. In the case of a user PDK 802, the Programmer 810 confirms with the Central Registry 114 that the PDK 802 has not, for example, expired, been reported as lost or stolen, had fraudulent activity associated with the PDK 802, or had any complaints been filed against the user for lack of payments, etc. Further, the Programmer 810 can confirm that the software internal to the user PDK 802 is valid and has not been tampered with. In many cases, the user PDK 802 has never been previously initialized or registered and automatically qualifies for good standing. The step of checking 1104 the PDK standings vary slightly for an Notary PDK 806. Here, the check 1104 ensures that the Notary is a registered Notary, that no fraudulent activity has been associated with the Notary or any PDK initialized or registered by the Notary, that the software internal to the Notary PDK 806 is valid and has not been tampered with, and that the Notary can be trusted to administer the initialization. The process determines 1106 if the PDK (user 802 or Notary 806) is in good standing. If the PDK (user 802 or Notary 806) is determined to be in good standing, the initialization is allowed to continue 1110. If the PDK (user 802 or Notary 806) is not in good standing the initialization process ends 1108.

In one embodiment, validation further includes the PDK 802/806 validating that the Programmer 810 is a valid trusted device. This validation ensures that the Programmer 810 has not been tampered with for fraudulent use. Various device authentication processes are possible such as, for example, a challenge-response authentication. Further, the Programmer 810 can be validated by a remote registry to ensure its software is update, the device has not been tampered with or the hardware has not been reported as lost, stolen, expired or revoked. If any fraudulent activity is detected with the Programmer, the Programmer can be automatically disabled.

Figure 12:
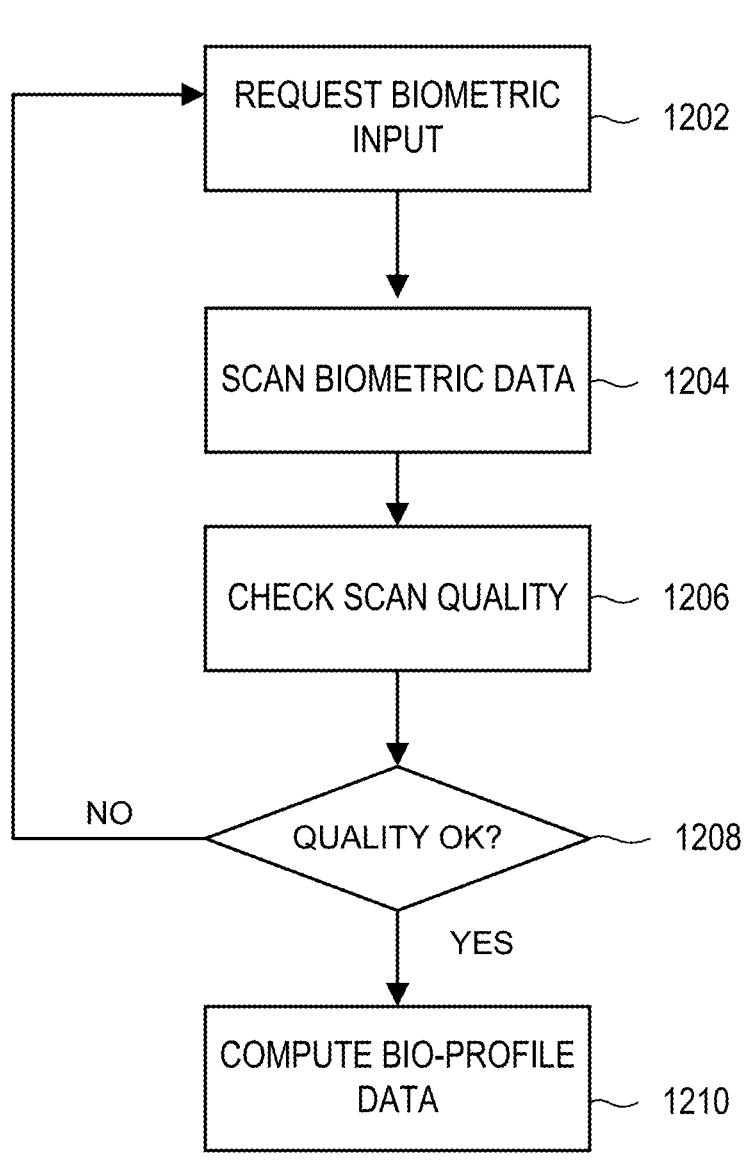
FIG. 12 is a flowchart illustrating one embodiment of a process for acquiring biometric information for PDK initialization.

Initialization optionally includes acquiring 1006 biometric information to be stored in the biometric profile of the user PDK 802 as illustrating in FIG. 12. To begin the process, the Programmer 802 requests 1202 biometric input 804 from the user. The biometric input 804 is then scanned 1204 by the biometric reader 902. For example, in a fingerprint-based initialization, scanning 1204 includes requesting the user to place each desired finger on the biometric reader 902 of the Programmer 810 and capturing an image representing the unique characteristics of the fingerprint. In other types of biometric initialization, scanning 1204 can include capturing a different type of image (e.g., a palm, face, retina, iris, or signature), capturing audio for a voice-based biometric profile, or capturing DNA, RNA or their derivatives as used to establish identity. The Programmer 810 checks 1206 the quality of each scan to ensure that the captured biometric input 804 is valid. If 1208 the quality is not satisfactory (due to, for example, improper positioning during the scan), the Programmer 810 repeats the request 1202 for biometric input 804. If 1208 the quality of the scan meets the necessary standards, the biometric profile is computed from the scan results. As previously described, the biometric profile is generally computed by performing mathematical hashes on the acquired data. In addition, in one embodiment, the biometric profile can be encoded according to an encoding key and/or algorithm that is stored with the biometric profile data. This process can be repeated for any number of biometric profile types.

Additional types of profiles can also be similarly stored to the user PDK 802. For example, a PIN profile can be added by prompting the user to enter a PIN or password. A photo profile can be added by capturing an image of the user, checking the quality of the image and recapturing the image if necessary.

Figure 13:
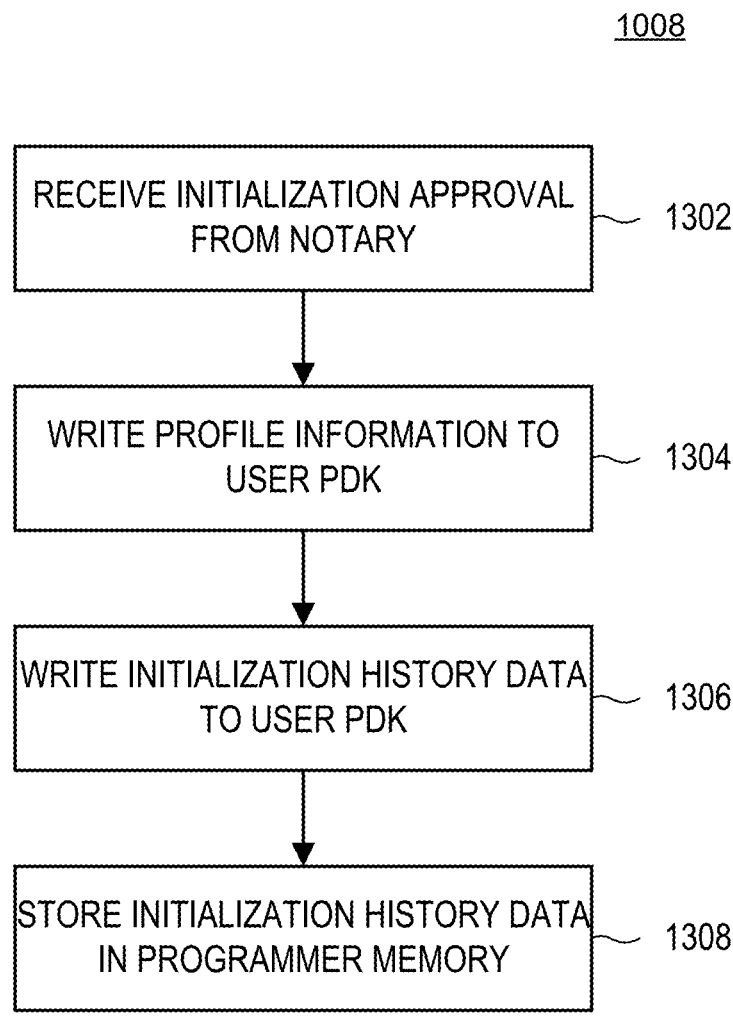
FIG. 13 is a flowchart illustrating one embodiment of a process for writing initialization data.

FIG. 13 illustrates an embodiment of a process for writing 1008 initialization data. In step 1302, the Programmer 810 receives initialization approval from the Notary. By submitting the approval, the Notary indicates that he/she has witnessed the initialization process and that the user's identity has been authenticated. In one embodiment, the approval can be executed automatically if all previous steps are validated. The acquired profile information and/or registry information is then written 1304 to the user PDK 802. Here, user data can include the profile to be written to the once-programmable memory or other information to be written to the read/write memory fields. History data is also written 1306 to the user PDK. History data includes information documenting the initialization process such as the Notary ID, the Programmer's ID, and the site ID (indicating the location of the initialization), registration date and time, and so on. Initialization history data can also be stored 1308 in the storage module 910 of the Programmer 810. This provides an audit trail of all programming operations performed by the Programmer 810. It should be noted that the user's biometric information is typically erased from the Programmer 810 and is therefore not at risk of theft or fraudulent use.

In one embodiment, initialization history information is also written to the Notary PDK 806. Here, a Notary PDK 806 can store a record of every initialization performed by the Notary. This information can be used for auditing purposes in the future. For example, if a Notary's rights are revoked, any initializations performed by that Notary can be recovered from the Notary's PDK 806. Then, user PDKs 802 initialized by that Notary may need to be disabled until re-initialized by the user.

Figure 14:
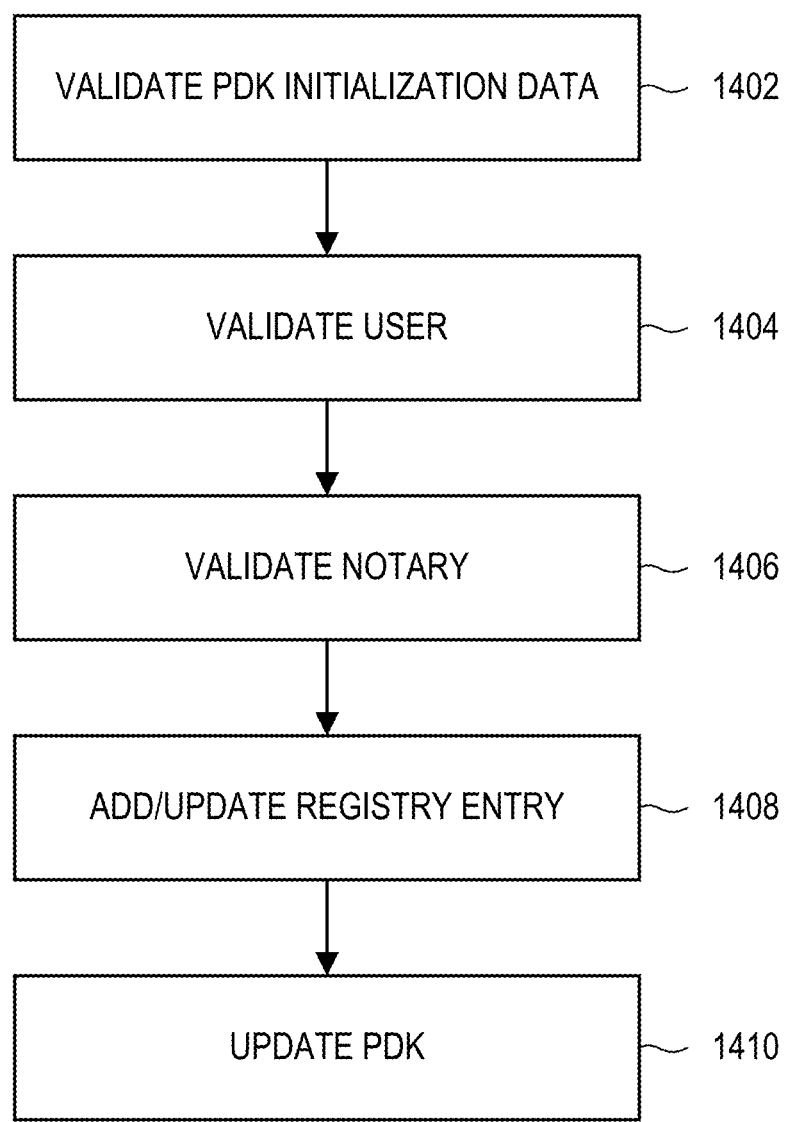
FIG. 14 is a flowchart illustrating one embodiment of a process for registering a PDK with a registry.

FIG. 14 illustrates a method for registering a PDK with a Central 114 or private 116 registry. In step 1402, the PDK initialization data is validated by the Programmer 810 to confirm that the PDK 802 has been properly initialized as described in FIGS. 10-13. The user is validated 1404 and the Notary administering the registration is validated 1406. In one embodiment, the validation steps can be executed by steps similar to the process of FIG. 11 used in initialization. If the user and Notary are both validated, the registry entry is added 1408 to the registry if the user is new to the registry, or a registry entry is updated 1408 if the user has already previously been registered. In this step, user information is transmitted by the network interface 908 of the Programmer 810 to the private 116 or Central Registry 114. A registry entry can include for example, the unique user PDK, purchasing information (such as credit/debit/ATM card information or bank account information), and personal information (such as name, address, phone number, date of birth, etc.). The user PDK 802 is then updated 1410 by storing the information to the memory of the PDK. Information associated with a registry update (user PDK ID, Notary ID, programmer ID, site ID, registry ID, timestamps, etc.) can also be written to the storage module 910 of the Programmer 810 to enable future audits. In an alternative embodiment, the Programmer 810 can operate as a portable standalone device that can register a user PDK 802 in an offline mode.

Then, the Programmer can be later coupled to a network to upload any new registrations to a private registry 116, Central Registry 114, or validation database 112.

It is noted that although in many embodiments of the present invention, the Notary performs the initialization and registration process in person, it is also possible for the Notary to operate from a remote location. For example, in one embodiment, a user can enter an initialization booth with a camera and a Programmer 810. The user enters the user PDK 802 into the Programmer 810 and begins the initialization session. A Notary at a remote location can monitor the operation and if necessary provide instructions to the user. Alternatively, the initialization and registration can be administered by a completely automated process that can be recalled and reviewed at a later time to ensure the user followed the appropriate procedures. In another embodiment, a human Notary is not required, and the initialization and/or registration processes are performed entirely by trusted hardware.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:

acquiring, by a portable user device, an image of a biometric characteristic of a user, including at least one of, an iris scan, a retinal scan, a finger print scan, and a palm associated with the user;

automatically computing a mathematical one-way hash of the biometric characteristic;

comparing, by the portable user device, the mathematical one-way hash of the biometric characteristic of the user with a biometric profile stored in the portable user device;

responsive to the comparing, determining that the mathematical one-way hash of biometric characteristic matches with the biometric profile;

responsive to determining that the mathematical one-way hash of the biometric characteristic of the user matches with the biometric profile, automatically detecting that the portable user device is within a proximity zone of a reader device, and establishing a wireless communication channel between the portable user device and the reader device; and transmitting transaction information for a transaction executable on the portable user device, to the reader device via the wireless communication channel, the reader device requesting a validation of the transaction information from a trusted system and performing the transaction using the transaction information responsive to receiving the validation of the transaction information from the trusted system.

2. The method of claim 1, wherein the reader device is associated with a point-of-sale terminal and the transaction relates to a purchase.

3. The method of claim 1, wherein the reader device is associated with an automated teller machine and the transaction relates to a withdrawal from the automated teller machine, wherein the withdrawal is initiated in one configuration from a group including by a holder of the portable user device establishing contact with the reader device, by the holder of the portable user device taking an action to express an intent to purchase, and by detecting presence of the holder of the portable user device within range of the reader device.

4. The method of claim 1, wherein the biometric profile is encoded and transmitted to the reader device.

5. The method of claim 1, wherein the biometric profile is encoded and transmitted to the reader device with at least one of, an encoding key, an algorithm, and an encoding key and an algorithm.

6. The method of claim 1, wherein the portable user device includes a biometric scanner to acquire a biometric input of the user.

7. The method of claim 6, wherein the biometric scanner acquires at least one of, an iris scan, a retinal scan, a finger print scan, and a palm associated with the user.

8. The method of claim 1, wherein the portable user device is coupled to a portable notary device.

9. The method of claim 1, wherein the portable user device includes at least one of a wearable device or a cellular phone.

10. The method of claim 1, wherein the trusted system is a third-party system independent of the portable user device and the reader device.

11. The method of claim 1, wherein the transaction information is associated with a default payment option.

12. The method of claim 1, wherein the transaction information is associated with a payment option selected by the user at a time of the transaction from a plurality of payment options.

13. The method of claim 1, wherein the transaction information is associated with an identification code uniquely identifying the portable user device.

14. A system comprising:

a computing device and a memory including instructions that, when executed by the computing device, cause the system to perform operations including:

acquiring, by a portable user device, an image of a biometric characteristic of a user, including at least one of, an iris scan, a retinal scan, a finger print scan, and a palm associated with the user;

automatically computing a mathematical one-way hash of the biometric characteristic of the user;

comparing, by the portable user device, the mathematical one-way hash of the biometric characteristic of the user with a biometric profile stored in the portable user device;

responsive to the comparing, determining that the mathematical one-way hash of the biometric characteristic of the user matches with the biometric profile;

responsive to determining that the mathematical one-way hash of the biometric characteristic of the user matches with the biometric profile and automatically detecting that the portable user device is within a proximity zone of a reader device, establishing a wireless communication channel between the portable user device and the reader device; and transmitting transaction information for a transaction from the portable user device to the reader device via the wireless communication channel, the reader device requesting a validation of the transaction information from a trusted system and performing the transaction using the transaction information responsive to receiving the validation of the transaction information from the trusted system.

15. The system of claim 14, wherein the reader device is associated with a point-of-sale terminal and the transaction includes a purchase.

16. The system of claim 14, wherein the reader device is associated with an automated teller machine and the transaction relates to a withdrawal from the automated teller machine, wherein the withdrawal is initiated in at least one configuration from a group including by a holder of the portable user device establishing contact with the reader device, by the holder of the portable user device taking an action to express an intent to purchase, and by detecting presence of the holder of the portable user device within range of the reader device.

17. The system of claim 14, wherein the portable user device includes at least one of a wearable device or a cellular phone.

18. The system of claim 14, wherein the portable user device includes a biometric scanner to acquire a biometric input of the user.

19. The system of claim 18, wherein the biometric scanner includes a camera.

20. The system of claim 18, wherein acquiring at least one of the iris scan, the retinal scan, the finger print scan, and the palm associated with the user of the user is performed by the biometric scanner.

* * * * *